(12) United States Patent
Fujita et al.

(10) Patent No.: US 6,525,667 B1
(45) Date of Patent: Feb. 25, 2003

(54) OPERATION INDICATOR DEVICE AND PANEL UNIT

(75) Inventors: Toshihiro Fujita, Osaka (JP); Yoshitaka Tsuji, Osaka (JP); Tatsunobu Nakai, Osaka (JP); Yoshihide Nakano, Osaka (JP); Yosio Sekino, Osaka (JP); Masaaki Fujii, Osaka (JP); Toshiyuki Kasama, Osaka (JP); Takao Hosorogi, Osaka (JP); Masao Dohi, Osaka (JP); Shinichi Ishino, Osaka (JP); Shigoto Ogino, Osaka (JP); Tomonori Nishiki, Osaka (JP); Takehiko Tajika, Osaka (JP); Masahiko Kawakami, Osaka (JP); Yuuhei Sugai, Osaka (JP)

(73) Assignee: IDEC Izumi Corporation (JP)

( * ) Notice: Subject to any disclaimer, the term of this patent is extended or adjusted under 35 U.S.C. 154(b) by 0 days.

(21) Appl. No.: 09/202,298

(22) PCT Filed: Apr. 13, 1998

(86) PCT No.: PCT/JP98/01705
§ 371 (c)(1),
(2), (4) Date: Dec. 11, 1998

(87) PCT Pub. No.: WO98/47128
PCT Pub. Date: Oct. 10, 1998

(30) Foreign Application Priority Data

| Apr. 14, 1997 | (JP) | 9-096241 |
| Oct. 14, 1997 | (JP) | 9-280928 |
| Oct. 15, 1997 | (JP) | 9-281818 |
| Oct. 15, 1997 | (JP) | 9-281819 |

(51) Int. Cl.⁷ .............................................. G08B 5/00
(52) U.S. Cl. .............................. 340/815.4; 340/825.07; 340/825.52
(58) Field of Search ................................. 345/4, 3.1, 11, 345/30; 700/17, 83; 340/815.4, 825.07, 825.52

(56) References Cited

U.S. PATENT DOCUMENTS

| 5,420,577 A | * | 5/1995 | Kim et al. ............. 340/825.52 |
| 5,530,435 A | * | 6/1996 | Toms et al. ............ 340/825.07 |
| 5,547,269 A |   | 8/1996 | Bernecker et al. |
| 5,684,469 A | * | 11/1997 | Toms et al. ............ 340/825.07 |

FOREIGN PATENT DOCUMENTS

| DE | 876858 | 5/1953 |
| JP | 2-57204 | 4/1990 |
| JP | 8-50459 | 2/1996 |
| JP | 9-97022 | 4/1997 |

OTHER PUBLICATIONS

Search Report issued Nov. 24, 2000 in a related application (in English).

* cited by examiner

*Primary Examiner*—John Tweel
(74) *Attorney, Agent, or Firm*—Ostrolenk, Faber, Gerb & Soffen, LLP

(57) ABSTRACT

Panel units (24a to 24d) continuing an operation indicating panel (20) each have a rectangular surface S with length and width each being substantially an integral multiple of a predetermined reference size (L). The panel units (24a and 24d) are placed so that their surfaces S may be adjacent to one another. A whole surface (AS) consisting of the surfaces S of all the panel units (24a to 24d) is formed in a rectangular shape with length and width each being substantially an integral multiple of the predetermined reference size (L). The arrangement and the like of the panel units (24a to 24d) can be easily changed.

33 Claims, 45 Drawing Sheets

FIG. 4A
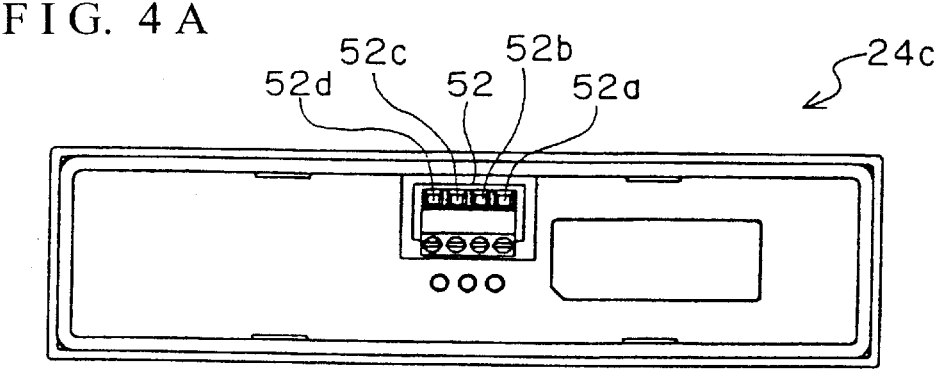
FIG. 4B
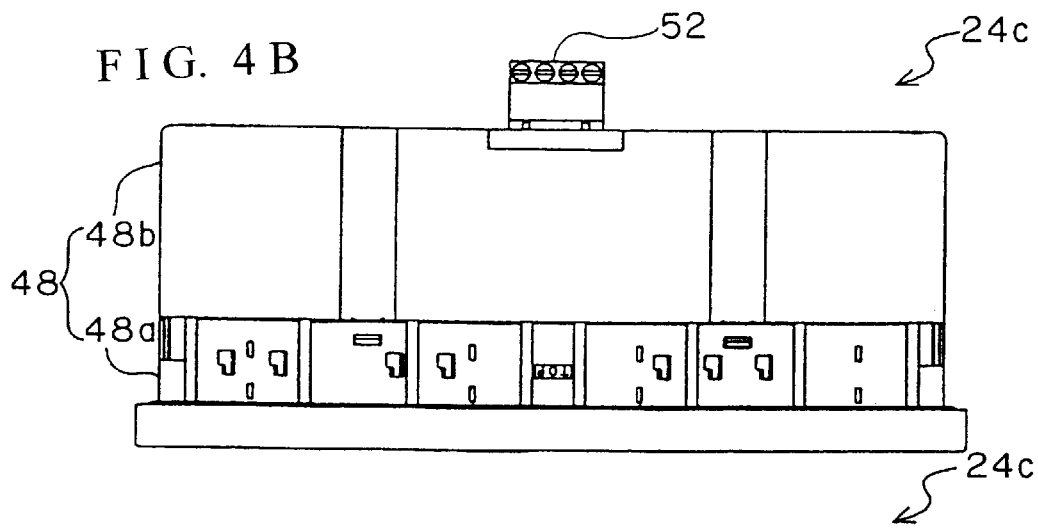
FIG. 4C

FIG. 8A
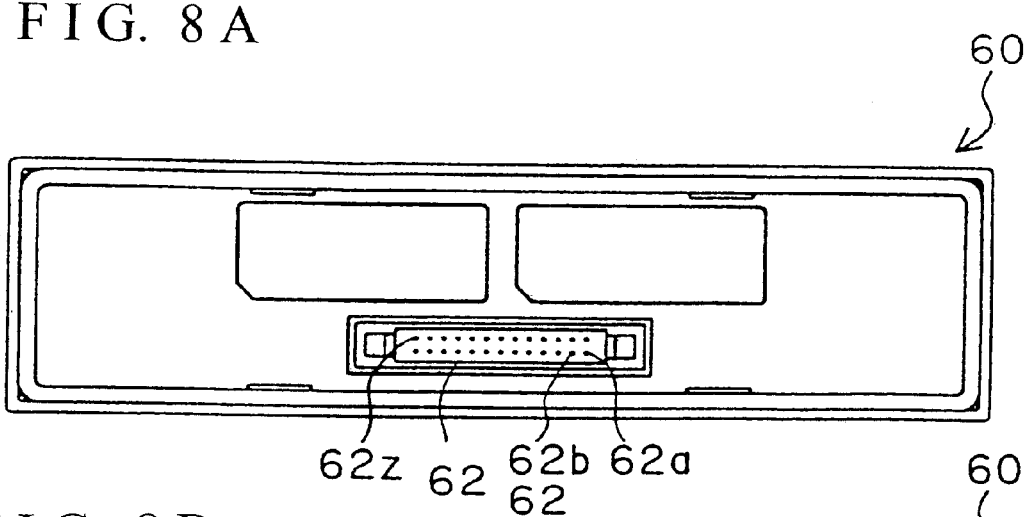
FIG. 8B
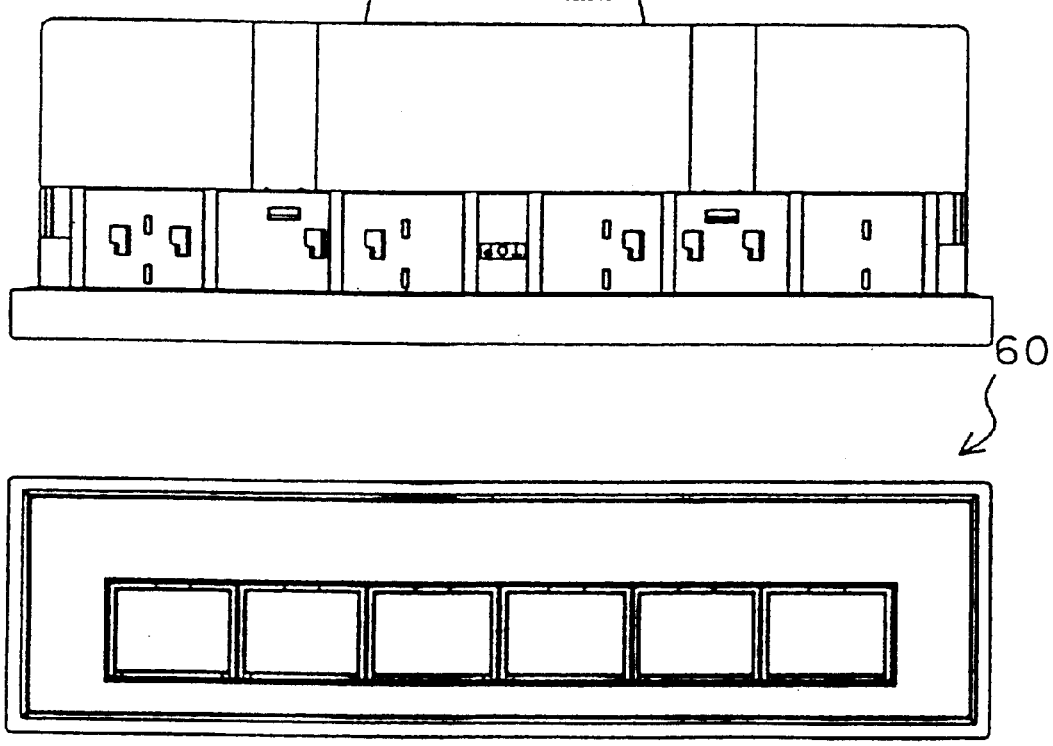
FIG. 8C

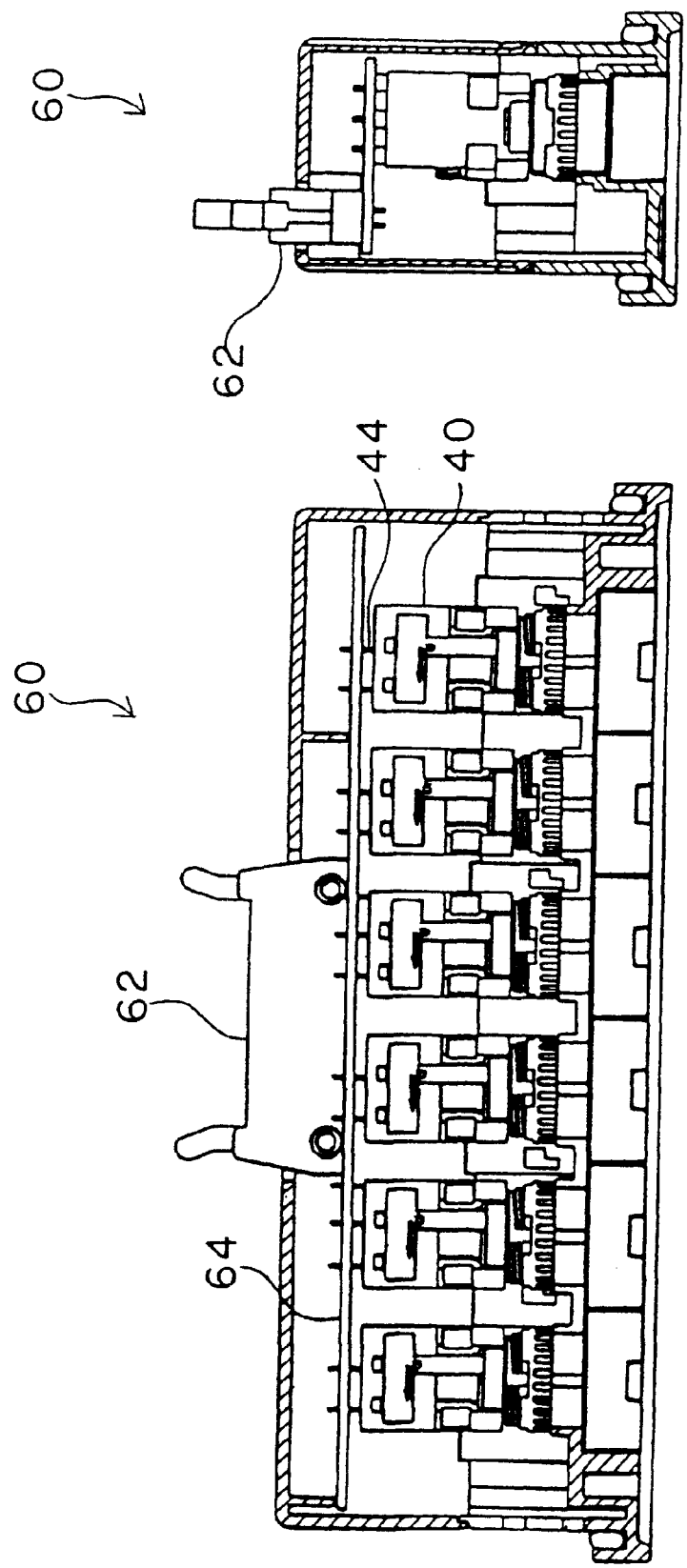

FIG. 14A
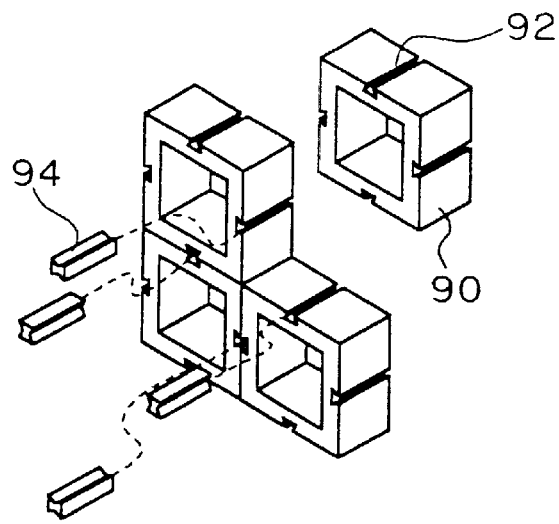
FIG. 14B
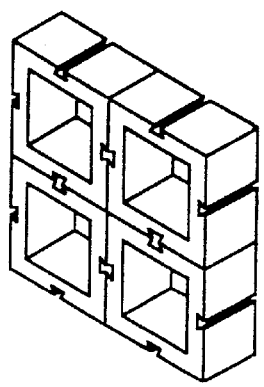
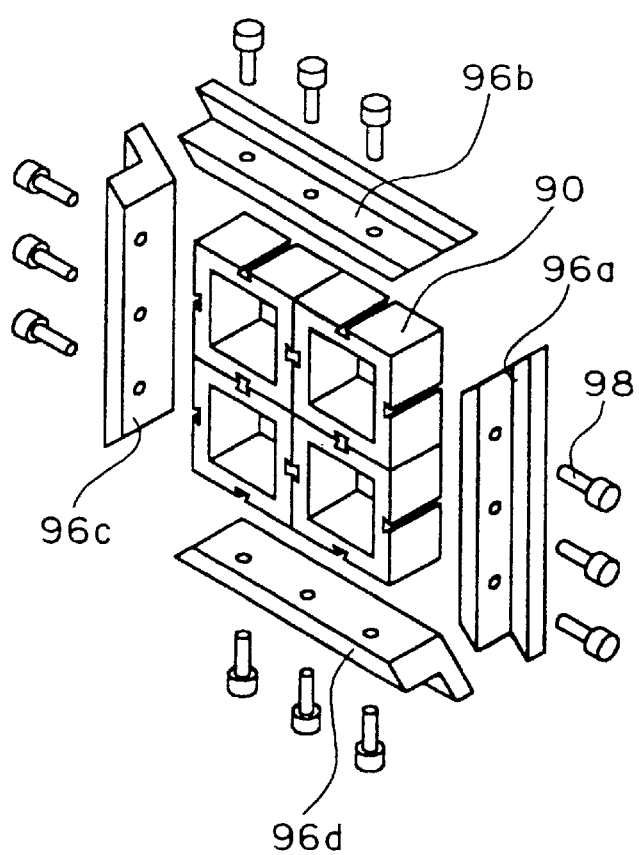
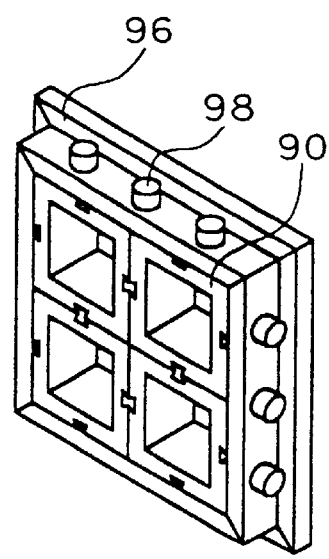
FIG. 14C
FIG. 14D

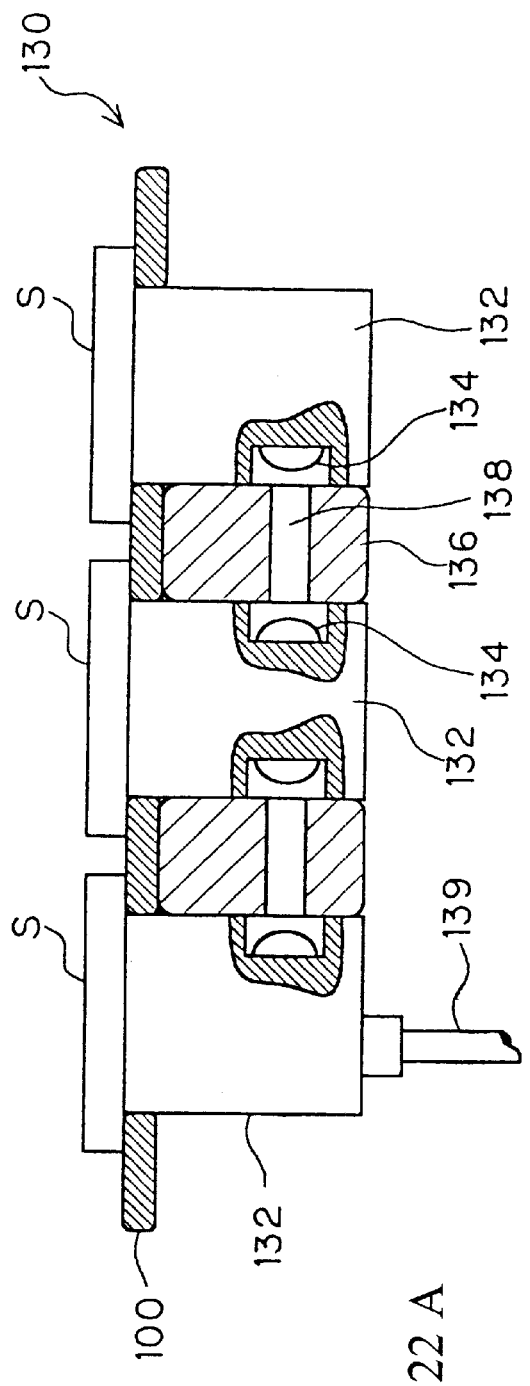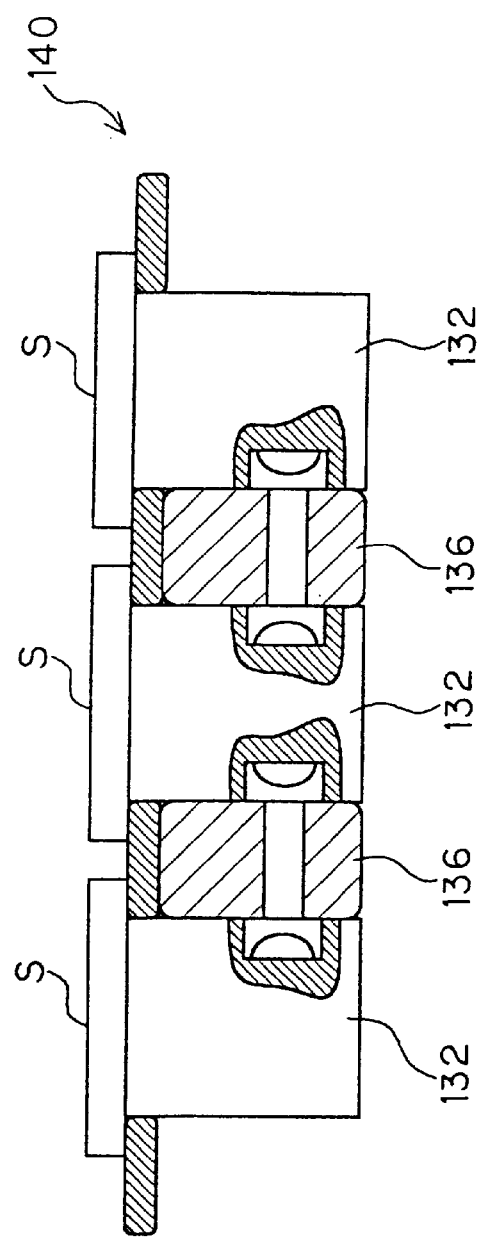
FIG. 22A
FIG. 22B

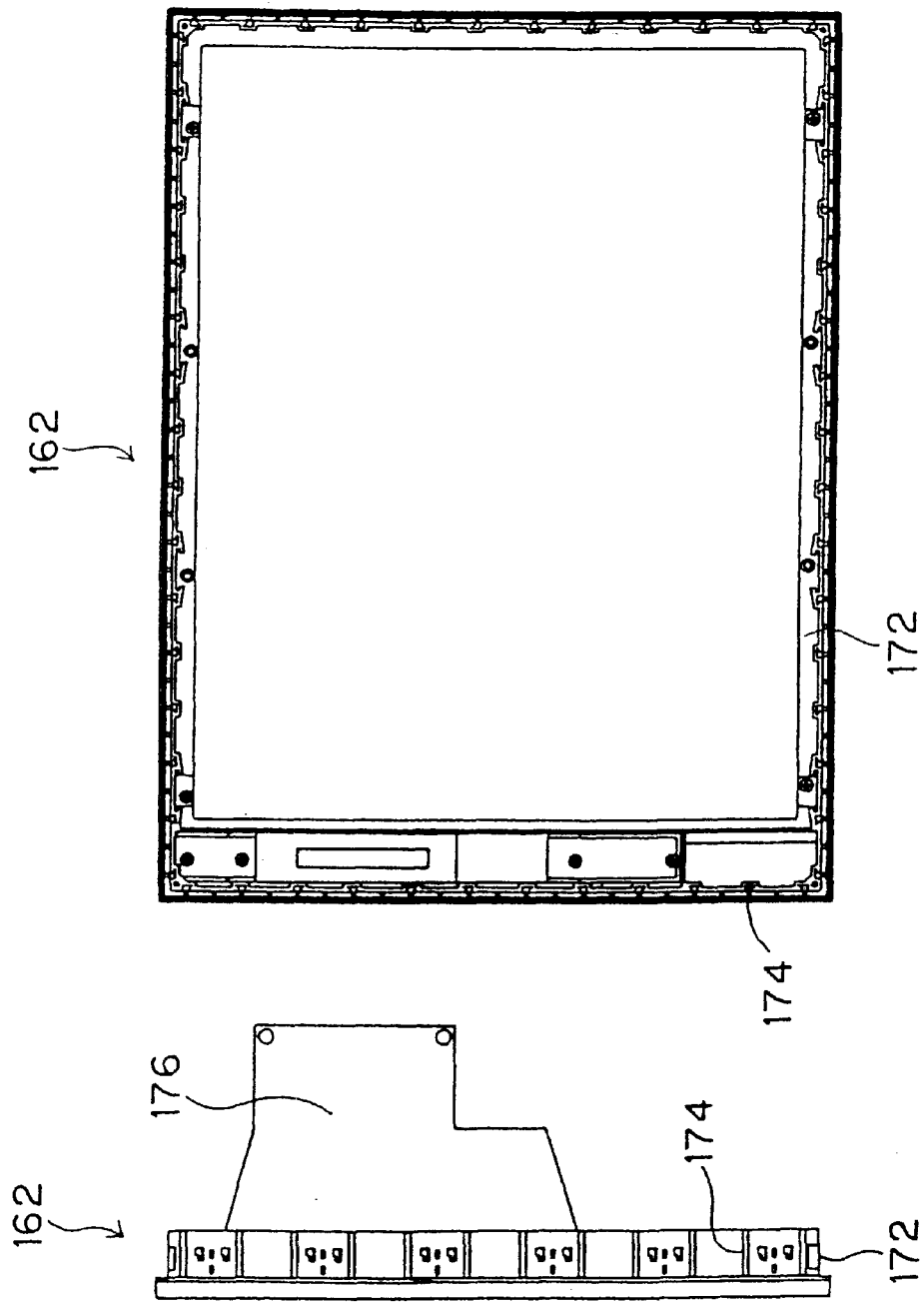

FIG. 28A
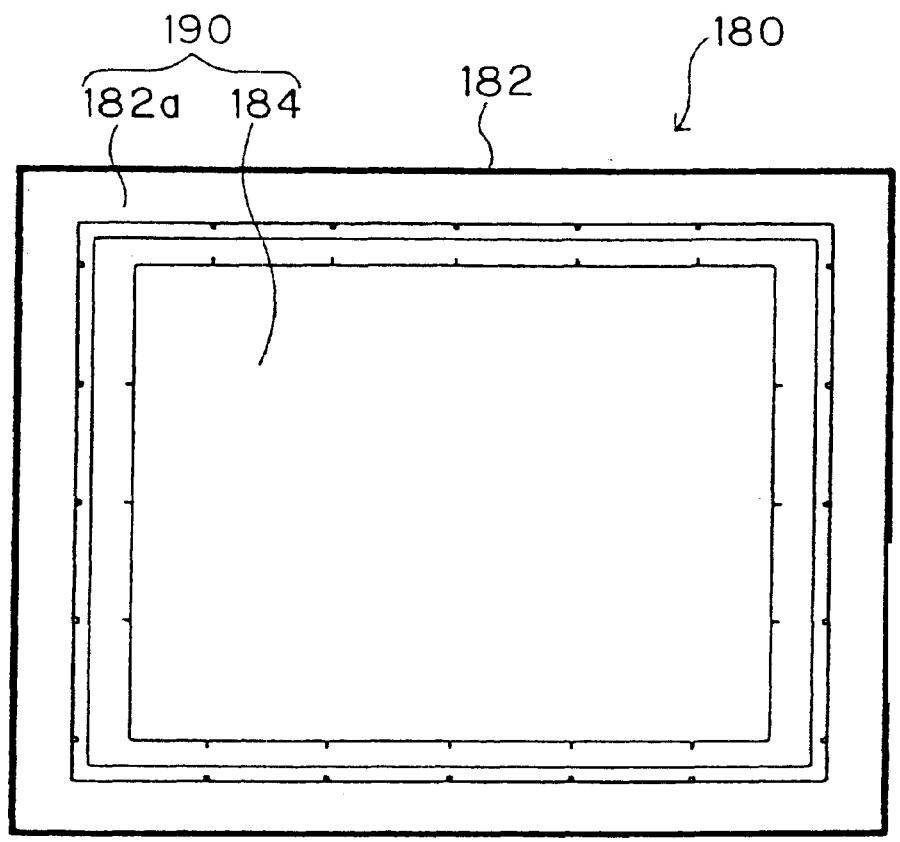
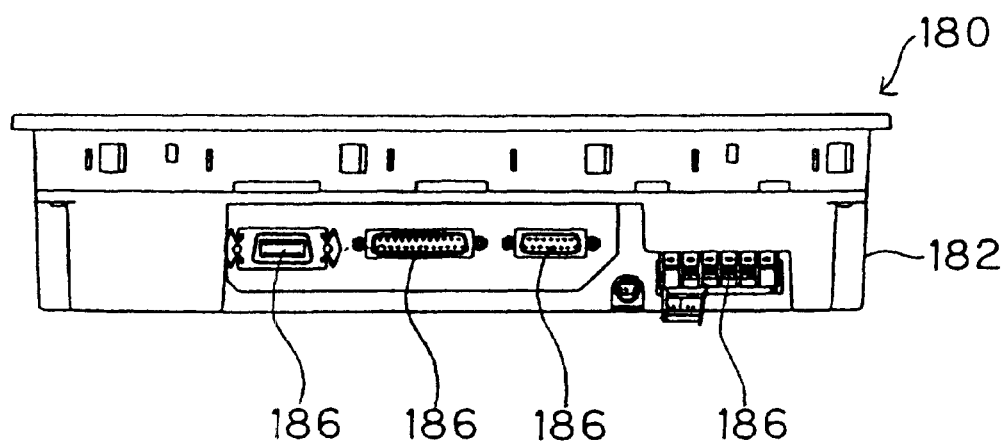
FIG. 28B

OPERATION INDICATOR DEVICE AND PANEL UNIT

FIELD OF THE INVENTION

The present invention relates to an operation indicator device, more particularly to an operation indicator device in which a plurality of panel units are placed, and the panel unit used in the operation indicator device.

DESCRIPTION OF THE BACKGROUND ART

In a plant, a machine tool and the like used is an operation indicator device to which a push button for operation, an indicator lamp for displaying the condition and the like are mounted. Such a typical operation indicator device consists of a selector switch for switching between a manual operation and an automatic operation and the like, a push-button switch used as an starting switch and the like, an LED indicator used as a counter, a timer and the like and a liquid crystal display for indicating the condition and the like of a plant and the like all of which are mounted on a mount panel. Thus, with panel devices such as switches and display devices mounted on an operation indicator device, concentrated operation, management and the like of the plant and the like can be performed.

The above typical operation indicator device, however, has the following problem. With more advanced and complicated technologies of the plant of the like, in recent operations, indications and the like become more complicated and diversified. Therefore, there arises a necessity for mounting various kinds of panel devices of various sizes on the operation indicator device. As a result, there is no unity among the various kinds of panel devices on the operation indicator device, and that gives not only a complicated appearance but also a possibility of deterioration in operability and viewability. Further, for later addition of panel devices, the operation indicator device has a poor area efficiency, being unable to allocate more space for addition of panel devices and so on.

In other words, the operation panel as it stands can not respond to the needs of market, i.e., "standardization", and further can not sufficiently respond to "interconnection savings", "labor savings (less labor needed for fabricating and the like)", "open net" or "safety".

SUMMARY OF THE INVENTION

<Objects of The Invention>

The present invention is intended to solve the above problem, and an object of the present invention is to provide an operation indicator device with uniformity of panel units and excellent area efficiency.

Another object of the present invention is to provide an operation indicator device which allows a reduced depth and a simpler manufacturing process therefor, with uniformity in size and shape of used panel units and excellent area efficiency.

<Constitution and Action of The Invention>

The present invention is directed to an operation indicator device for performing at least one of control and management of a predetermined external apparatus. According to the present invention, the operation indicator device comprises: a plurality of panel units (24a to 24f, 34a to 34f, 60, 70, 84a to 84g, 88, 122, 132, 152, 160, 200, 210, 220, U, U1 to U7) each having a polygonal surface (S, 192) whose side is substantially perpendicular to its adjacent side and has a size being substantially an integral multiple of a predetermined reference size (L), the plurality of panel units being placed adjacently to one another so that a whole surface (AS) consisting of all the surfaces of the plurality of panel units should have a predetermined polygonal shape, the polygonal shape of the whole surface having a side which is substantially perpendicular to its adjacent side and has a size being substantially an integral multiple of the predetermined reference size (L): and combining means (22, 32, 82, 90, 92, 94, 124, 126, 128, 136, 156, 162, 174, 641, 645, 647) for combining the plurality of panel units.

Since this gives unify among the panel units, it is possible to place a plurality of panel units orderly without any clearance. That improves operability and viewability. Further, it becomes easier to allocate space for addition of panel units. In short, it is possible to achieve an operation indicator device with unify among the panel units and higher area efficiency.

Preferably, the surface of each of the panel units is rectangular.

That allows easier fabricating, storage and conveyance of the panel units. It becomes easier to obtain a desired polygonal operation indicator device by combination of the panel units. Further, when the panel units are individually mounted on a mount member, it becomes easier to provide a mounting hole since the mounting hole to be provided in the mount member can be rectangular.

Preferably, the whole surface of the plurality of panel units combined with one another is rectangular.

It thereby becomes possible to achieve an operation indicator device with better uniformity and area efficiency on the whole. Storage and conveyance of the whole operation indicator device become easier. Further, when the combined plural panel units are collectively mounted on the mount member, an operation for providing a mounting hole becomes easier since a mounting hold to be provided on the mount member can be rectangular.

Preferably, the combining means comprises a mount member (22, 32) on which each of the plurality of panel units is mounted.

With this, when another panel unit is additionally provided, the panel unit can be easily added by, for example, additionally providing a mounting hole in the mount member.

Preferably, the combining means comprises a combining unit for combining the plurality of panel units with one another to constitute a panel unit combination body; and a mount member (82, 128) on which the panel unit combination body is mounted.

For example, when a mounting hole is provided in the mount member, the hole can be provided with simple operation since only one large hole for mount has to be provided. Further, the kinds and positional relation of the panel units to be combined are freely selected only if the combination can be fitted to the mount member. Therefore, without changing the mount member, the kinds and positional relation of the panel units can be changed.

Preferably, the combining means comprises an engagement portion (124) provided in each of the plurality of panel units, and the plurality of panel units are combined with one another by the medium of the engagement portion.

Since this allows the combined panel units to be handled as a unit, storage, conveyance and mounting operation become easier.

Preferably, the combining means comprises a plurality of unit frames (90) for holding the plurality of panel units, and the plurality of panel units are combined with one another by combining the plurality of unit frames.

Since this allows the combined panel units to be handled as a unit, storage, conveyance and mounting operation become easier. Further, even after the panel units combined with one another are mounted on the mount member, the panel unit can be taken out by removing the panel unit held by the unit frame from the unit frame. That allows easy maintenance, check, exchange and change of the panel unit.

Preferably, the operation indicator device further comprises a sealing member (100) for sealing a clearance between the surfaces of the plurality of panel units in a fluid-tight manner, the sealing member is formed by removing part of a two-dimensional grid, and the two-dimensional grid has a grid pitch substantially corresponding to the reference size.

With this, if the sealing member of a predetermined size having the grid portion is prepared, the sealing member adaptable to the operation indicator devices of various combinations can be obtained by removing an unnecessary grid portion in accordance with the kind and positional relation of the panel units which are constituents.

Preferably, at least one of the plurality of panel units comprises an interunit communication unit (134, 154) for making communication among the plurality of panel units.

This makes it possible to make easy communication between the adjacent panel units by providing the interunit communication unit at a predetermined position of the panel unit.

Preferably, at least one of the plurality of panel units comprises an external communication unit (139) for making communication with the external apparatus.

With this, even if an external apparatus which has to be communicated with the operation indicator device is needed, the communication with the external apparatus can be easily made.

Preferably, at least one of the plurality of panel units is an intermediary panel unit which is connected to another one of the plurality of panel units with an interunit electric-signal path, to indirectly connect another one of the plurality of panel units to the external apparatus.

Even if communication with the external apparatus is needed, the intermediary panel unit makes collective communication with the external apparatus, instead of direct communication between the external apparatus and each of the panel units. Therefore, it is possible to achieve reduction in the number of electric-signal paths for external apparatus, i.e., the interconnection savings.

Preferably, the plurality of panel units (U) are placed adjacently along a single plane to constitute a panel-like panel body (638).

With this, the depth of the operation indicator device can be remarkably reduced as compared with a box-shape control box disposed in a two-layer manner in which the various kinds of panel units are spatially separated on a front-surface door side and a rear-box side, for example.

Preferably, the plurality of panel units are a group of units including a terminal unit (623, 625, 627, 629, 631, 633) for performing at least one of operation input and display and a circuit unit (635) not having an input/output unit on its front-surface side, and interconnection among the panel units of the group of units is completed by a wire (656, 657) attached to the panel body.

That eliminates the need for complicated wiring operation between the panel units on the front-surface door side and the rear-box side, unlike the box-shape control box.

Preferably, a connection end used for the interconnection among the panel units of the group of units and a connection end of a connection line from the group of units to the external apparatus are provided on a rear-surface side of the panel body.

With this, the wiring operation can be performed collectively on the rear-surface side of the panel body and is thereby greatly simplified.

Preferably, at least one of the plurality of panel units is a dummy unit (635, 636, 637) in which the circuit unit is incorporated.

This allows an efficient use of extra space of the operation indicator device and size reduction of the control panel.

Preferably, the terminal unit includes an input unit (625, 627, 629, 631, 633) comprising a plurality of operation switches, and the circuit unit includes a communication unit (635) for converting input signals for control given in parallel by the plurality of operation switches of the input unit into a serial control signal and outputting the serial control signal to the external apparatus.

This allows interconnection savings of the signal line of the communication cable between the external apparatus to be controlled and the control panel.

Preferably, the terminal unit includes a display unit (623) for displaying a predetermined visually-recognized information.

This makes it possible to display the visually-recognized information on the setting and driving condition of the external apparatus to be controlled on the display unit, for example, and thereby perform even a complicated control very well.

Preferably, the terminal unit includes an input unit (625, 627, 629, 631, 633) comprising a plurality of operation switches, and the circuit unit includes a program-type control unit receiving an input signal for control given by the input unit, for giving the external apparatus a command indicating how to control which is determined beforehand in correspondence with the input signal.

With this, even a complicated control can be performed easily through a simple switching operation of the input unit by giving the control unit which receive the input signal for control given by the input unit beforehand a complicated control description determined beforehand in correspondence with the input signal.

Preferably, the circuit unit includes a power supply unit for supplying power to the panel unit that needs a power supply among the group of units.

Since the power supply unit is two-dimensionally combined like other panel units, it is possible to provide the power supply unit without thickening the control panel.

Preferably, at least one (U1) of the plurality of panel units (U1 to U5) comprises: a unit body (722); an input terminal (725) provided removably on the unit body and capable of sending/receiving a signal needed for control of the external apparatus to/from the unit body through a cable or a radio; and a connection unit (749, 755) provided on a front-surface portion of the unit body and the input terminal, for combining the input terminal and the front-surface portion of the unit body to be fixed in response to a mounting operation of the input terminal and releasing the connection between the input terminal and the unit body in response to a removal operation.

This makes it possible to remove the input terminal from the unit body as needed and perform the operation input needed for control of the external apparatus and the like through the input terminal. Since the input terminal is firmly fixed to the front-surface side of the body with the connection unit when the input terminal is mounted on the unit body, it is possible to prevent an inconvenience of operation input due to swing of the input terminal and thereby perform better operation input through the input terminal with the input terminal mounted.

Further, since the connection/disconnection between the input terminal and the unit body is performed with the connection unit in accordance with the mounting/removing operation of the input terminal, it is not needed for an operator to take the trouble to connect/disconnect the input terminal to/from the unit body, and better operability can be achieved.

Preferably, an indicator device body (723) constituted of combination of the unit body and other panel units (U2 to U5) among the plurality of panel units and the input terminal each have a predetermined group of operation switches (SW701 to SW706), and the unit body comprises a detection unit (751) for detecting removal of the input terminal from the unit body to stop receiving the operation input from at least some (SW701 to SW703) of the group of operation switches provided in the indicator device body.

When the input terminal is not mounted, it is possible to prevent confusion of control due to independent operation inputs from both the indicator device body and input terminal by stopping the operation switches of the group of the operation switches in the indicator device body, which has a possibility of confusing the control if the operation inputs are performed independently by the indicator device body and the input terminal.

Further, since it is possible to reliably stop receiving the inputs from the predetermined operation switch in the indicator device body in response to the removing operation and it is not needed for an operator to take the trouble to switch the input receiving condition, better operability can be achieved.

Preferably, the input terminal further comprises a display unit (743) for displaying a predetermined visually-recognized information needed for controlling the external apparatus.

Since the input terminal is provided with the display unit for display the visually-recognized information needed for control, it is possible to display the visually-recognized information on the setting and driving condition of the external apparatus to be controlled on the display unit, for example, and thereby perform even a complicated control very well.

Preferably, a housing recess (733) for housing the input terminal fixed to the unit body with the connection unit is provided on the front-surface portion of the unit body.

This prevents breakage of the input terminal due to an accidental contact with some obstacles with the input terminal mounted and achieves a flat configuration of the front-surface portion of the unit body with the input terminal mounted, making the front-surface portion simple in design.

Preferably, at least part of peripheral portion of the housing recess of the unit body is extended outwardly from an exterior of the input terminal to create a predetermined clearance (761) between the input terminal and an inner peripheral surface of the housing recess.

With this, an operator can insert his hand into the clearances and hold the input terminal to remove it in the removing operation of the input terminal, and better operability in removing the input terminal is achieved.

Preferably, the unit body and the input terminal are connected with a communication cable (745), and the unit body further comprises a cable take-up reel (762) for sending out the communication cable in response to a pulling operation for the communication cable and rewinding the communication cable which is sent out in response to a predetermined operation.

That eliminates the need for taking the trouble to house the communication cable in mounting the input terminal, ensuring better operability, and it is possible to prevent the communication cable from hanging down over the front-surface portion of the panel body and obstructing the operation inputs, with the input terminal mounted. Further, the front-surface portion of the panel body becomes simple and an improvement in design is achieved.

The present invention is also directed to a panel unit (24a to 24f, 34a to 34f, 60, 70, 84a to 84g, 88, 122, 132, 152, 160, 200, 210, 220, U, U1 to U7) mounted on a panel surface of an operation indicator device together with another panel unit, for performing at least one of control and management of a predetermined external apparatus. The panel unit comprises a unit body having a rectangular surface (S, 192) whose side is substantially perpendicular to its adjacent side and has a size being an integral multiple of a reference size (L), which is a constituent of at least part of the panel surface; and combining means (92, 124, 162, 174) for combining the unit body with another panel unit.

Since this provides unity among the panel units, it becomes possible to arrange a plurality of panel units orderly without any clearance. That improves operability and viewability. Further, it is easier to allocate space for additionally providing a panel unit. In other words, the operation indicator device can be provided with unify among the panel units and better area efficiency.

Preferably, the unit body comprises a plurality of panel devices (40) combined with one another.

Since the panel unit is mounted on the mount member, a mounting operation becomes easier than the individual mounting operation for a plurality of panel devices on the mount member.

Preferably, the unit body comprises a collective terminal unit (62, 72) having a plurality of input/output terminals connected to terminals of the plurality of panel devices.

This makes it possible to connect the panel unit to the external apparatus or connect the panel units to one another quickly without soldering and the like by providing a socket or a screwed terminal pad as the collective terminal unit.

Preferably, the unit body comprises a serial terminal for communicating a serial signal; and a signal converting unit (54, 56) for converting a signal between the serial terminal and terminals (44) of the plurality of panel devices (40).

That achieves reduction in the number of the electric-signal paths, i.e., interconnection savings as compared with the individual communications of the plural panel devices with the external apparatus and the communication between the panel units.

Preferably, terminals (44) of the plurality of panel devices (40) are fixed on a printed board (50) and a portion (40a) of each of the panel devices is removable from the terminals.

By fixing the terminal portions of the plural panel devices on the printed board, it is possible to make wiring from the plural panel devices with a print wiring on the printed board. Therefore, the wiring operation can be performed with higher efficiency than the wiring from the plural panel devices with an electric cord.

Further, by separating a portion of the panel device from the terminal portion, only one of the portion of the panel device and the terminal portion can be changed. Therefore, the change cost can be reduced as compared with a constitution where the portion of the panel device and the terminal portion can not be separated. Furthermore, when the panel unit is fixed on the mount member in the portion of the panel device, only the terminal portion can be changed without removing the panel unit from the mount member. Therefore, the change operation can be made with higher efficiency.

Preferably, the combining means comprises a mount frame (162) having an engagement portion, the unit body comprises a first panel device (180) removably held in the mount frame, and the engagement portion can be engaged with another panel unit or another mount frame.

Even with the panel unit mounted on the mount member or the panel units combined with one another, only the panel device can be easily mounted or removed. Therefore, repair, exchange and the like of the panel device can be made more easily by removing only the panel device with the panel unit mounted on the mount member or the panel units combined with one another. In other words, maintenance of the panel device becomes easier.

Preferably, the surface (192) of the panel unit includes a surface (190) of the first panel device and a surface (178) of the mount frame.

With this, if different kinds of mount frames are prepared in correspondence with different kinds of panel devices having surfaces of different sizes, the panel units having surfaces of the same size can be obtained by combining the corresponding panel units and mount frames. Therefore, if the surface of the panel device is not larger in size than the surface of the panel unit, the panel unit can be handled as a regular-shape one having a surface of predetermined size, regardless of the size of the surface of the panel device.

Preferably, a second panel device (168, 170) is mounted on the mount frame.

If the surface of the panel unit is larger is size to some extent than the surface of the first panel device, an effective use of the operation indicating surface of the operation indicator device can be made by providing the second panel device in an available space on the surface of the panel unit.

Preferably, the first panel device and the second panel device are connected with an electric-signal path and an input or an output can be made between the first panel device and the outside of the panel unit through the second panel device.

This allows the input or the output to the first panel device from the side of the operation indicating surface of the operation indicator device through the second panel device. Therefore, it becomes much easier to make the input or the output to the first panel device.

Preferably, an electrical function element is further mounted on the mount frame, and the first panel device or other panel units and the electrical function element can be electrically connected with the electric-signal path.

If the panel unit is larger in size to some extent than the held panel device, an effective use of space in the panel unit can be made by mounting the electrical function element on an available space of the panel unit. Further, more effective maintenance and exchange of the panel device can be made by mounting the electrical function element which requires maintenance and exchange with low frequency on the mount frame separately from the electrical function element which requires maintenance and exchange with high frequency.

Preferably, the panel unit further comprises a veneer (204) for substantially covering the whole surface of the panel unit.

That makes it possible to keep the appearance fine by covering the surface of the panel unit with the veneer even if the surface of the panel unit is not in a very good condition.

Preferably, the unit body comprises a panel device, and an indication (204*b*) in accordance with a function of the panel device is attached to the veneer.

Even when a plurality of panel devices are provided on one panel unit, it is not necessary to provide an overlay sheet for each panel device and fabricating cost is thereby reduced.

Preferably, an indication (216*a*, 216*b*) in accordance with a function of another panel unit in the vicinity of the panel unit is attached to a surface of the panel unit.

Even if it is hard to attach indication on another panel unit in the vicinity of the panel unit, the indication can be attached by using an available space on the surface of the adjacent panel unit. For example, when the panel unit is a dummy unit having no panel device, the indication in accordance with the function of another panel unit in the vicinity can be attached in a large size by using the whole surface of the panel unit. Therefore, the operation indicator device with better view ability in operating another panel device in the vicinity is achieved.

In the present invention, the "surface of panel unit" refers to a surface of a panel unit which exists on an operation indicating surface of the operation indicator device. This corresponds to a surface S of FIG. 2(A) in the preferred embodiment.

The "panel device" refers to a device mounted on the operation indicating surface of the operation indicator device for inputting or outputting something. This corresponds to a switch 40 of FIG. 5(A) in the preferred embodiments.

The "surface of panel device" refers to a surface of a panel device which exists on the operation indicating surface of the operation indicator device. This corresponds to a surface 190 of FIG. 24 in the preferred embodiments.

The "mount frame refers to a frame for holding a panel device, including one in which at least some of its surfaces exist on the operation indicating surface of the operation indicator device and one in which none of its surfaces exists on the operation indicating surface of the operation indicator device. This corresponds to an adapter 162 of FIG. 24 in the preferred embodiments.

The "surface of mount frame" refers to a surface of a mount frame which exists on the operation indicating surface of the operation indicator device. This corresponds to a surface 178 of FIG. 24 in the preferred embodiments.

The "electrical function element" refers to an element having some electrical function, including the panel device and an element which does not make an external input or output, such as a battery and an IC. This corresponds to a slot for memory card 168 and a loader port 170 of FIG. 30 in the preferred embodiments.

The "mount member" refers to an object on which the panel unit, the panel device and the like are mounted. This corresponds to a mount panel 22 of FIG. 1 in the preferred embodiments.

The "communication" refers to sending and receiving of electric signals and power, irrespective of whether a cable or a radio.

The "electric-signal path" refers to a path for sending and receiving electric signals and power, irrespective of whether a cable path or a radio path. This corresponds to a through hole 138 and the like of FIG. 22(A) in the preferred embodiments.

"Being combined through an electric-signal path" refers to that two or more objects send or receive electric signals and power through the electric-signal path to or from one another.

These and other objects and features of the present invention will become more apparent from the following detailed description.

BRIEF DESCRIPTION OF THE DRAWINGS

FIG. 4(A) is a rear elevation of a panel unit 24c, FIG. 4(B) is a plan view of the panel unit 24c and FIG. 4(C) is a front elevation of the panel unit 24c;

FIG. 8(A) is a rear elevation of a panel unit 60 in accordance with a second preferred embodiment of the present invention, FIG. 8(B) is a plan view of the panel unit 60 and FIG. 8(C) is a front elevation of the panel unit 60;

FIG. 9(A) is a plan cross section of the panel unit 60 and FIG. 9(B) is a right-side cross section of the panel unit 60;

FIGS. 14(A), 14(B), 14(C) and 14(D) are views showing a process of combining a plurality of unit frames 90;

FIG. 22(A) is a view abbreviatedly showing a cross-sectional structure of an operation indicating panel 130 in accordance with a fifth preferred embodiment of the present invention and FIG. 22(B) is a view abbreviatedly showing a cross-sectional structure of an operation indicating panel 140 in accordance with a variation of the fifth preferred embodiment;

FIG. 27(A) is a right-side view of the adapter 162 and FIG. 27(B) is a rear elevation of the adapter 162;

FIG. 28(A) is a front elevation of a liquid crystal display 180 used in the panel unit 160 and FIG. 28(B) is a bottom view of the liquid crystal display 180;

DESCRIPTION OF THE PREFERRED EMBODIMENTS

<The First Preferred Embodiment>

Figure 1:
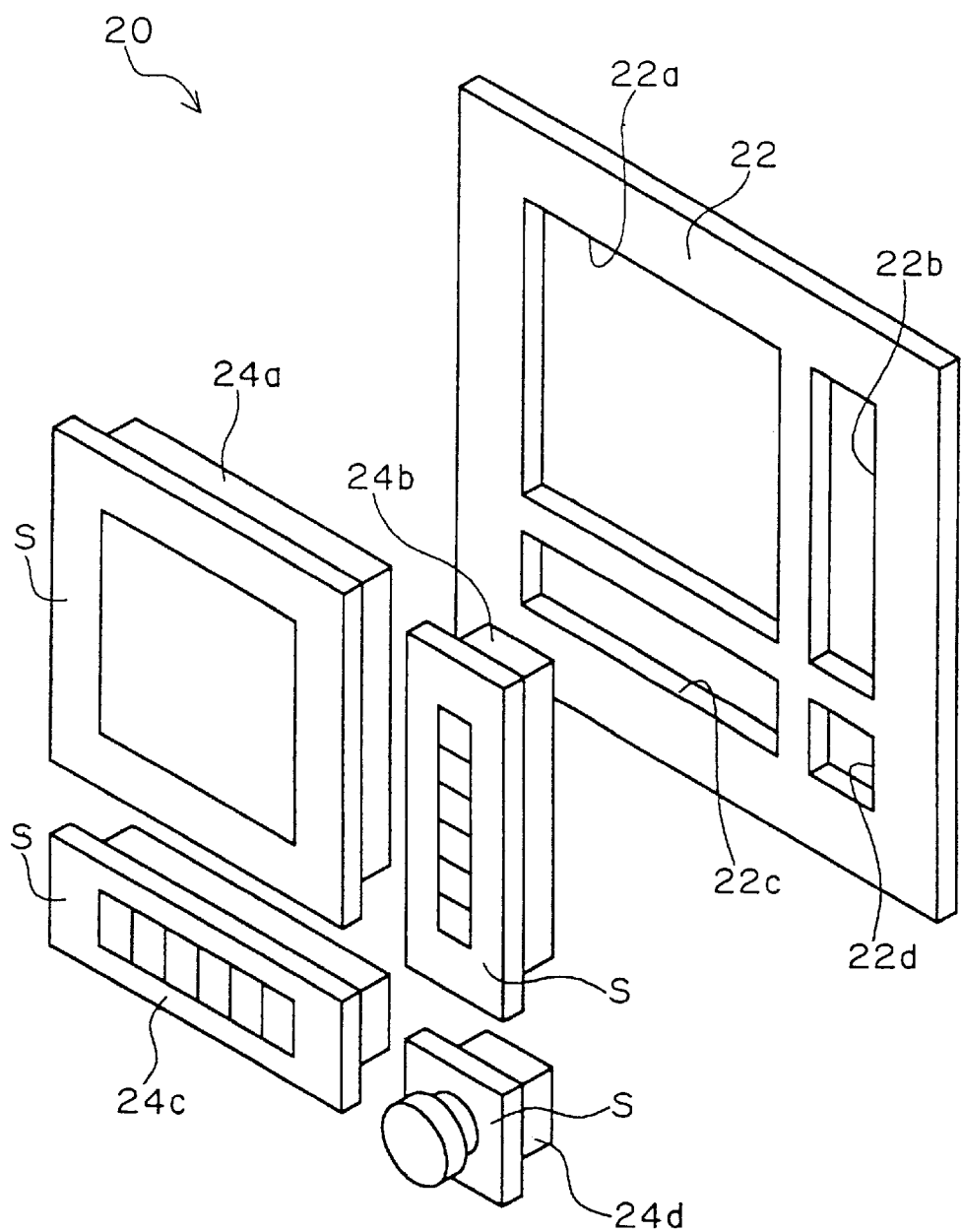
FIG. 1 is an exploded perspective view of an operation indicator device in accordance with a first preferred embodiment of the present invention, i.e., an operation indicating panel 20.

FIG. 1 is an exploded perspective view of an operation indicator device in accordance with the first preferred embodiment of the present invention, i.e., an operation indicating panel 20. The operation indicating panel 20 is used for concentrated operation, management and the like of the plant, machine tool and the like.

The operation indicating panel 20 comprises a plurality of panel units 24a, 24b, 24c, and 24d. The panel unit 24c is a liquid crystal display, the panel unit 24b is a vertical switch unit combining a plurality of switches, the panel unit 24c is a horizontal switch unit and the panel unit 24d is a push-button switch. The plural panel units 24a to 24d are mounted to a mount member provided on an appropriate portion of the plant, the machine tool and the like (not shown), i.e., a mount panel 22. The mount panel 22 is provided with a plurality of mounting holes 22a, 22b, 22c and 22d, to which the panel units 24 to 24d are mounted, respectively.

Figure 2A:
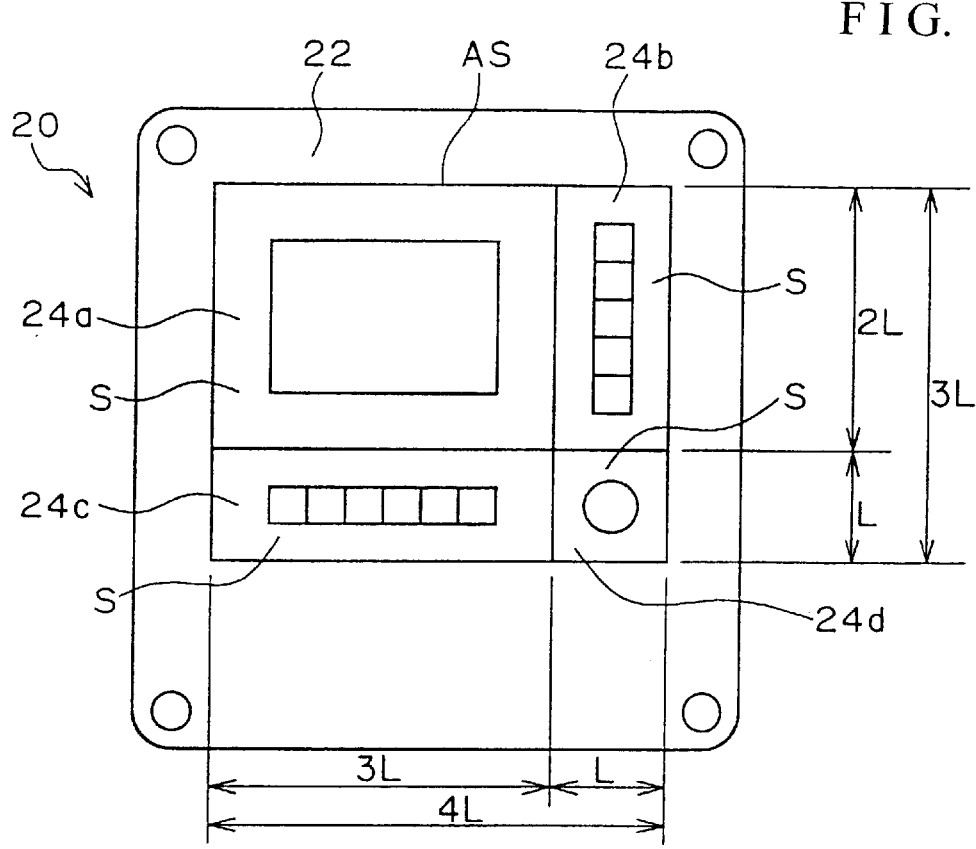
FIG. 2(A) is a front elevation of the operation indicating panel 20 and FIG. 2(B) is a front elevation of the operation indicating panel 20 with panel units added later.

FIG. 2(A) is a front elevation of the operation indicating panel 20. Respective surfaces S of the panel units 24a to 24d constituting the operation indicating panel 20 each have a rectangular shape with length and width of m1·L×m2·L (L: reference size, m1 and m2: positive integers). For example, a surface S of the panel unit 24a has a rectangular shape with length and width of 2·L×3·L.

The panel units 24a to 24d are disposed so that these surfaces S may be adjacent to one another and a whole surface AS consisting of the respective surfaces S of the panel units 24a to 24d has a rectangular shape with length and width of n1·L×n2·L (n1 and n2: positive integers). In the example of FIG. 2(A), the whole surface AS of the operation indicting panel 20 has a rectangular shape with length and width of 3·L×4·L.

It is convenient to adopt a minimum size needed for finger operation or a minimum size needed for the indicator lamp and the like as the reference size L. For example, as the reference size L, L=12 mm, L=24 mm, L=48 mm or the like is possible. In this preferred embodiment, considering the minimum size of a panel device which is relatively often used, such as a push-button switch, the reference size L is assumed to be 48 mm. Adopting a standard size according to DIN (Deutsche Industire-Norm), ISO (International Organization for Standardization), JIS (Japanese Industrial Standard) or the like is more convenient because standardization of size is achieved.

Thus, standardization of shape and size of the panel unit makes it possible to place the plural panel units 24a to 24d orderly without any clearance and improve operability and viewability. Further, this gives unity in design and a good appearance.

Figure 2B:
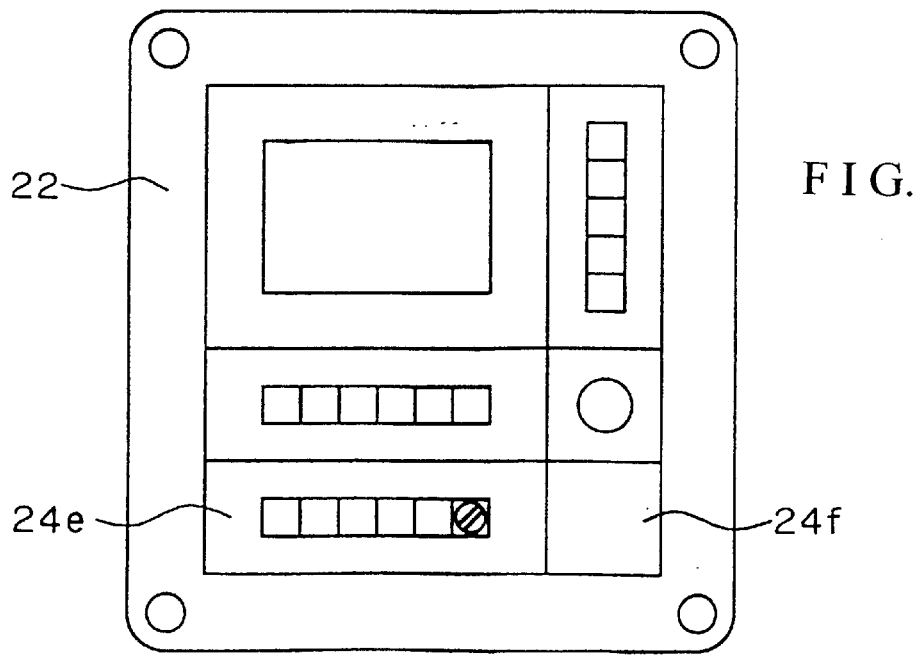

Even when it is needed to additionally provide a panel unit 24e later as shown in FIG. 2(B), a space needed for additional provision can be easily allocated. In other words, excellent area efficiency is achieved. Further, later additional provision of a panel unit 24f does not break the unify of design. The panel unit 24f is a dummy unit having no panel device, such as a switch and a lamp. Providing the dummy unit keeps the unify of design from breaking.

The rectangular surface S of each of the panel units 24a to 24d allows easy manufacture, storage and conveyance of each of the panel units 24a to 24d. Further, it becomes easier to obtain the operation indicating panel 20 having the whole surface AS of desired rectangular shape by combining the panel units 24a to 24d. Furthermore, since the mounting holes 22a to 22d (see FIG. 1) used for mounting the panel units 24a to 24d on the mount panel 22 can be rectangular, the mounting holes 22a to 22d can be provided through simple operation.

Since the whole surface AS of the operating indicating panel 20 is rectangular, the operation indicating panel 20 has better unify and better area efficiency as a whole. This allows easy storage and conveyance of the whole operation indicating panel 20.

Since the plural panel units 24a to 24d are individually mounted on the mount panel 22, when the panel units 24c and 24f are additionally provided later, as shown in FIG. 2(B), these panel units can be easily added simply by additionally providing mounting holes (not shown) in the mount panel 22.

Figure 3:
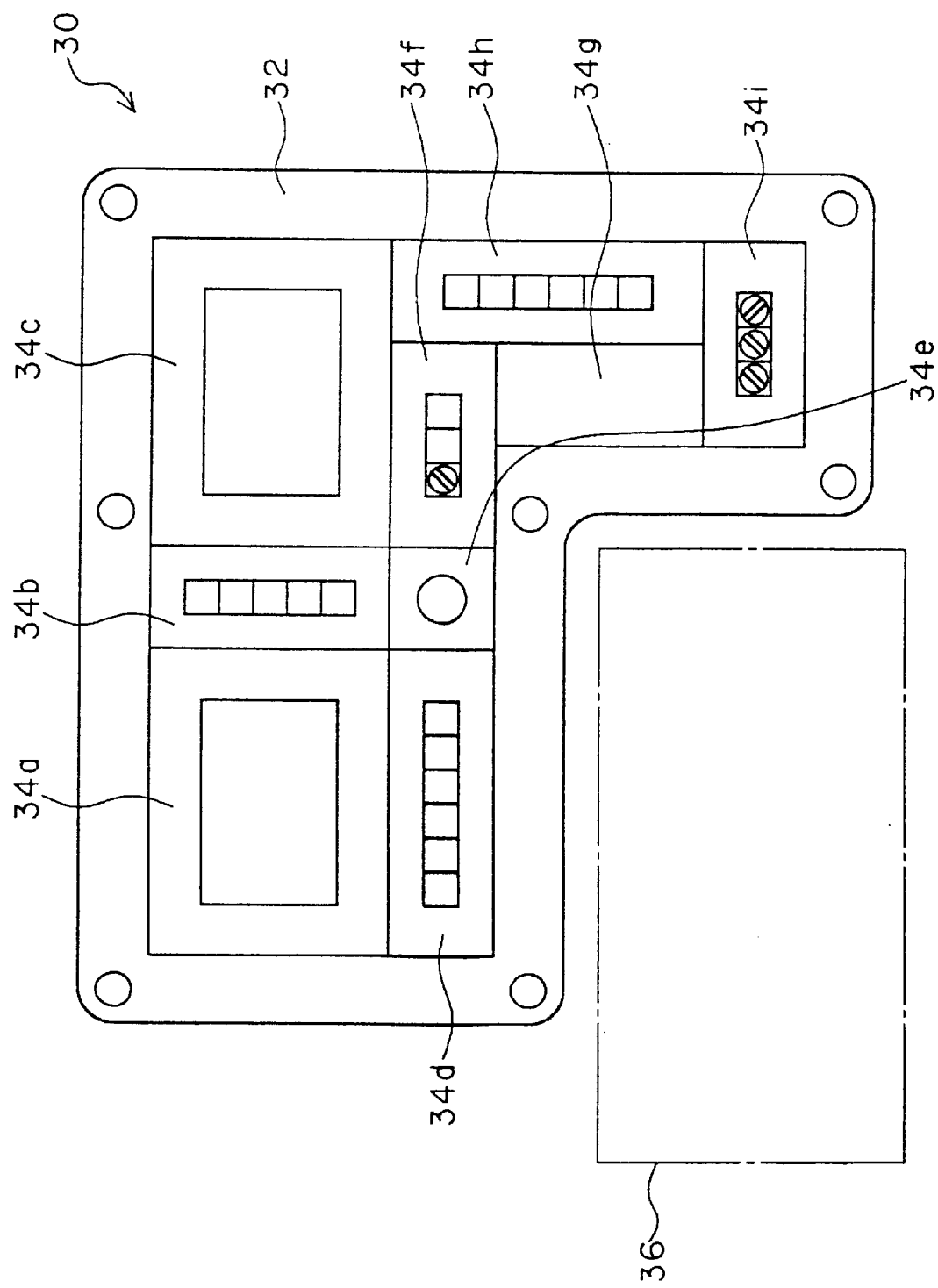
FIG. 3 is a front elevation of an operation indicating panel 30.

Though the above preferred embodiment has been discussed taking the operation indicating panel 20 with the whole surface AS of a rectangle as an example, the shape of the whole surface AS is not limited to rectangle. As a variation of the above preferred embodiment, the whole surface AS of the operation indicating panel may be formed in a substantial "L" shape. FIG. 3 is a front elevation of an operation indicating panel 30 of this example.

Nine panel units 34a to 34i are mounted on mount panel 32 so that the whole surface AS of the operation indicating panel 30. Even if some obstacle 36 is placed near the operation indicating panel 30, with this configuration, the operation indicating panel 30 can be disposed on a predetermined position while avoiding the obstacle 36.

The shape of the whole surface AS of the operation indicating panel is not particularly limited. According to a placement condition, the whole surface AS can be formed in a predetermined polygon such as substantial "U" shape, rectangular ring and stepped shape.

Though the above preferred embodiment has been discussed taking the rectangular surface S of the panel unit as an example, the surface S of the panel unit may be formed in a polygon such as substantial "L" shape according to the function of the panel unit and the like.

FIGS. 4 to 7 are views for explanation of the panel unit 24c of FIG. 4(A) is a rear elevation of the panel unit 24c, FIG. 4(B) is a plan view of the panel unit 24c and FIG. 4(C) is a front elevation of the panel unit 24c. FIG. 5(A) is a plan cross section of the panel unit 24c and FIG. 5(B) is a right-side cross section of the panel unit 24c.

Figures 5A, 5B:
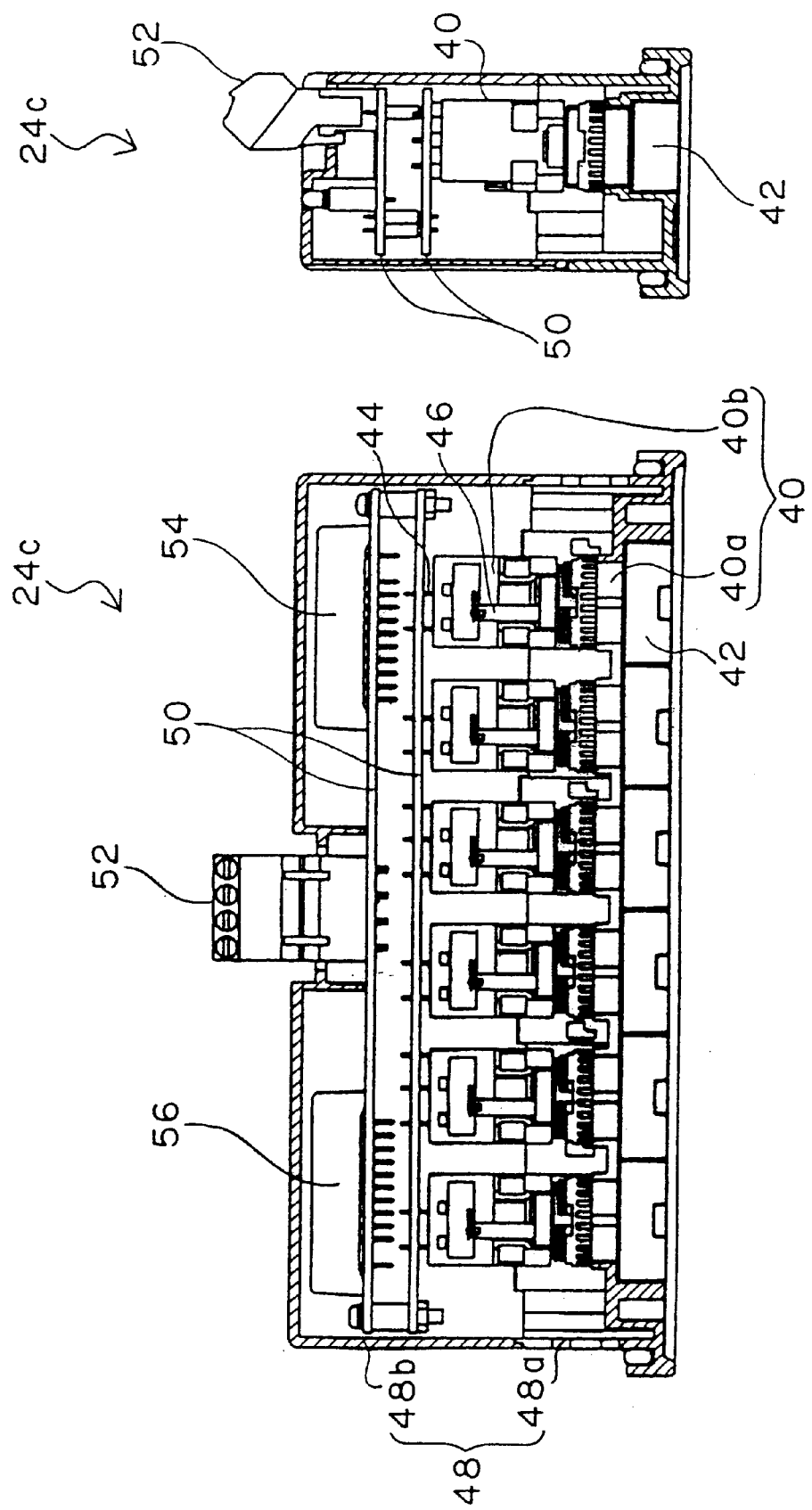
FIG. 5(A) is a plan cross section of the panel unit 24c and FIG. 5(B) is a right-side cross section of the panel unit 24c.

As shown in FIG. 5(A), the panel unit 24c comprises six switches 40 which are panel devices and combined with one anther. Since the plural switches 40 are combined together to constitute the panel unit 24c, the switches 40 can be mounted on the mount panel 22 (see FIG. 1) as the panel unit and the mounting operation becomes easier as compared with a case where the plural switches 40 are individually mounted on the mount panel 22.

The switch 40 consisting of a front portion 40a having a push button 42 and a rear portion 40b having a terminal 44, which are separated by operating a switching lever 46. The panel unit 24c comprises a case 48 which has such a structure as can be divided into a front portion 48a and a rear portion 48b. The front portions 40a of the six switches 40 are mounted on the front portion 48a of the case 48. The terminals 44 on the rear portions 40b of the six switches 40 are fixed to a printed board 50 by soldering.

Figure 6:
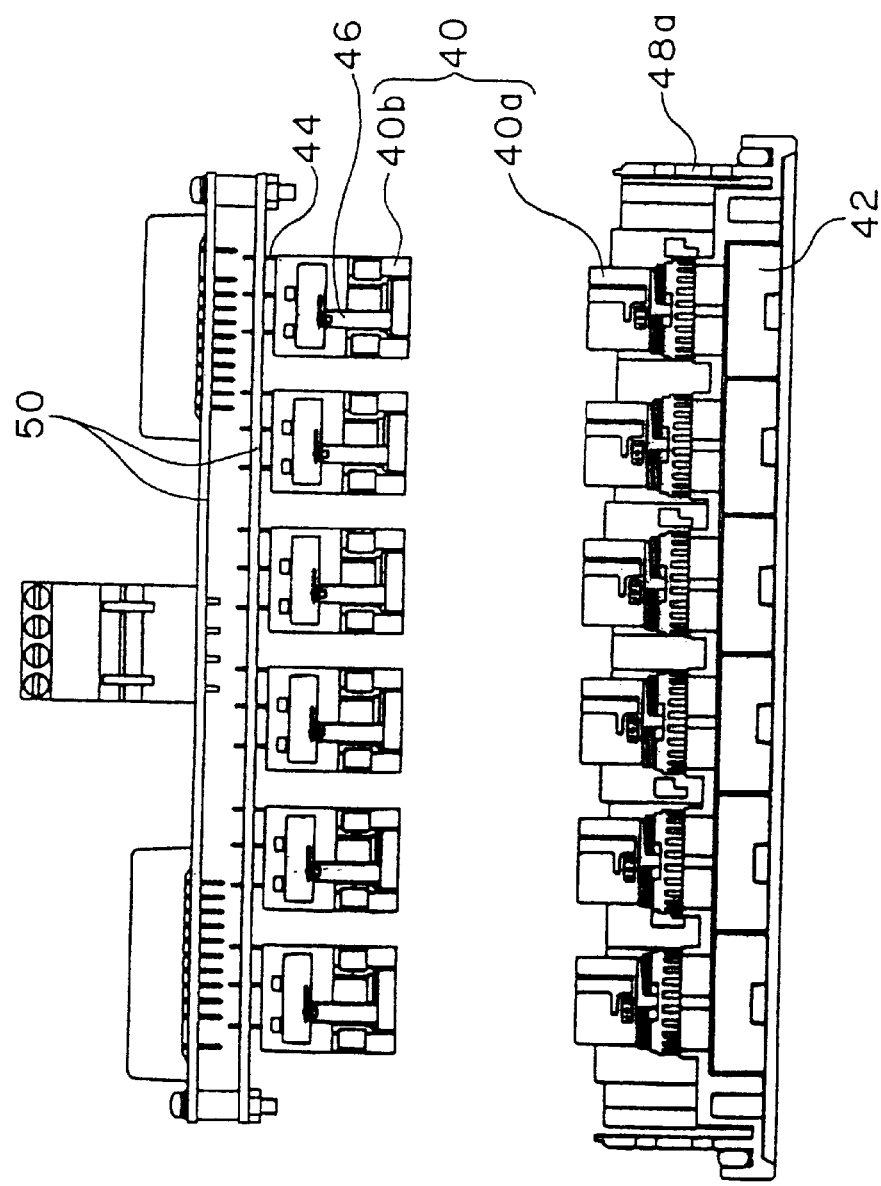
FIG. 6 is a view showing a state where the panel unit 24c is separated back and forth.

Therefore, by removing the rear portion 48b of the case 48 and operating the switching lever 46, the front portions 40a of the six switches 40 and the rear portions 40b of the six switches 40 soldered on the printed board 50 can be separated as shown in FIG. 6.

With this constitution, only one of the front portion 40a and the rear portion 40b of the switch 40 can be changed. Therefore, changing cost is lowered as compared with a constitution where the front portion 40a and the rear portion 40b of the switch 40 can not be separated. Further, when the front portion 48a of the case 48 of the panel unit 24c is fixed on the mount panel 22 (see FIG. 1), only the rear portion 40b can be changed without removing the panel unit 24c from the mount panel 22. This allows a change operation with high efficiency.

The switch 40 is a multifunction switch and the push button 42 incorporates a illuminating lamp (not shown). The incorporated illuminating lamp can be turned on/off according to the operation for the push button 42 or independently of the operation for the push button 42.

The printed board 50 is of two-sheet structure, and a serial terminal 52 for communicating a serial signal and a sending unit 54 and a receiving unit 56 for converting signals are soldered to a printed board other than that to which the terminal 44 is fixed by soldering. The terminal 44, the serial terminal 52, the sending unit 54 and the receiving unit 56 of the switch 40 are appropriately connected through a printed wiring (not shown) formed on the printed board 50. Thus, by using the printed wiring on the printed board 50, the wiring operation can be made with higher efficiency than using an electric cord. As shown in FIG. 4(A), the serial terminal 52 comprises four terminals 52a to 52d, i.e., an input terminal, an output terminal, a power-supply terminal and a ground terminal.

Figure 7A:
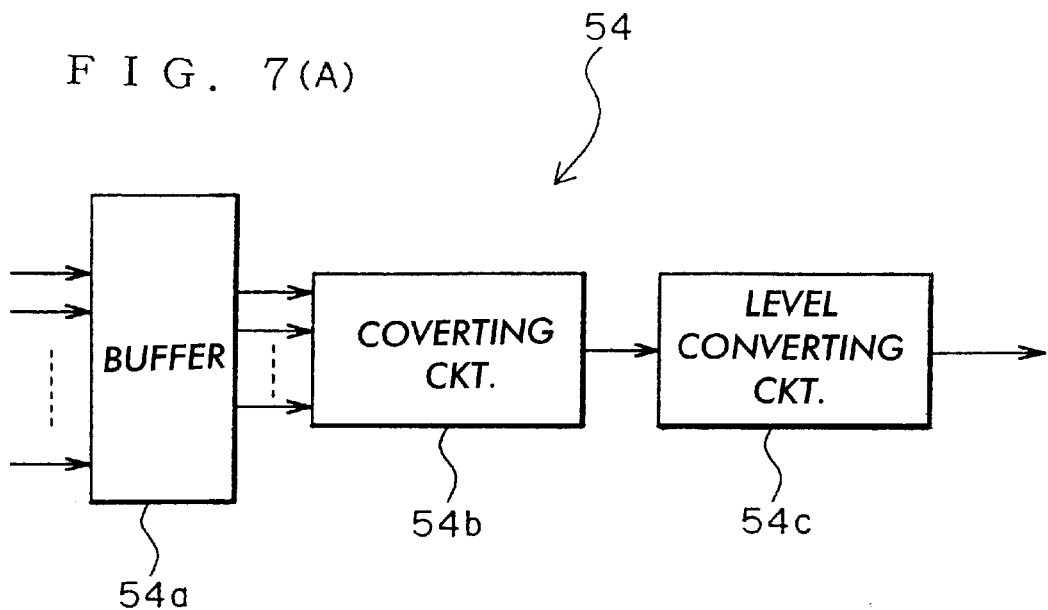
FIG. 7(A) is a block diagram showing a control circuit of a sending unit 54 and FIG. 7(B) is a block diagram showing a control circuit of a receiving unit 56.

FIG. 7(A) is a block diagram showing a control circuit of the sending unit 54. Signals (parallel signals) from the terminal 44 of each switch 40 see FIG. 5(A)) is once held in a buffer circuit 54a. A parallel/serial converting circuit 54b converts the parallel signals held in the buffer circuit 54a into a serial signal. A level converting circuit 54c adjusts the level of the obtained serial signal and thereafter outputs it to the serial terminal 52.

Figure 7B:
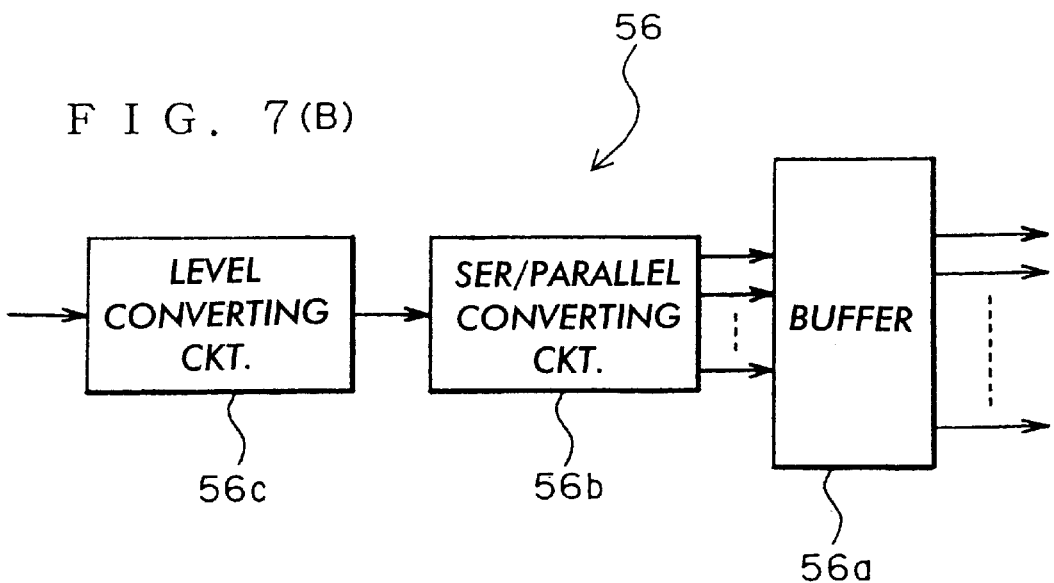

FIG. 7(B) is a block diagram showing a control circuit of the receiving circuit 56. The serial signal inputted from the serial terminal 52 (see FIG. 5(A)) is transmitted through a level converting circuit 56c to a serial/parallel converting circuit 56b, where the serial signal is converted into parallel signals to be outputted through a buffer circuit 56a to the terminal 44 of each switch 40.

The constitution in which the parallel signals corresponding to the terminals 44 of the switches 40 are converted into the serial signal to collectively make communication with external apparatus and other panel units reduces the number of wires as compared with a case where the switches 40 individually make communications with the external apparatus and the panel units make communications with one another. In short achieved is interconnection savings.

<The Second Preferred Embodiments>

FIGS. 8 and 9 are views for explanation of a panel unit 60 in accordance with the second preferred embodiment of the present invention. FIG. 8(A) is a rear elevation of the panel unit 60, FIG. 8(B) is a plan view of the panel unit 60, and FIG. 8(C) is a front elevation of the panel unit 60. FIG. 9(A) is a plan cross section of the panel unit 60 and FIG. 9(B) is a right side cross section of the panel unit 60.

As shown in FIG. 9(A), the panel unit 60 comprises six switches 40 connected to one another and has a constitution like that of the panel unit 24c of FIG. 5(A). The panel unit 60, however, comprises a collective terminal unit, i.e., a connector 62, which is means for making communication with the external apparatus and mutual communication of the panel units as shown in FIG. 9(A).

The connector 62 is fixed to a printed board 64 by soldering. The connector 62 comprises twenty-six pins 62a to 62z (see FIG. 8(A)) serving as input/output terminals. The terminals 44 of the six switches 40 and the pins 62a to 62z are appropriately connected through a printed wiring (not shown) formed on the printed board 64. Unlike the aforementioned panel unit 24c (see FIG. 5(A)), the connector 62 of the panel unit 60 is a parallel input/output terminal in which the pins 62a to 62z and the terminals 44 of the switches 40 are connected in a one to-one correspondence.

The constitution to make communications with the external apparatus by using the connector 62 allows faster connection with the external apparatus and the like without soldering or the like in mounting or maintenance operation of the panel unit 60.

<The Third Preferred Embodiment>

Figure 10A:
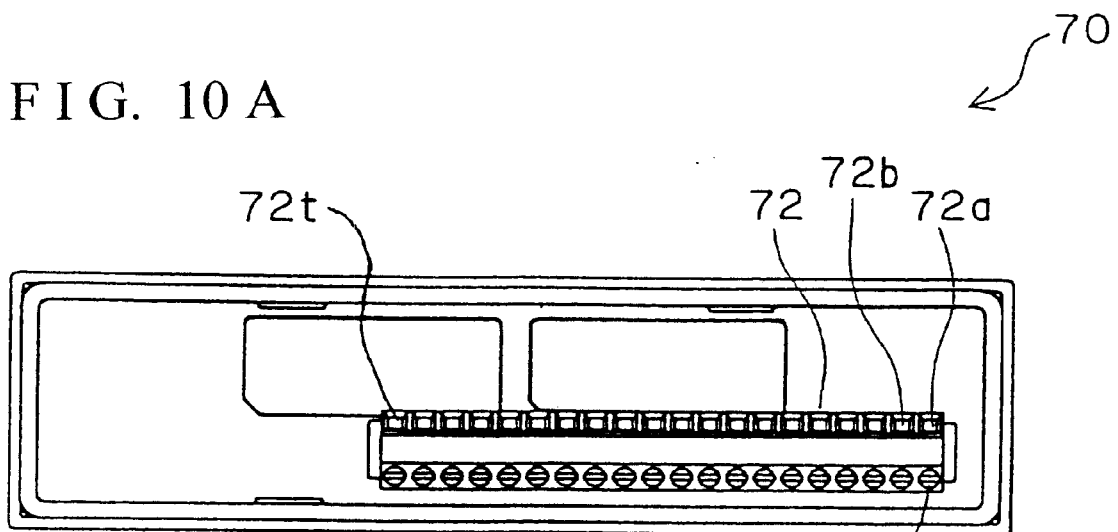
FIG. 10(A) is a rear elevation of a panel unit 70 in accordance with a third preferred embodiment of the present invention.
Figure 10B:
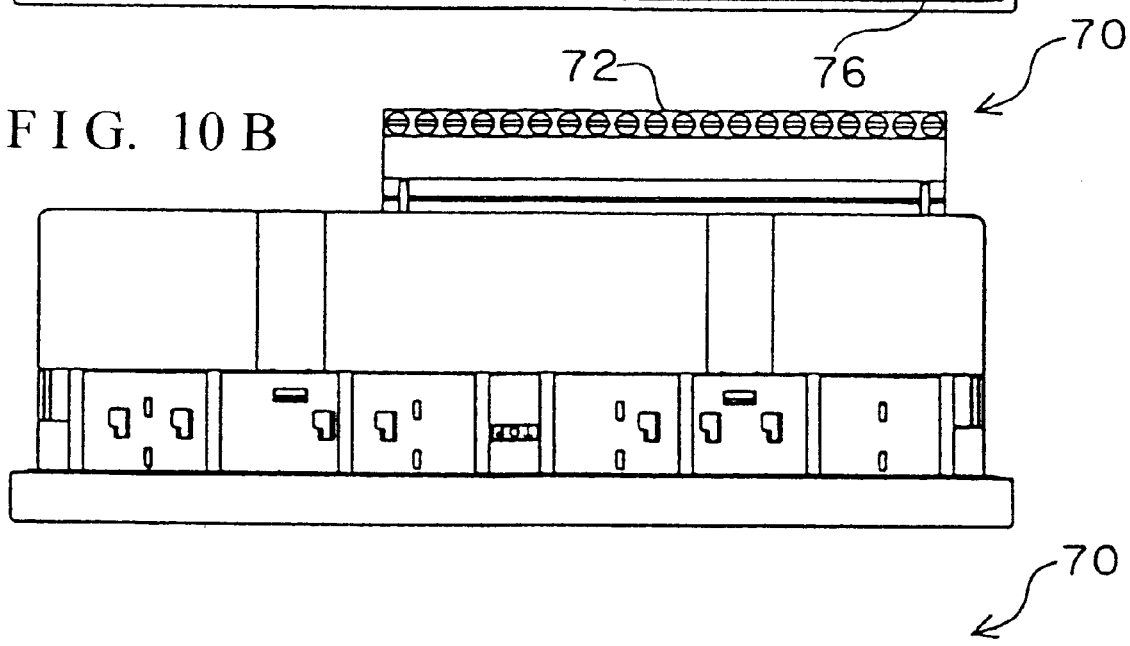
FIG. 10(B) is a plan view of the panel unit 70 and FIG. 10(C) is a front elevation of the panel unit 70.
Figure 10C:
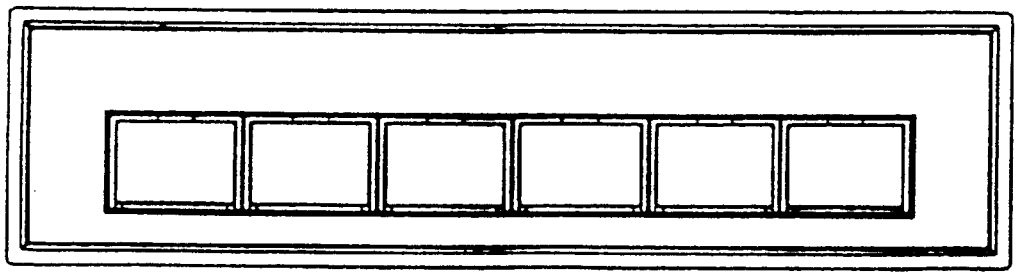
Figure 11B:
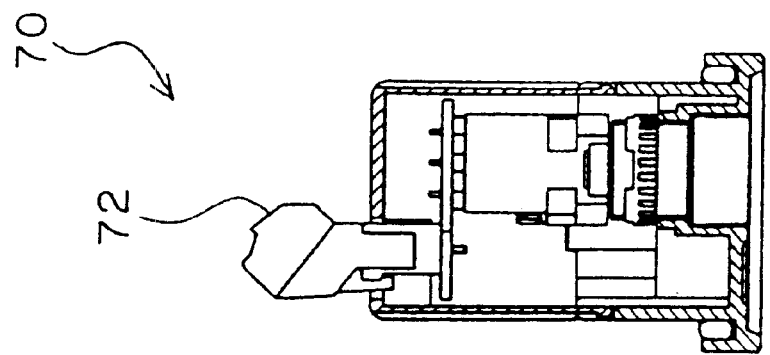
FIG. 11(A) is a plan cross section of the panel unit 70 and FIG. 11(B) is a right-side cross section of the panel unit 70.
Figure 11A:
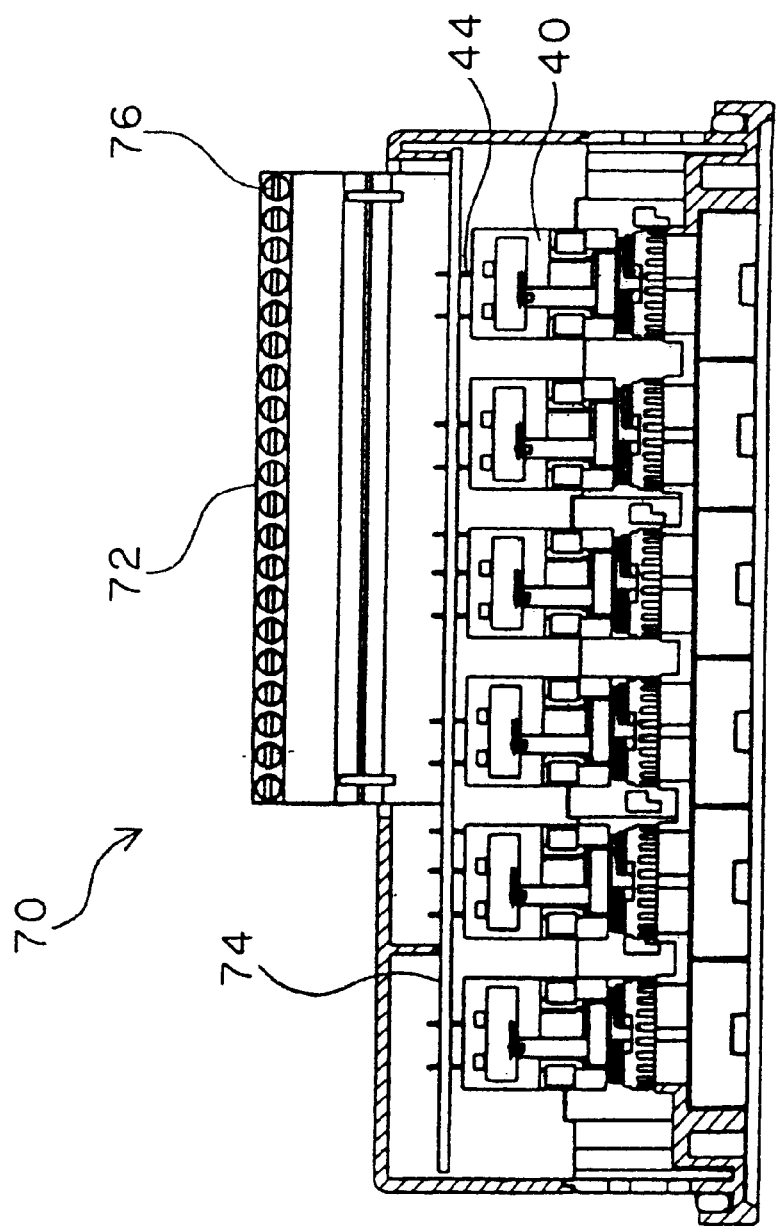

FIGS. 10 and 11 are views for explanation of a panel unit 70 in accordance with the third preferred embodiment of the present invention. FIG. 10(A) is a rear elevation of the panel unit 70, FIG. 10(B) is a plan view of the panel unit 70, and FIG. 10(C) is a front elevation of the panel unit 70. FIG. 11(A) is a plan cross section of the panel unit 70 and FIG. 11(B) is a right-side cross section of the panel unit 70.

As shown in FIG. 11(A), the panel unit 70 has a constitution like that of the panel unit 60 of FIG. 9(A). The panel unit 70, however, comprises a collective terminal unit, i.e., a terminal pad 72, which is means for making communication with the external apparatus and mutual communication of the panel units, unlike the panel unit 60 which comprises the connector 62.

The terminal pad 72 is fixed on a printed board 74 by soldering. The terminals pad 72 comprises twenty terminals 72a to 72t serving as input/output terminals. The terminals 44 of the six switches 40 and the pins 72a to 72t are appropriately connected through a printed wiring (not shown) formed on the printed board 74. Like the aforementioned panel unit 60 (see FIG. 9(A)), the terminal pad 72 of the panel unit 70 is a parallel input/output terminal.

The constitution to make communications with the external apparatus by using the terminal pad 72 allows electrical (not shown) to be connected to the terminals 72a to 72t one by one. That eliminates the need for using a connector or the like in mounting or maintenance operation of the panel unit 70 and ensures flexibility. Further, since the electrical cord for connection and the terminal 72a are connected by a screw 76 provided on the terminal pad 72, there is no need for soldering in connection or the like.

Through the front portions 40a of the six switches 40 mounted on the front portion 48a of the case 48 and the rear portions 40b of the six switches 40 soldered on the printed board 50 can be separated from each other as shown in FIG. 6 in the above preferred embodiments, there may be a constitution where these can not be separated.

Further, though the multi-function switches 40 are taken as an example of a plurality of panel devices constituting the panel unit, the plural panel devices are not limited to these. For example, simple push buttons, selector switches, keylike switches, indicator lamps and the like can be used as the plural panel devices. Furthermore, a panel unit can be constituted of different types of panel devices.

<The Fourth Preferred Embodiment>

Figure 12:
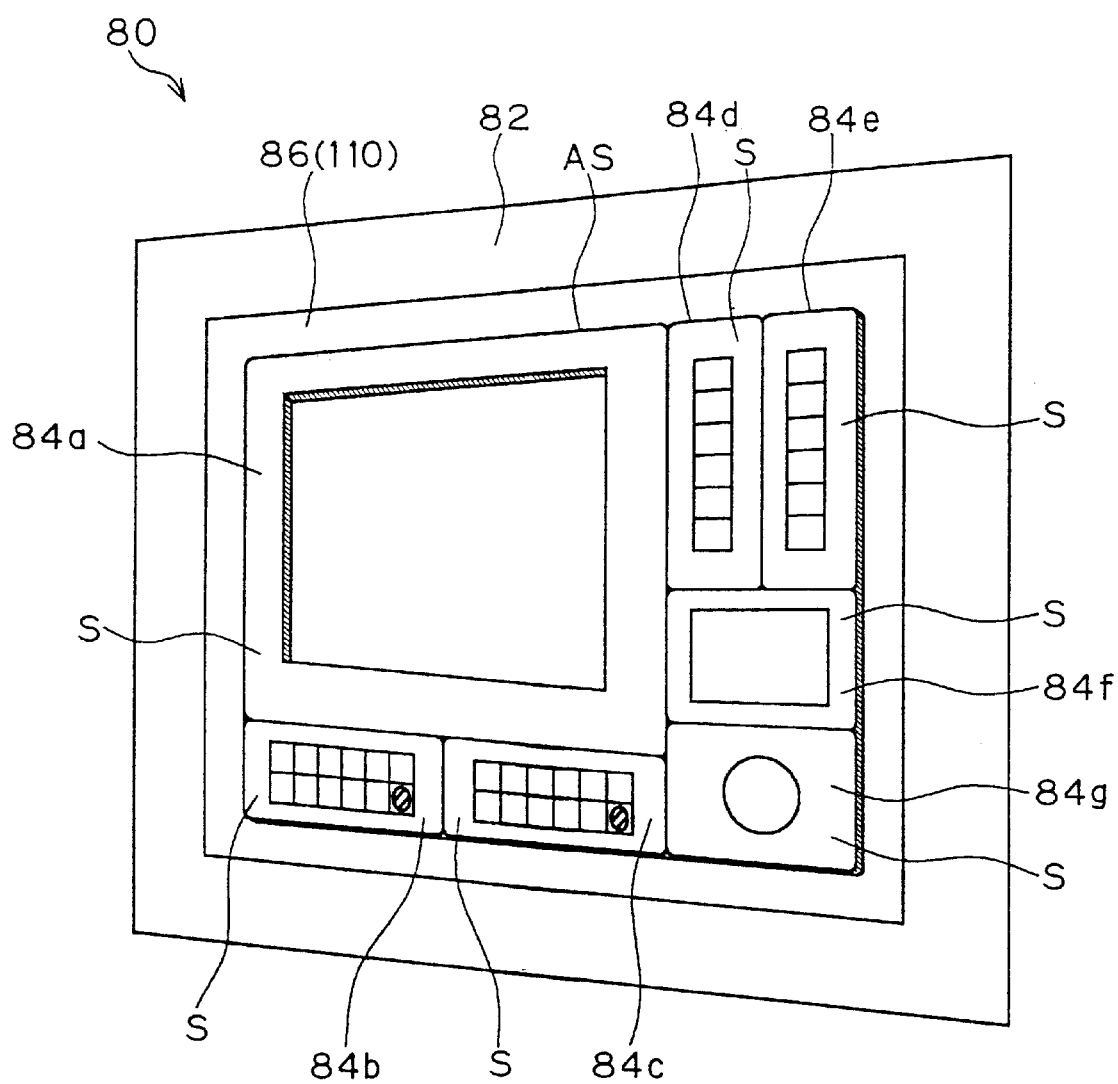
FIG. 12 is a perspective view of an operation indicator device in accordance with a fourth preferred embodiment of the present invention, i.e., an operation indicating panel 80.

FIG. 12 is a perspective view of an operation indicator device in accordance with the fourth preferred embodiment of the present invention, i.e., an operation indicating panel 80. Like the aforementioned operation indicating panel 20 (see FIG. 1), the operation indicating panel 80 comprises a plurality of panel units 84a to 84g.

Respective surfaces S of the panel units 84a to 84g constituting the operation indicating panel 80 each have a rectangular shape with length and width of m1·L×m2·1. (L: reference size, m1 and m2: positive integers) the panel units 84a to 84g are disposed so that these surfaces S may be adjacent to one another and a whole surface AS of the operation indicating panel 80 has a rectangular shape with length and width of n1·L×n219 L (n1 and n2: positive integers), like the aforementioned operation indicating panel 20.

Though the plural panel units 24a to 24d are individually mounted on the mount panel 22 in the operation indicating panel 20 (see FIG. 1), the plural panel units 84*a* to 84*g* are combined and collectively mounted on a mount panel 82.

FIGS. 13 to 17 are views for explanation of a structure in the case of a rear-side mounting (mounting from the side of X2 of FIG. 13) of the operation indicating panel 80 shown in FIG. 12. In FIGS. 13 to 17, for convenience of illustration, the operation indicating panel 80 comprises four panel units 88 each having the surface S of the same size (square of 2·L×2·L).

Figure 13:
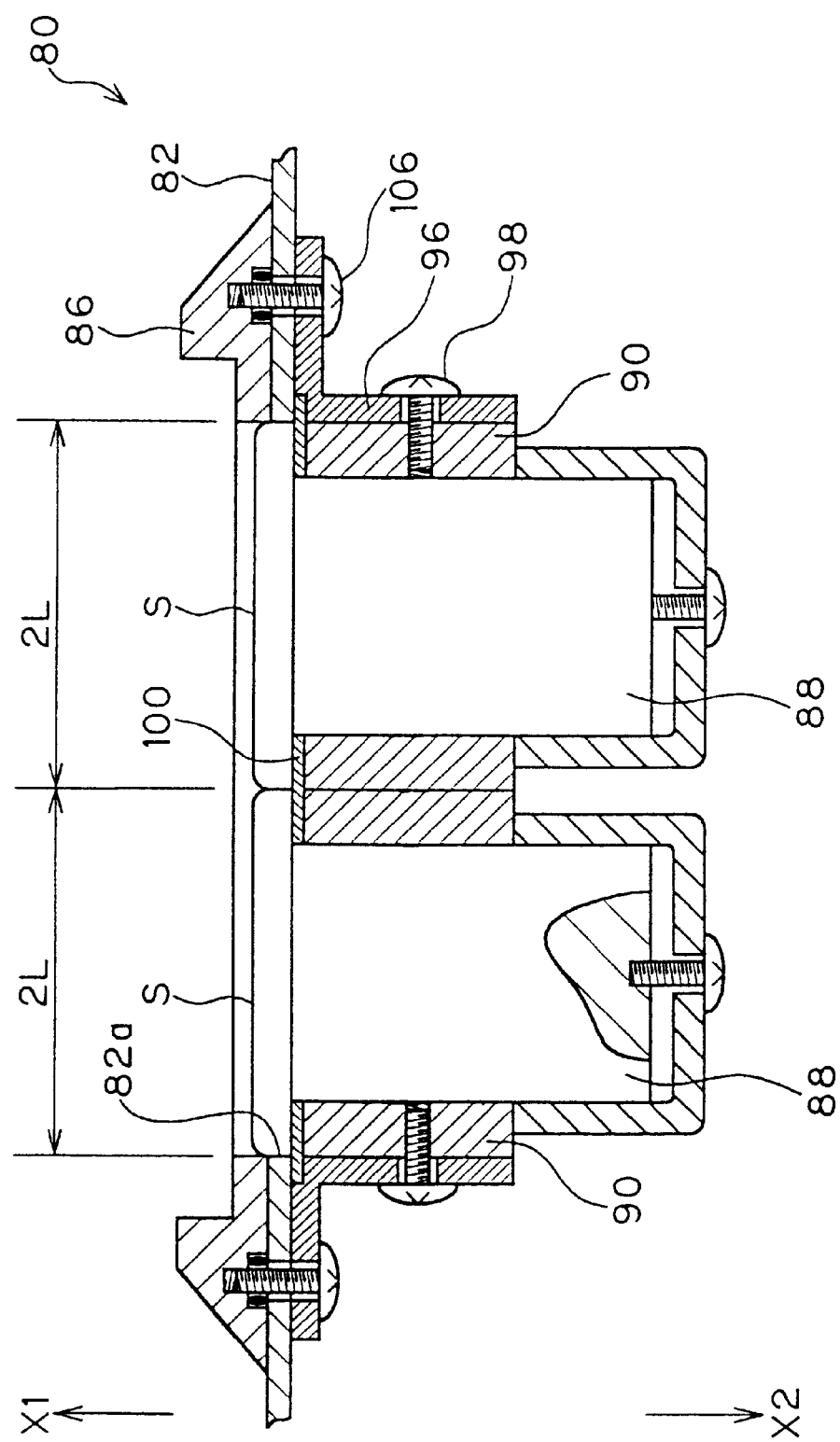
FIG. 13 is a view showing a cross-sectional structure of the operation indicating panel 80 in a case of rear-side mounting.

FIG. 13 is a view showing a cross-sectional structure of the operation indicating panel 80 in the case of rear-side mounting. The operation indicating panel 80 comprises a plurality of unit frames 90. The plural unit frames 90 are combined with one another. The panel unit 88 is inserted in each of the unit frames 90 and held therein. With such a constitution, the plural panel units 88 are combined with one another by the medium of the unit frames 90. Though the panel unit 88 and the unit frame 90 are regarded as separate components herein, the unit frame 90 may be regarded as part of the panel unit 88.

Figure 15:
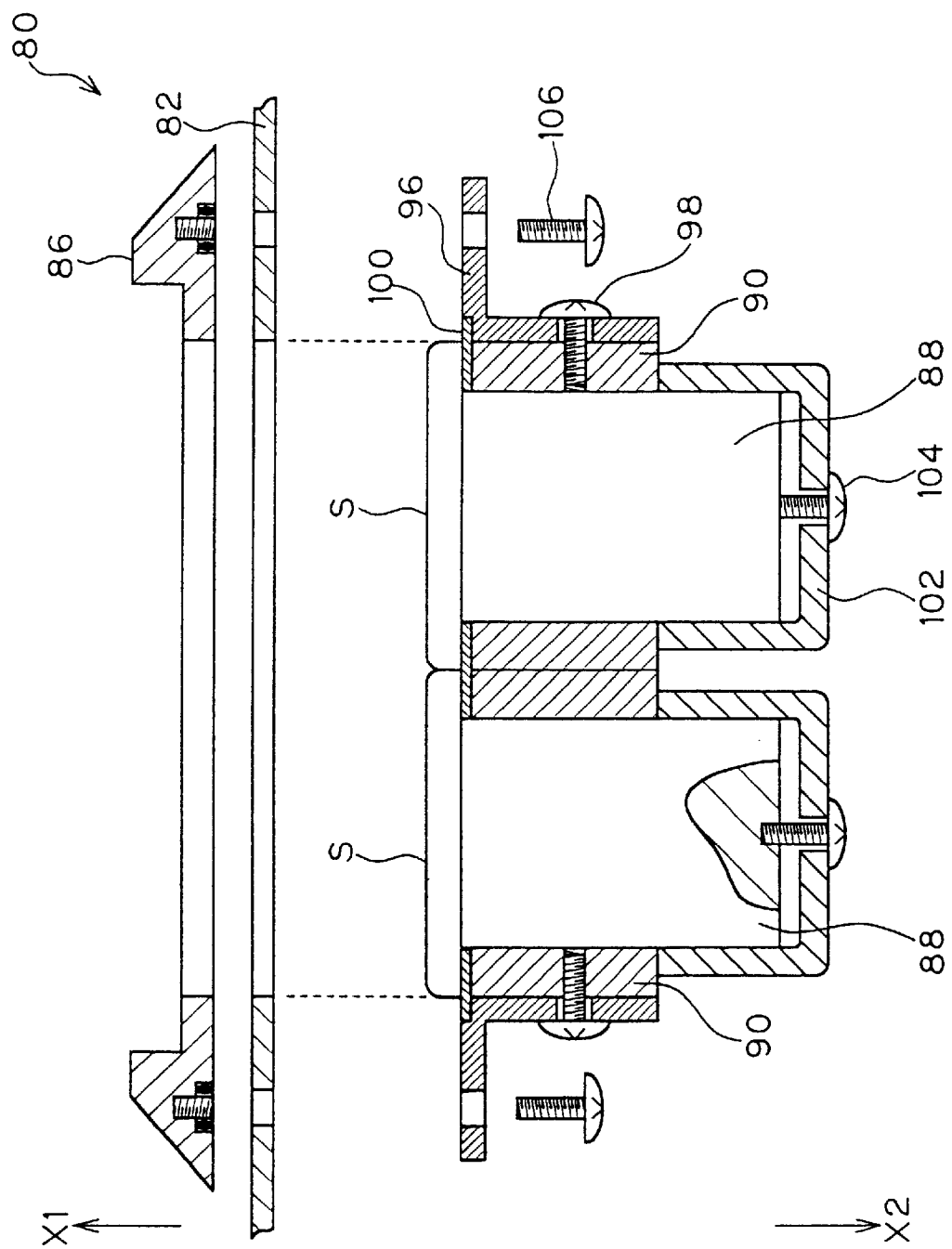
FIG. 15 is a view showing a process of combining a plurality of unit frames 90.

FIGS. 14 and 15 are views showing a process of combining the plural unit frames 90. FIG. 14 is a perspective view of the unit frame 90 viewed from the rear side (the side of X2 of FIG. 13). As shown in FIG. 14(A), a dovetail groove (engagement portion) 92 is formed on an appropriate portion of the unit frame 90. In this example, one dovetail groove 92 is formed at substantial center of each of four sides of the square unit frame 90. The plural unit frames 90 are disposed at predetermined positions so that the dovetail grooves 92 may be adjacent to one another and a wedge 94 is inserted to connect the adjacent dovetail grooves 92. Thus, the plural unit frames 90 are combined (see FIG. 14(B)).

Subsequently, an outer frame 96 is mounted on the plural combined unit frames 90 as shown in FIGS. 14(C) and 14(D). As shown in FIG. 14(C), the outer frame 96 consists of four members 96*a* to 96*d* and the members 96*a* to 96*d* are mounted on the plural combined unit frames 90 with screws 98.

Next, as shown in FIG. 15, a sealing member, i.e., a packing 100 (see FIG. 16) is placed on the front side (the side of X1 of this figure) of the unit frame 90 and the outer frame 96, and the panel unit 88 is inserted in the unit frame 90 with the packing 100 interposed therebetween. With the packing 100, any clearance between the surfaces S of the plural panel units 88 and between the panel unit 90 and the outer frame 96 can be sealed in a fluid-tight manner.

Figure 16:
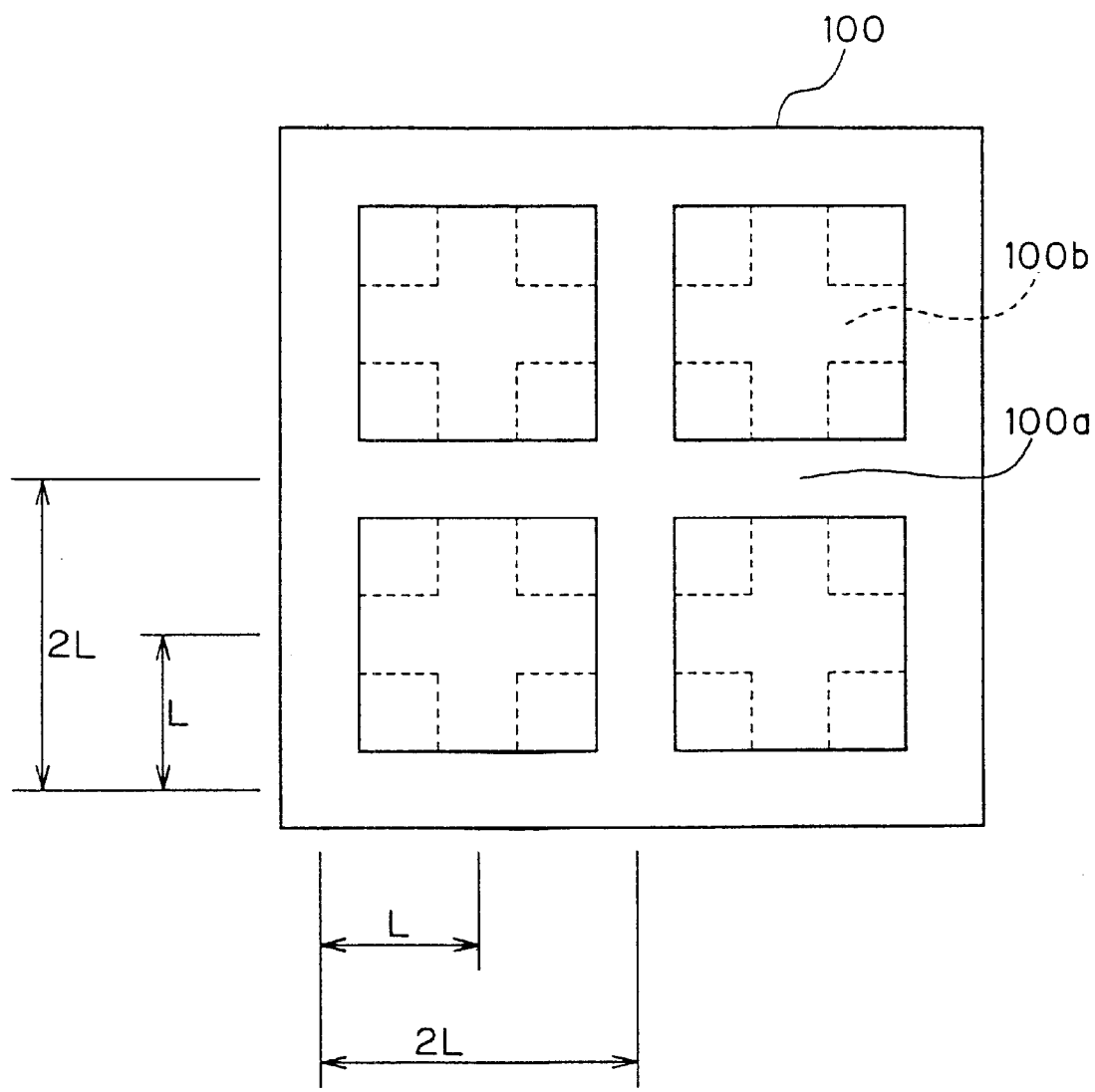
FIG. 16 is a plan view of a packing 100.
Figure 17:
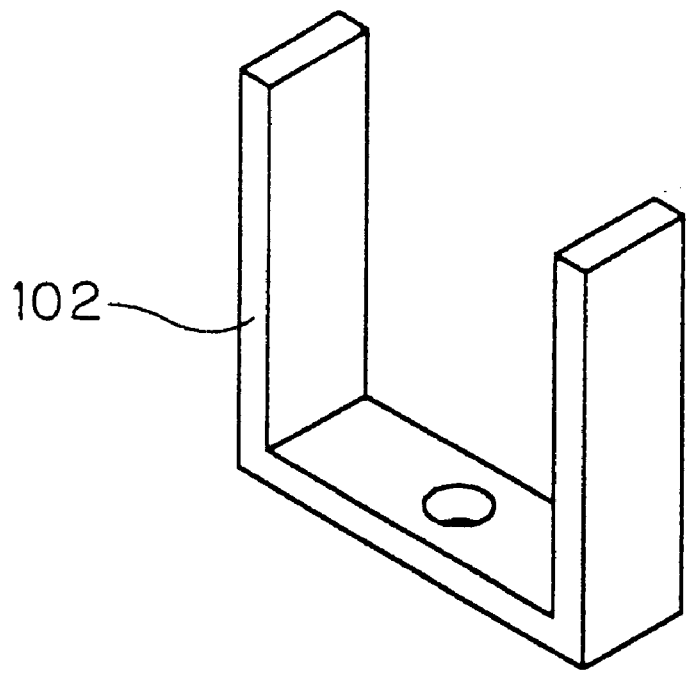
FIG. 17 is a perspective view showing a U-shaped stopper 102.

As shown in FIG. 16, the packing 100 has grid portions with a square whose side substantially has a length of reference size L used as a grid unit. When used, a grid portion 100*b* other than a grid portion 100*a* facing the clearances between the adjacent panel units 88 and between the panel unit 88 and the outer frame 96 is removed.

Thus, if a packing of predetermined size having the grid portions with a square having a side of reference size L as a grid unit is prepared, simply by removing an unnecessary grid portion in accordance with the kind and arrangement of panel unit which is a constituent, the packing 100 for the operation indicating panels of various kinds of combinations can be obtained.

The panel unit 88 is fixed to the unit frame 90 with a U-shaped stopper 102 (see FIG. 17) and a screw 104.

Next, a combination of the panel unit 88 and fixed unit frame 90 is mounted on the mount panel 82 as shown in FIG. 15. These are mounted from the rear side. The combination of the unit frame 90 placed on the rear side of the mount panel 82 and a frame 86 placed on the front side sandwich the mount panel 82, which is fixed by the screw 106. Thus completed is the operation indicating panel 80 having a rear-side mounting structure as shown in FIG. 13.

The constitution in which the plural panel units 88 combined with one another are collectively mounted on the mount panel 82 needs only a large hole 82*a* to be provided in the mount panel 82 as a mounting hole and thereby simplifies an operation for making a hole. Further, only if the combination is made in accordance with the hole 82*a* provided in the mount panel 82, the kind and positional relation of combined panel units can be freely selected. Therefore, without changing the mount panel 82, the kind and positional relation of combined panel units can be changed.

If a plurality of unit frames 90 for holding a plurality of panel units 88 are provided and the plural unit frames 90 are combined to combine the plural units 88, the plural combined panel units 88 can be handled as a unit to simplify storage, conveyance, mounting operation and the like. Further, even after the unit frames 90 combined with one another are mounted on the mount panel 82, the panel units 88 can be taken out by putting the panel units held by the unit frames 90 out from the unit frames 90. That simplifies maintenance, check, exchange and change of each panel unit 88.

Figure 18:
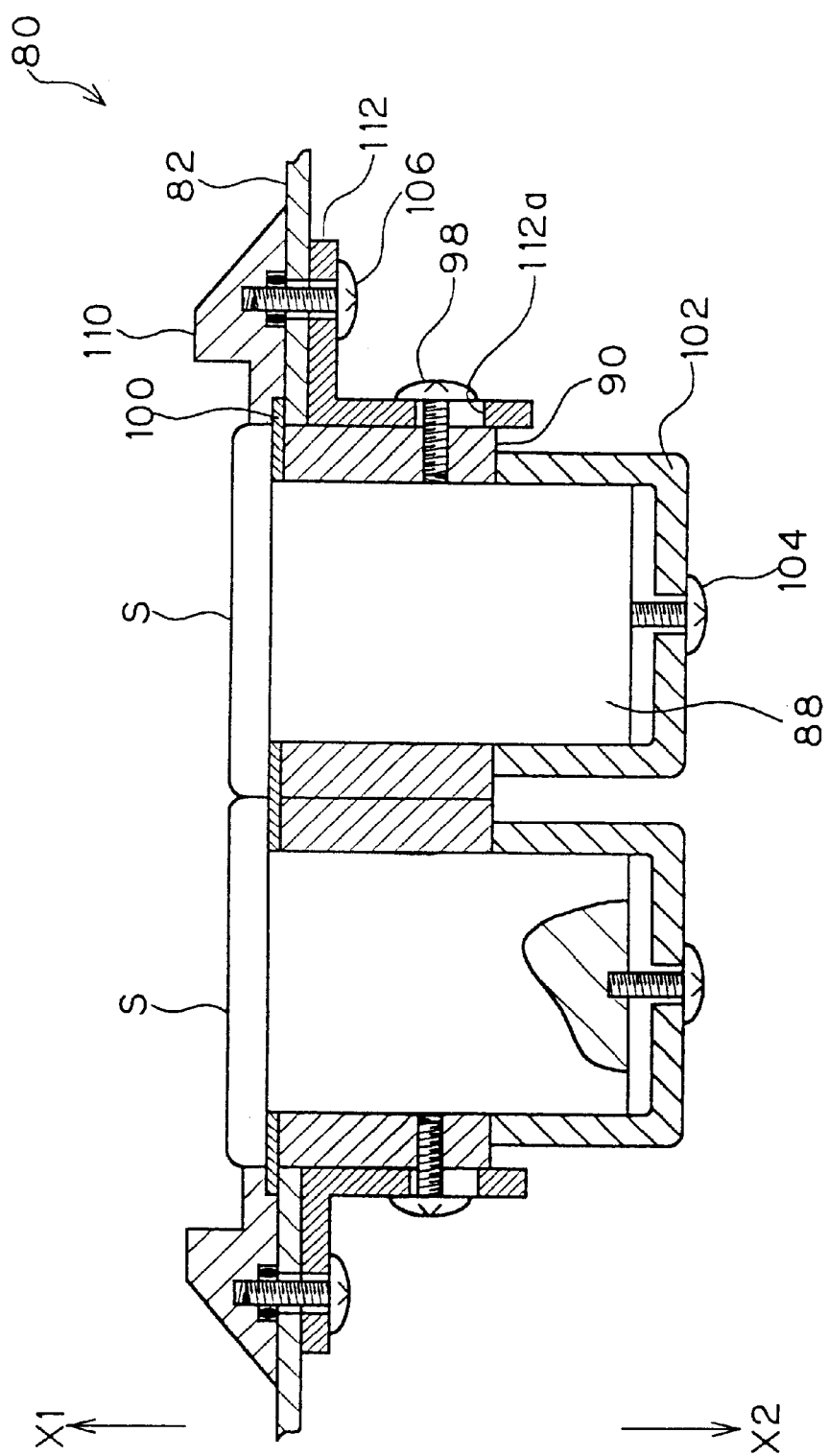
FIG. 18 is a view showing a cross-sectional structure of the operation indicating panel 80 in a case of front-side mounting.
Figure 19:
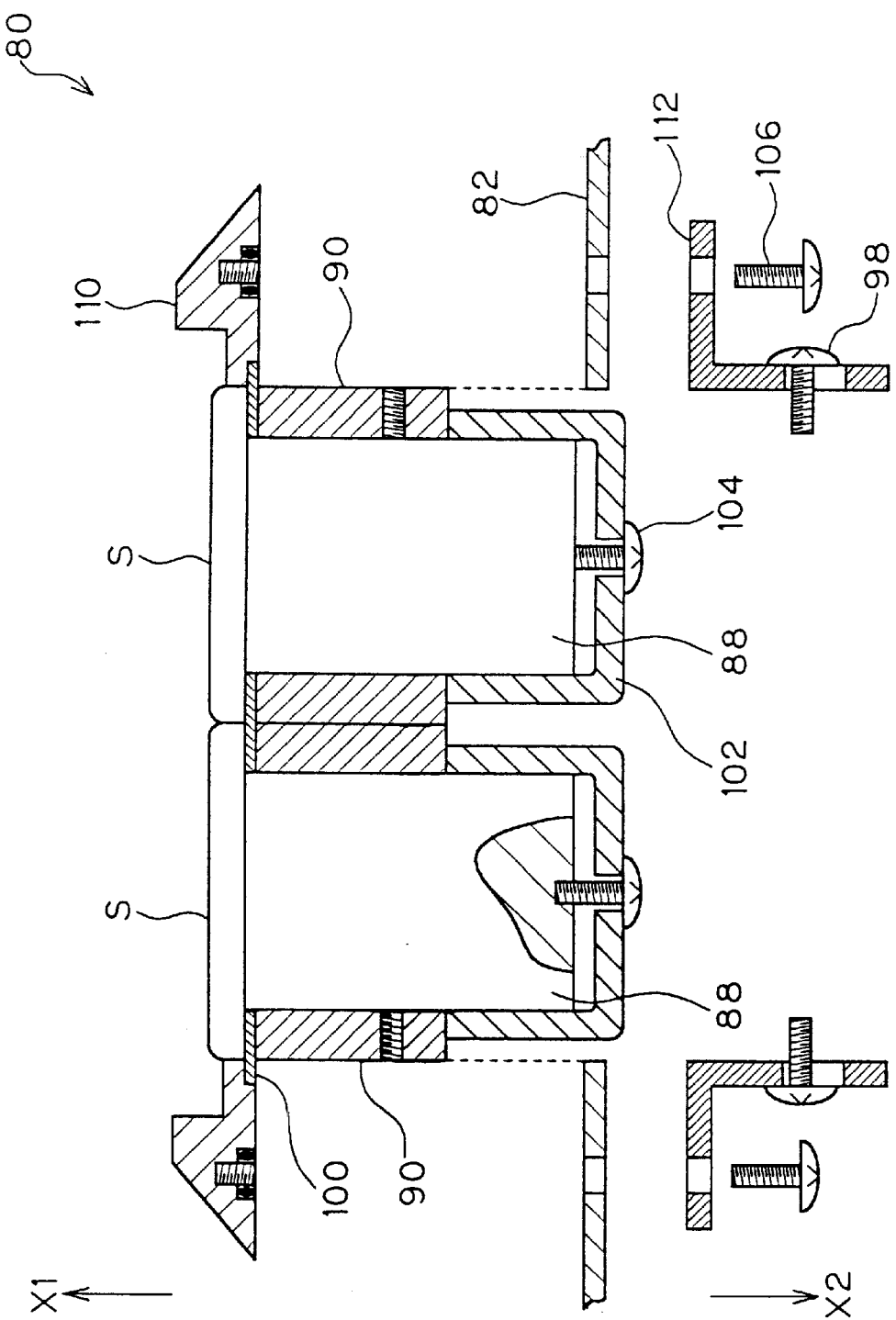
FIG. 19 is a view showing a process of front-side mounting.

The operation indicating panel 80 of FIG. 12 can be mounted from the front side (the side of X1 of FIG. 18) as well as from the rear side (see FIG. 13) as above. FIGS. 18 and 19 are views for explanation of a structure of the operation indicating panel 80 in a case of front-side mounting. FIG. 18 is a view showing a cross-sectional structure of the operation indicating panel 80. FIG. 19 is a view showing a process of front-side mounting.

As shown in FIG. 19, the plural unit frames 90 are first combined, the packing 100 is placed on the front side (the side of X1 of this figure) of the unit frame 90, each panel unit 88 is inserted into the unit frame 90 with the packing 100 interposed therebetween and the inserted panel unit 88 is fixed to the unit frame 90 with the U-shaped stopper 102 and the screw 104.

Subsequently, the combination of the unit frames 90 to which the panel units 88 are fixed is inserted into the mount panel 82 from the front side. An outer frame 112 placed on the rear side of the mount panel 82 and a frame 110 placed on the front side sandwiches the mount panel 82, which are fixed with the screw 106, and the outer frame 112 and the combination of the unit frames 90 are fixed with the screw 98. Thus completed is the operation indicating panel 80 having a front-side mounting structure as shown in FIG. 18. As shown in FIG. 18, in order for the screw 98 to penetrate, a through hole 112*a* provided in the outer frame 112 is made to be an oblong hole with its length in the direction of X1–X2 of this figure, to cope with various thicknesses of the mount panels 82.

Thus, the operation indicating panel 80 of FIG. 12 can select rear-side mounting of front-side mounting depending on whether the outer frame 96 and the frame 86 of FIG. 13 or the outer frame 112 and the frame 110 of FIG. 18 are used. Therefore, it is possible to easily select or change the mounting method at the site of mounting.

Though the dovetail grooves 92 are provided at appropriate portions of the unit frame 90 and the wedge 94 is inserted so that the adjacent dovetail grooves 92 of the plural unit frames 90 may be combined with each other to combine the plural unit frames 90 in this preferred embodiment, the method of combining the plural unit frames 90 is not limited to this. For example, instead of the dovetail groove 92, an engagement groove (engagement portion) of other shape may be provided. In this case, the shape of the wedge 94 has to be made in accordance with the engagement groove.

Further, without the wedge 94, the engagement portions of adjacent unit frames 90 may be directly engaged with each other. In this case, one of the adjacent unit frames 90 has an engagement portion of dovetail-groove shape and the other has an engagement portion of a shape to be engaged in the dovetail groove.

Furthermore, without the engagement portion between the unit frames, the plural unit frames 90 are collectively surrounded by an outer frame, being combined with one another.

Though the panel unit 88 is fixed to the unit frame 90 with the U-shaped stopper 102 in this preferred embodiment, the method of fixing the panel unit 88 to the unit frame 90 is not limited to this.

Figure 20:
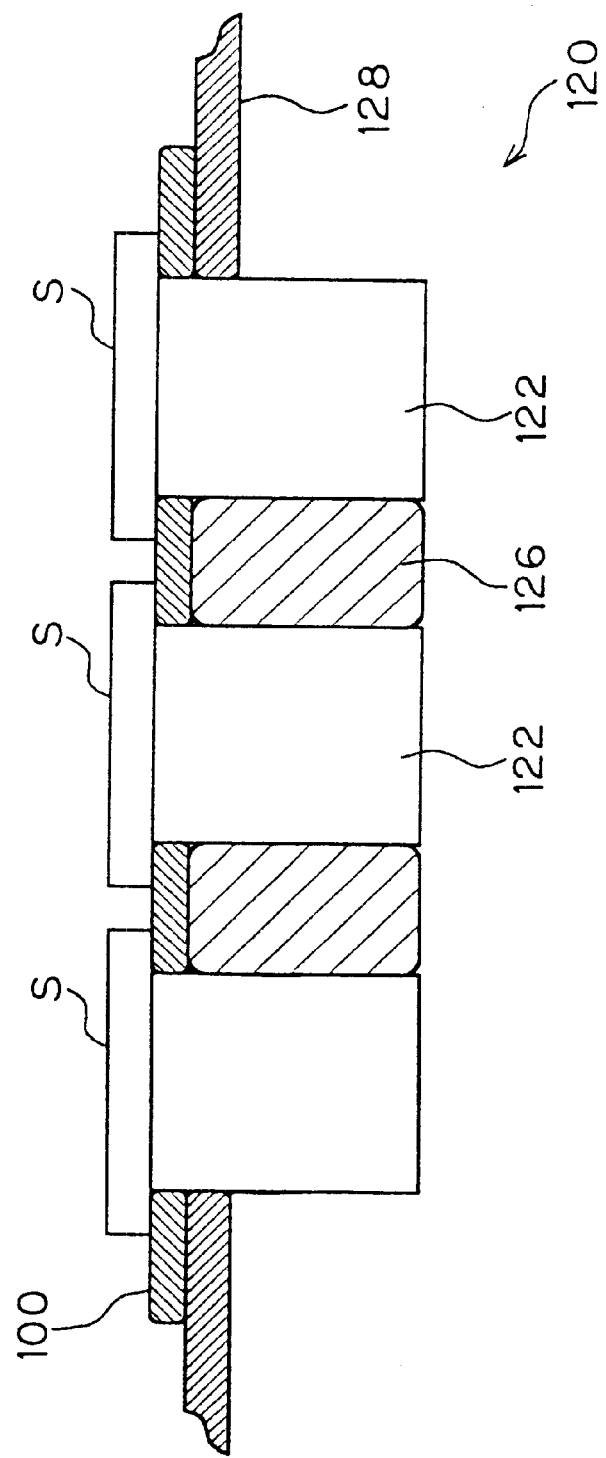
FIG. 20 is a view abbreviatedly showing a cross-sectional structure of an operation indicating panel 120 in accordance with a variation of the fourth preferred embodiment.
Figure 21:
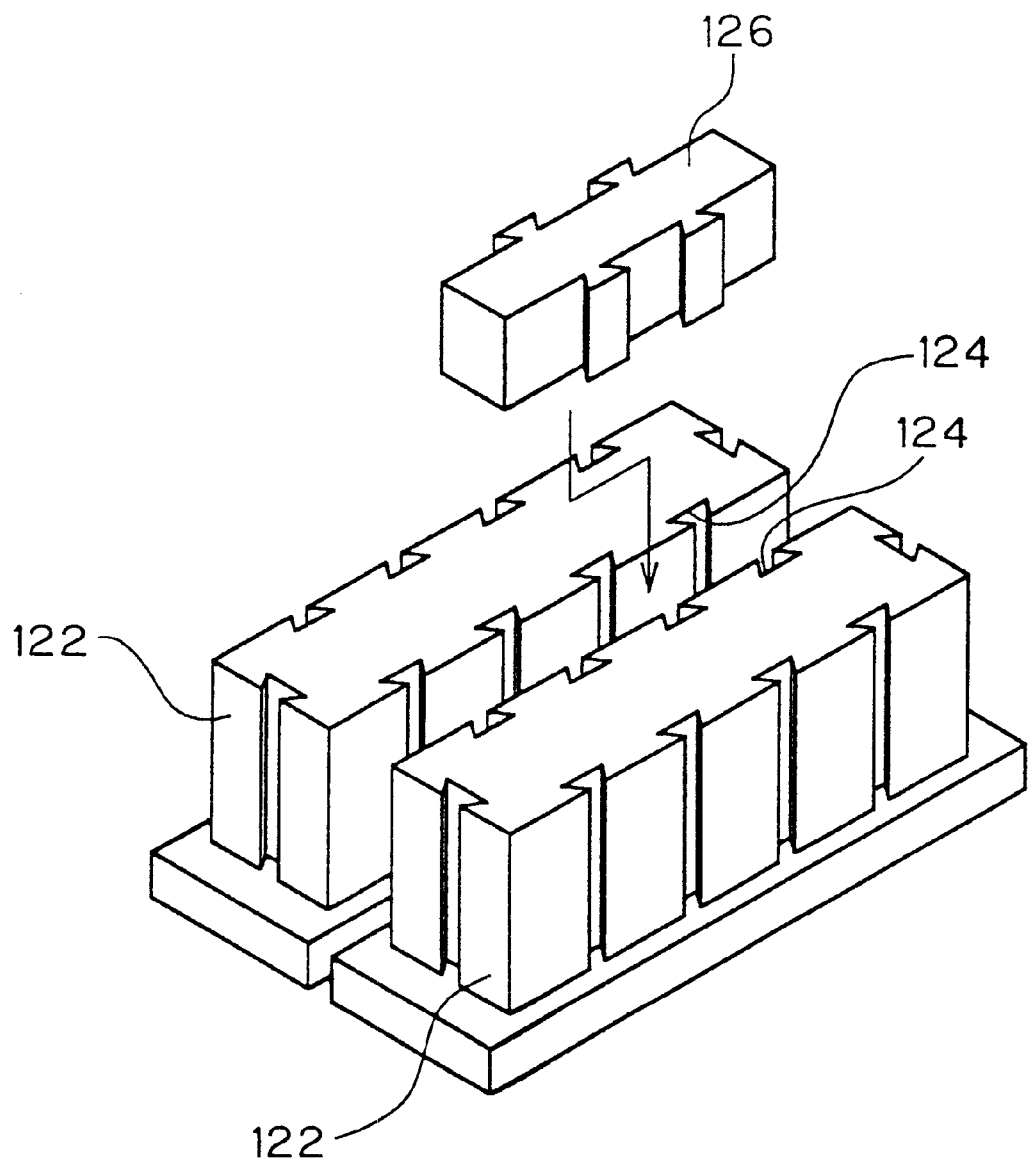
FIG. 21 is a view showing a process of combining a plurality of panel units 122 constituting the operation indicating panel 120 with one another.

Further, though the plural panel unit frames 90 for holding the plural panel units 88 are provided and combined with one another to combine the plural panel units 88 in this preferred embodiment, the panel units may be combined with one another by themselves. As variation of this preferred embodiment, FIGS. 20 and 21 shows an example of an operation indicating panel 120 having a constitution in which the panel units are combined with one another by themselves. FIG. 20 is a view abbreviatedly showing a cross-sectional structure of the operation indicating panel 120. FIG. 21 is a view showing a process of combining a plurality of panel units 122 constituting the operation indicating panel 120 with one another.

As shown in FIG. 21, dovetail grooves (engagement portion) 124 are provided at appropriate portions of each of the panel units 122. In this example, the plural panel units 122 are placed at desired positions so that dovetail grooves 122 may be adjacent and a wedge 126 is inserted to connect the adjacent dovetail grooves 124 to each other. Thus combined are the plural panel units 122.

As shown in FIG. 20, the operation indicating panel 120 is completed by mounting the plural combined panel units 122 to a mount panel 128. The plural combined panel units 122 can be thereby handled as a unit, and that simplifies the storage, conveyance, mounting operation and the like.

Further, by fitting the packing 100 into the panel unit 122 (see FIG. 16) before inserting the wedge 126, any clearance between the surfaces S of the plural panel units 122 and between the panel unit 122 and the mount panel 128 can be sealed in a fluid-tight manner.

Furthermore, if an outer frame (outer peripheral frame) is mounted around the perimeter of the plural panel units 122 (unit combination) combined with the wedge 126 so as to surround the unit combination along a side-surface (perimeter) of a case of the unit combination, the panel units 122 can be firmly combined. As the outer frame to surround the unit combination, the aforementioned outer frame 96 and the like can be used. As the method of fixing the unit combination and the outer frame as above used are, for example, a method of screwing, a method of inserting a predetermined fixing member for fixing the unit combination and the outer frame by pushing both wall surfaces to each side into a plurality of portions between the inner peripheral surface of the outer frame and the outer peripheral surface of the unit combination.

<The Fifth Preferred Embodiment>

FIG. 22(A) is a view abbreviated showing a cross-sectional structure of an operation indicating panel 130 in accordance with the fifth preferred embodiment of the present invention. In the operation indicating panel 130, like the operation indicating panel 120 (see FIG. 20), a plurality of panel units 132 are combined with one another with a wedge 136.

The panel unit 132 comprises a light projecting/receiving device (IrDA (Infrared Data Association) communication equipment) 134 which is an interunit communication unit for making communication between the adjacent panel units 132. The light projecting/receiving device 134 comprises a light projecting function of projecting an optical signal such as an infrared light to the adjacent panel unit 132 and a light receiving function of receiving the optical signal from the adjacent panel unit 132. At the substantial center of the wedge 136, a through hole 138 is so provided as to penetrate in a direction where the panel units 132 are adjacent, and the signal light is transmitted between the adjacent panel units 132 through the through hole 138. The through hole 138 corresponds to an interunit electric-signal path.

Since the relative position of the adjacent panel units 132 is reliably aligned with the wedge and the like, the communication between the adjacent panel units can be easily made.

In this preferred embodiment, one of the panel units 132 comprises a communication cable 139 which is an external communication unit (electric-signal path for external apparatus) for make communication with the external apparatus such as a controller. Therefore, the panel unit 132 having the communication cable 139 works as an intermediary panel unit 132 for indirectly connecting other panel units 132 and the external apparatus.

With this constitution, even if the communication with the external apparatus is needed, the intermediary panel unit can collectively make communication with the external apparatus, instead of direct communication between each of the panel units and the external apparatus. That reduces the number of communication cables and achieves interconnection savings.

FIG. 22(B) is a view abbreviatedly showing a cross-sectional structure of an operation indicating panel 140 as a variation of the operation indicating panel 130 in accordance with this preferred embodiment. While one of the panel units 132 comprises the communication cable 139 for making communication with the external apparatus such as the controller in the aforementioned operation indicating panel 130 (see FIG. 22(A)), no panel unit 132 comprises the communication cable in the operation indicating cable 140. This is because one of the panel units 132 comprises a controller to eliminate the need for wiring with the external apparatus. This constitution allows further interconnection savings.

Though the interunit communication is made with light in this preferred embodiment and its variation (see FIG. 22), the method of interunit communication is not limited to this. For example, the interunit communication can be made with inductance and the like. Not limited to radio communication, cable communication can be made.

Figure 23:
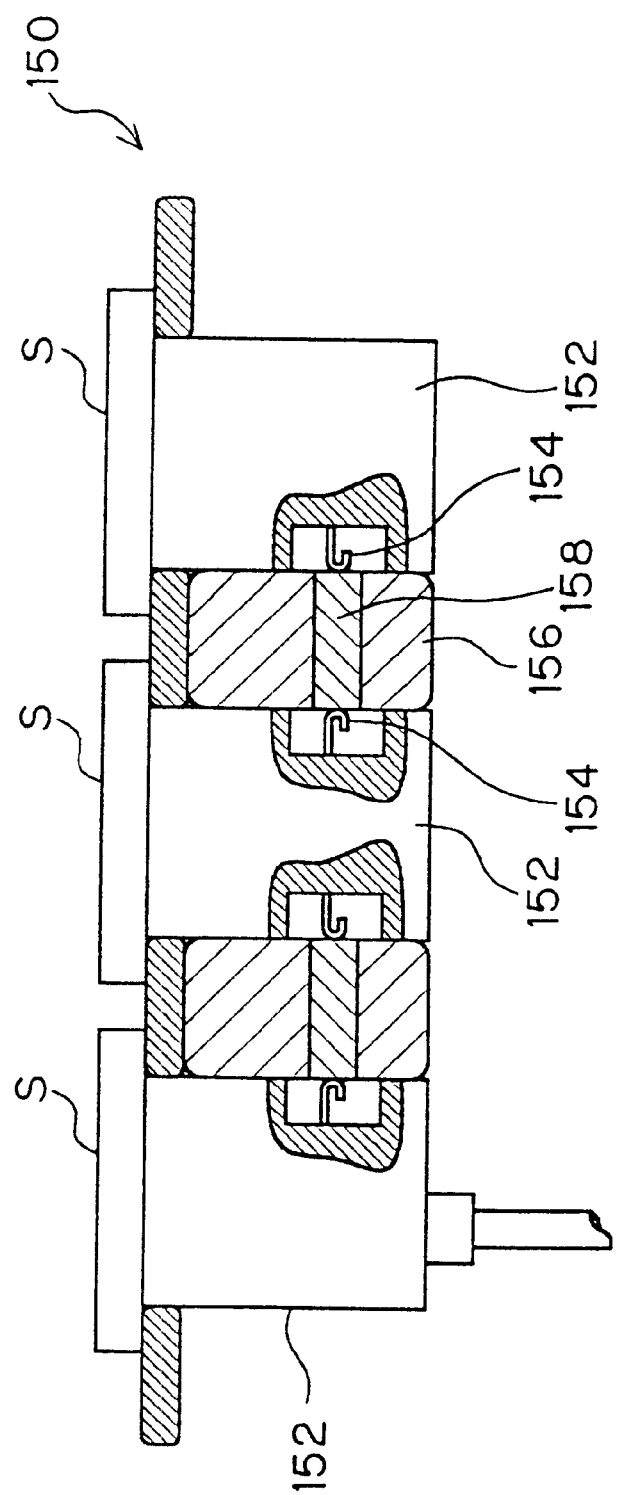
FIG. 23 is a view abbreviatedly showing an exemplary cross-sectional structure of an operation indicating panel 150 in a case of interunit communication using a cable in accordance with another variation of the fifth preferred embodiment.

Further, FIG. 23 is a view abbreviatedly showing an exemplary cross-sectional structure of an operation indicating panel 150 for making interunit communication using a cable in accordance with another variation of this preferred embodiment. In the operation indicating panel 150, like the operation indicating panel 130 (see FIG. 22(A)), a plurality of panel units 152 are combined with one another with a wedge 156.

The panel unit 152 comprises a contact 154 as the interunit communication unit, instead of the light projecting/receiving device 134 (see FIG. 22(A)). The contact 154 is electrically connected to a contact 154 of the adjacent panel unit 152 through a conductor 158 such as metal provided on the wedge 156. Thus achieved is an interunit communication with a cable between the adjacent panel units 152. The conductor 158 corresponds to an interunit electric-signal path.

There may be a constitution where each panel unit is connected to the external apparatus such as the controller with a cable, instead of the interunit communication.

Though the dovetail grooves 124 are provided at appropriate portions of the panel units 122 and the like, and the wedge 126 is inserted so that the like and the adjacent dovetail grooves 124 of the plural panel units 122 and the like may be combined with each other to combine the plural panel units 122 and the like in the variation of the fourth preferred embodiment (see FIG. 21), the fifth preferred embodiment and the like. the method of combining the plural panel units is not limited to this. For example, instead of the dovetail groove, an engagement groove (engagement portion) of different shape may be provided. In this case, the shape of the wedge has to be made in accordance with the engagement groove. Further, without the wedge, the engagement portions of the adjacent panel units may be directly engaged with each other. In this case, one of the adjacent panel units has an engagement portion of dovetail-groove shape and the other has an engagement portion of a shape to be engaged in the dovetail groove. Furthermore, without the engagement portions between the panel units, the plural panel units are collectively surrounded by an outer frame, being combined with one another.

Though a packing of predetermined size having the grid portions with a square having a side of reference size 1 as a grid unit is prepared and the packing for the operation indicating panels of various combinations can be obtained simply by removing an unnecessary grid portion in accordance with the kind and arrangement of panel unit which is a constituent, a plurality of kinds of packings whose unnecessary grid portion is removed in accordance with the kind and arrangement of the panel unit may be prepared from the beginning.

<The Sixth Preferred Embodiment>

FIGS. 24 to 30 are views for explanation of a panel unit 160 in accordance with a sixth preferred embodiment of the present invention. FIG. 24(A) is a front elevation of the panel unit 160 and FIG. 24(B) is a bottom view of the panel unit 160. FIG. 25(A) is a right-side view of the panel unit 160 and FIG. 25(B) is a rear elevation of the panel unit 160.

Figure 26A:
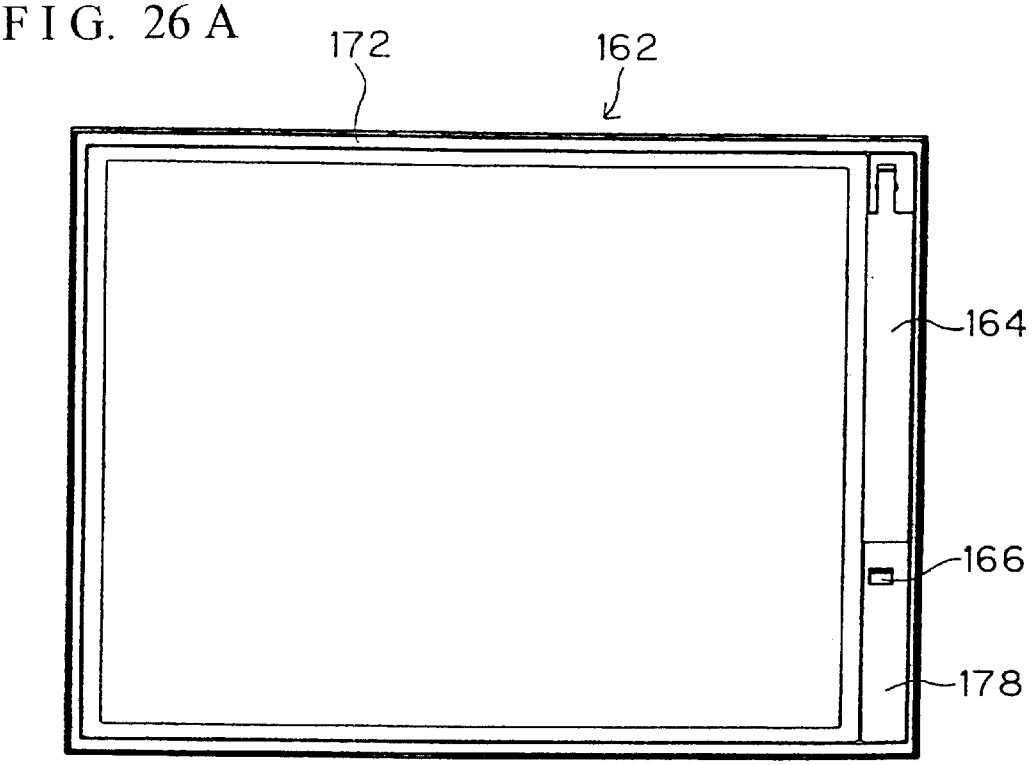
FIG. 26(A) is a front elevation of an adapter 162 used for the panel unit 160 and FIG. 26(B) is a bottom view of the adapter 162.
Figure 26B:
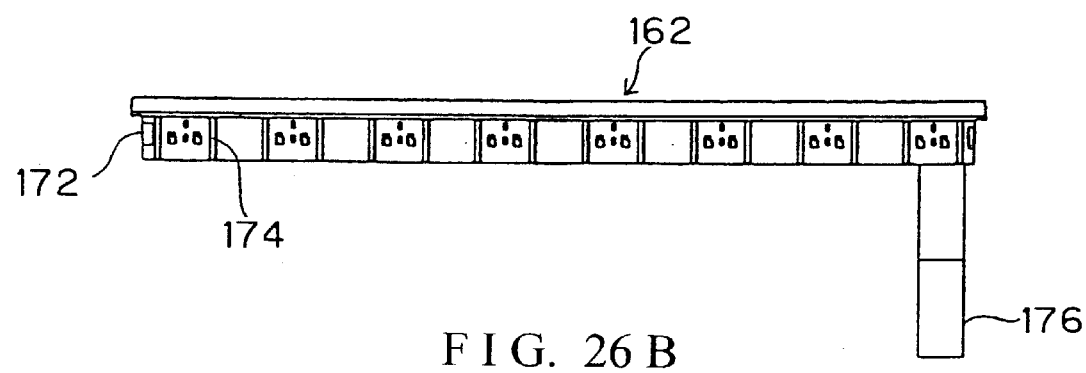
Figure 29:
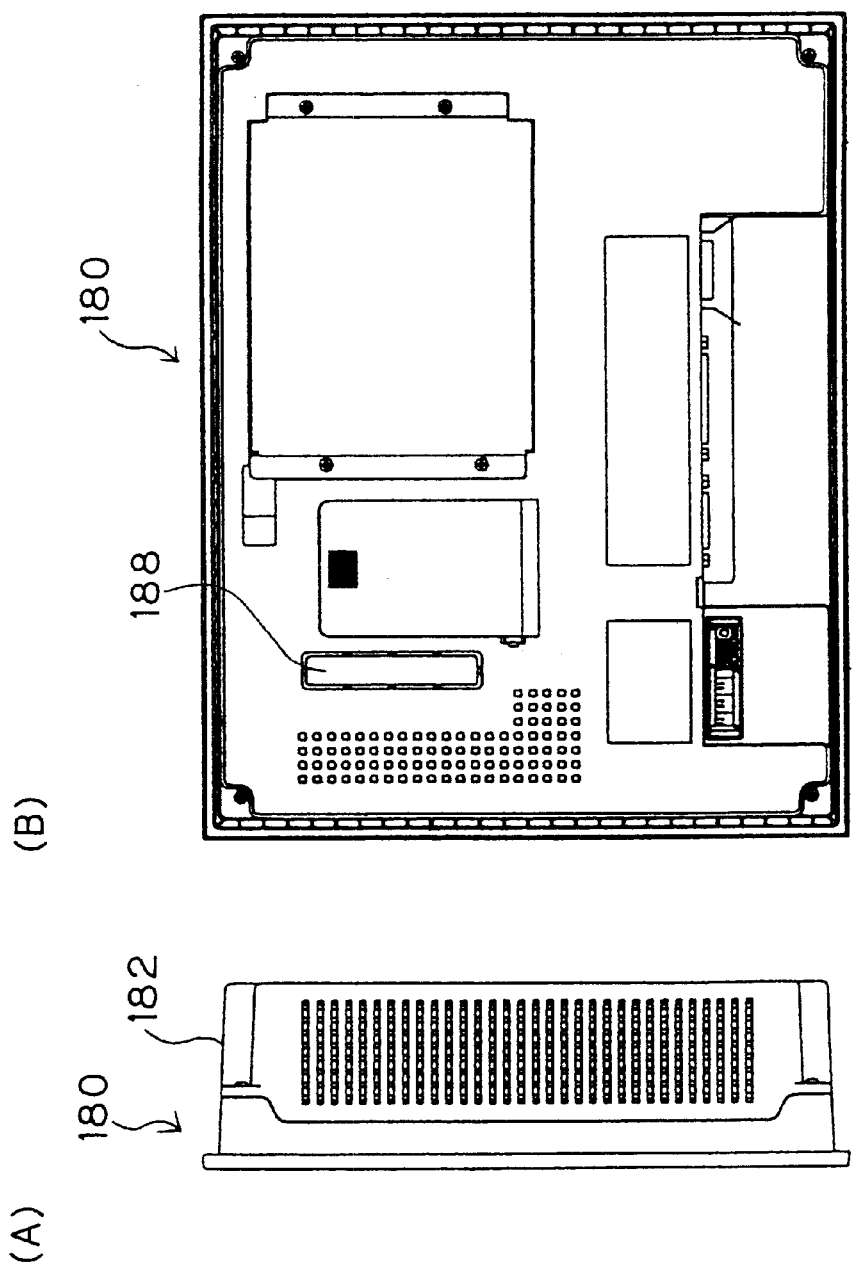
FIG. 29(A) is a right-side view of the liquid crystal display 180 and FIG. 29(B) is a rear elevation of the liquid crystal display 180.
Figure 30:
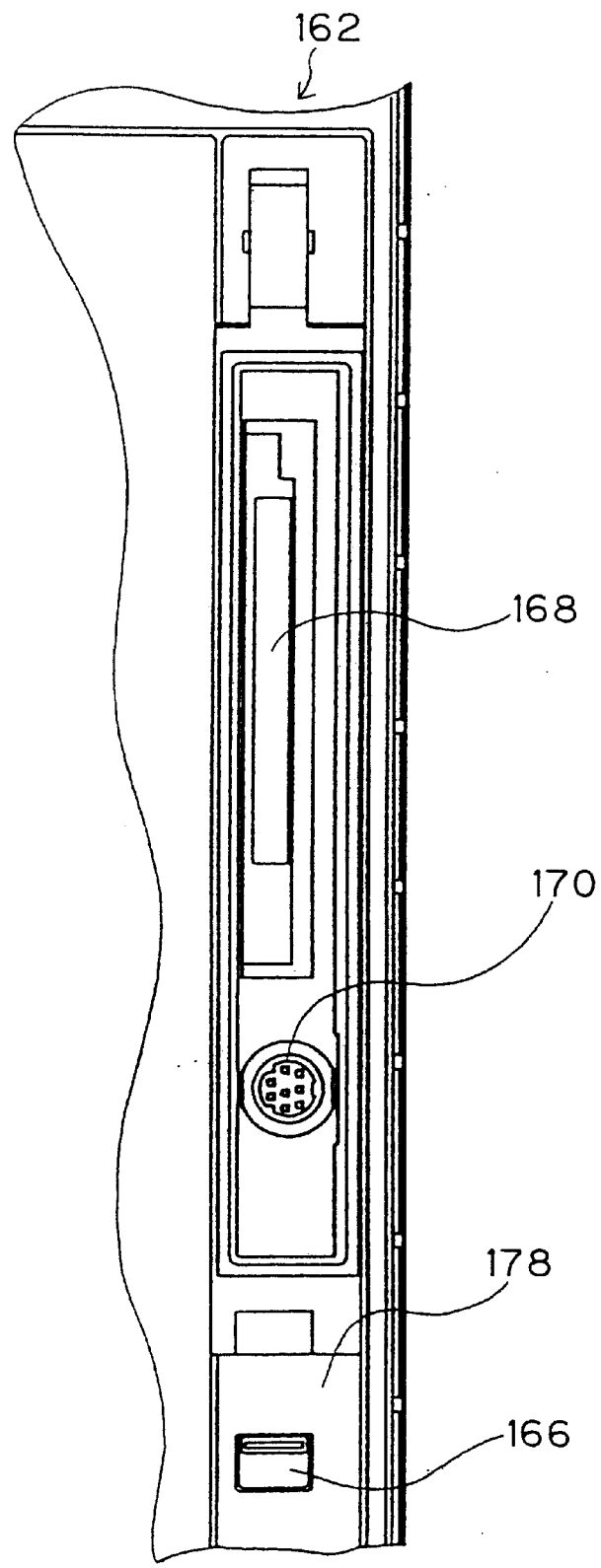
FIG. 30 is a partly enlarged view of a surface 178 of the adapter 162.

FIG. 26(A) is a front elevation of an adapter 162 which is a mount frame used for the panel unit 160 and FIG. 26(B) is a bottom view of the adapter 162. FIG. 27(A) is a right-said view of the adapter 162 and FIG. 27(B) is a rear elevation of the adapter 162. FIG. 30 is a partly-enlarged view (with a protection cover 164 opened) of a surface 178 of the adapter 162.

FIG. 28(A) is a front elevation of a liquid crystal display 180 which is a panel device used in the panel unit 160 and FIG. 28(B) is a bottom view of the liquid crystal display 180. FIG. 29(A) is a right-side view of the liquid crystal display 180 and FIG. 29(B) is a rear elevation of the liquid crystal display 180.

Figure 24A:
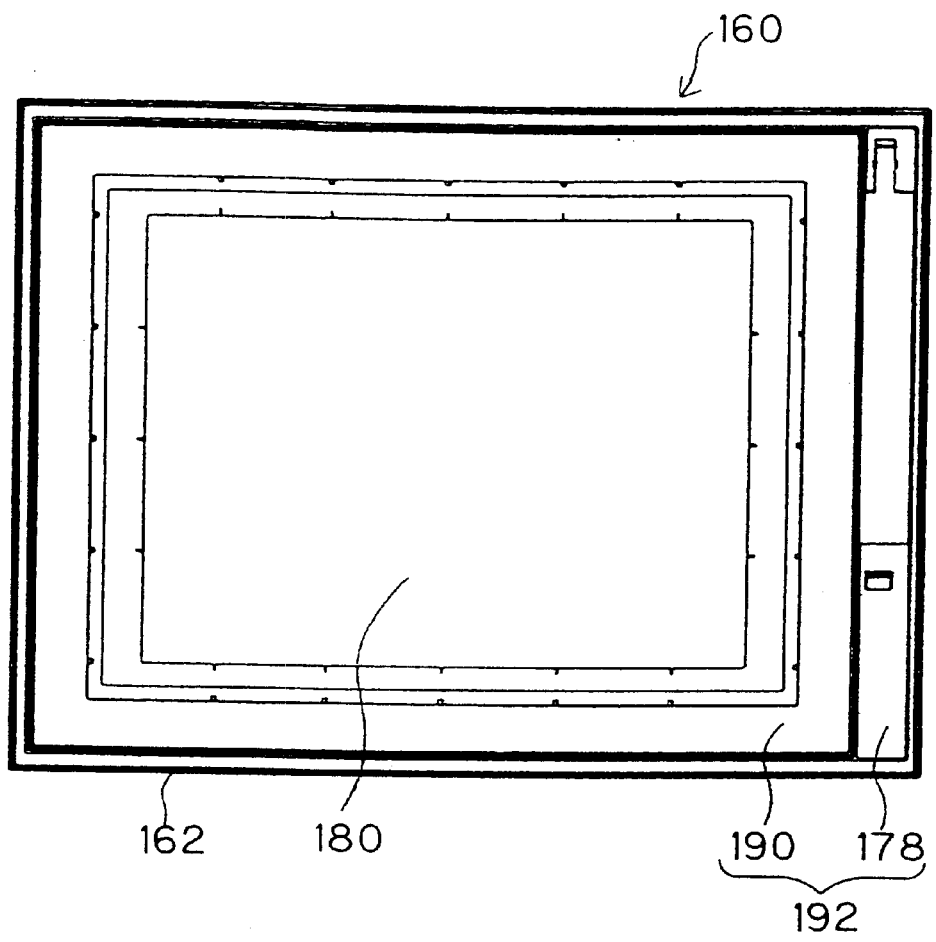
FIG. 24(A) is a front elevation of a panel unit 160 in accordance with a sixth preferred embodiment of the present invention and FIG. 24(B) is a bottom view of the panel unit 160.
Figure 24B:
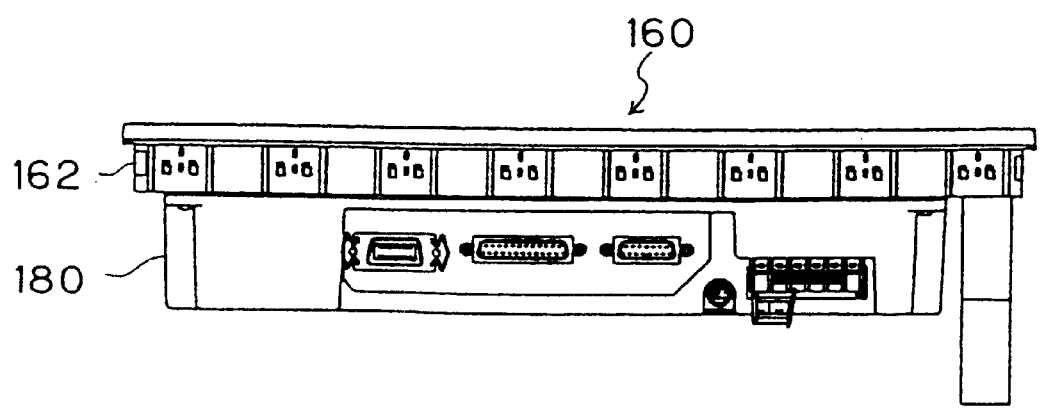
Figure 25:
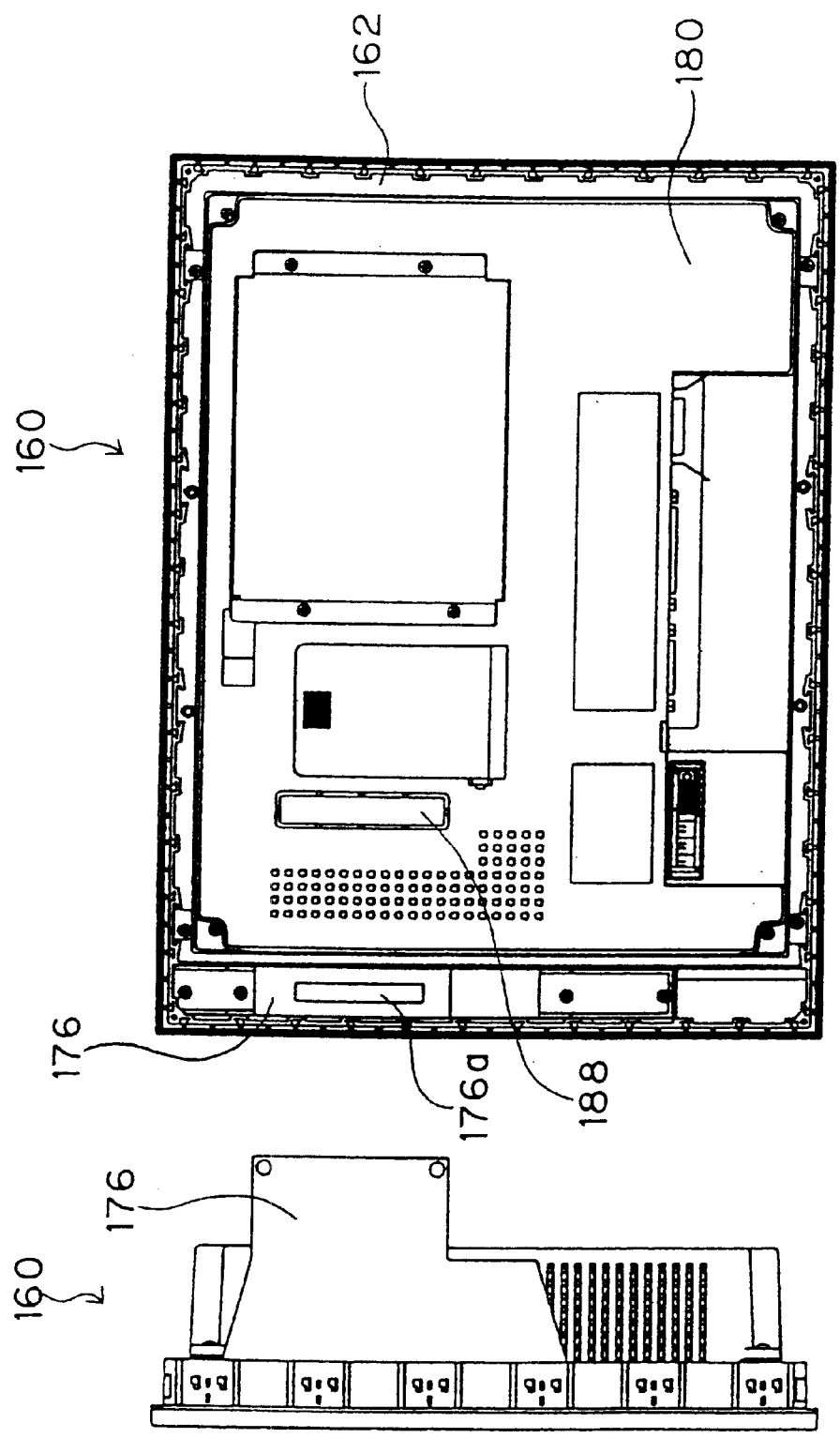
FIG. 25(A) is a right-side view of the panel unit 160 and FIG. 25(B) is a rear elevation of the panel unit 160.

As shown in FIG. 24(A), the panel unit 160 comprises the adapter 162 and the liquid crystal display 180 held removably on the adapter 162. A surface 190 of liquid crystal display 180 and the surface 178 of the adapter 162 are exposed to an operation indicating surface. Therefore, the surface 190 of the liquid crystal display 180 and the surface 178 of the adapter 162 constitute a surface 192 of the panel unit 160. In this preferred embodiment, the surface 178 of the adapter 162 is so formed as to surround the surface 190 of liquid crystal display 180.

As shown in FIG. 26(B). the adapter 162 comprises a frame body 172 and a card case 176. The frame body 172 is provided with a dovetail groove 174 (engagement portion). The dovetail groove 174 and a dovetail groove of an adjacent another panel unit (not shown) are combined by the medium of the wedge 126 (see FIG. 21).

As shown in FIG. 26(A), the frame body 172 of the adapter 162 is formed like a hollow frame. A widish space is provided on the right-end side of the frame body 172 as one faces this figure, where a memory card slot 168 and a loader port 170 which are another panel devices (electrical function elements) are disposed as shown in FIG. 30.

When the surface 192 of the panel unit 160 is larger in size to some extent than the surface 190 of the held liquid crystal display 180, and effective use of the operation indicating surface of the operation indicator device is achieved by providing another panel devices, i.e., the memory card slot 168 and the loader port 170 in an available space of the surface 192 of the panel unit 160.

In the memory card slot 168, a memory card (not shown) used for the liquid crystal display 180 can be inserted. Advantageously, this constitution allows easy exchange of the memory card for changing and extending the function of the liquid crystal display 180 from the front surface of the operation indicator device. The memory card inserted in the memory card slot 168 is contained in a card case 176 (see FIG. 26(B)).

The lower port 170 is a terminal for making communication between the external apparatus such as a computer (not shown) and the liquid crystal display 180, and this constitution can advantageously make communication from the front surface of the operation indicating panel.

The memory card slot 168 and the loader port 170 are usually covered with the reclosable protection cover 164 as shown in FIG. 26(A), and the protection cover 164 can be opened by operating a release knob 166. As mentioned above, FIG. 30 illustrates a state where the protection cover 164 is opened.

The memory card slot 168 and the loader port 170 are connected to a connector 176a provided on a rear side of the card case 176 of FIG. 26(B). The connector 176a is connected to one end of a connecting cord (not shown) which is an electric-signal path. The other end of the connecting cord is connected to a connector (not shown) provided on a rear side of the liquid crystal display 180. The connector can be used by cutting and removing a connector protecting cover 188 on the rear side of the liquid crystal display 180 with a nipper and the like. Thus, the memory card slot 168 and the loader port 170 are connected to the liquid crystal display 180.

As shown in FIG. 28(A), the liquid crystal display 180 comprises a case 182 and a liquid crystal display surface 184. In other words, the surface 190 of the liquid crystal display 180 consists of the liquid crystal display surface 184 and a surface 128a of the case 182 surrounding the liquid crystal display surface 184.

As shown in FIG. 28(B), various kinds of terminals 186 for making communication with the external apparatus and other panel units are provided at a bottom surface of the case 182. Inside the case 182 provided are a control unit and a driving unit (not shown) for operating the liquid crystal display 180.

As discussed above, since the liquid crystal display 180 is removably held to the adapter 162, it is possible to easily mount or remove only the liquid crystal display 180 even with the panel unit 160 of FIG. 24(A) mounted on the panel 22 (see FIG. 1) or combined with another panel unit. Therefore, it becomes easier to remove only the liquid crystal display 180 for repair or exchange with the panel unit 160 mounted on the panel 22 or combine with another panel unit. In short, maintenance (exchange due to expiration of life of LCD and backlight, change of program for function upgrades and the like) of the liquid crystal display 180 becomes easier. For a normal use, the liquid crustal display 180 and the adapter 162 are fixed to each other with a screw, clamp and the like (not shown).

Preparing different kinds of adapters 162 in accordance with different kinds of liquid crystal displays 180 having cases 182 of different sizes makes it possible to obtain the panel units 160 having the surfaces 192 of the same size by making combination of the liquid crystal display 180 and the corresponding adapter 162 in size. For this reason, when the surface 190 of the liquid crystal display 180 is not larger in size than the panel unit 160, the panel unit can be handled as a regularly-shaped panel unit 160 having the surface 192 of desired size, independently of the size of the surface 190 of the liquid crystal display 180.

This constitution allows the size of the liquid crystal display 180 to be arbitrarily determined. Therefore, preparing the liquid crystal display 180 of minimum size in accordance with the size of the liquid crystal display surface 184 advantageously makes it possible to use it as a minimum-sized liquid crystal display when the liquid crystal display 180 is used alone and as the standard-sized panel unit 160 when used together with the adapter 162.

Though this preferred embodiment has been discussed taking a case as an example where the removably-held panel device and connecting cord as the electric signal path for connecting the panel device to another panel device in a mount frame are used and communication is made between the panel device and another panel device through the connecting cord, the communication between the removably-held panel device and the another panel device is not limited to that using the connecting cord. For example, as shown in FIG. 22, the communication may be made by using a optical signal such as an infrared light as communication medium. Further, as shown in FIG. 23, contacts may be provided on the removably-held panel device and another panel device and brought into direct or indirect contact to make the communication.

Though the memory card slot and the loader port are shown as the electrical function elements in this preferred embodiment, other panel devices may be used as the electrical function element. Further, a device other than the panel device, such as a battery and an IC, may be used as the electrical function element.

Though another panel device (electrical function element) different from the removably-held panel device is provided in the mount frame in the preferred embodiment, another panel device (electrical function element) does not necessarily have to be provided in the mount frame.

Though the surface of the mount frame is exposed to the operation surface of the operation indicator device as part of the surface of the panel unit in this preferred embodiment, the surface of the mount frame does not necessarily have to be exposed to the operation surface of the operation indicator device.

<The Seventh Preferred Embodiment>

Figure 31:
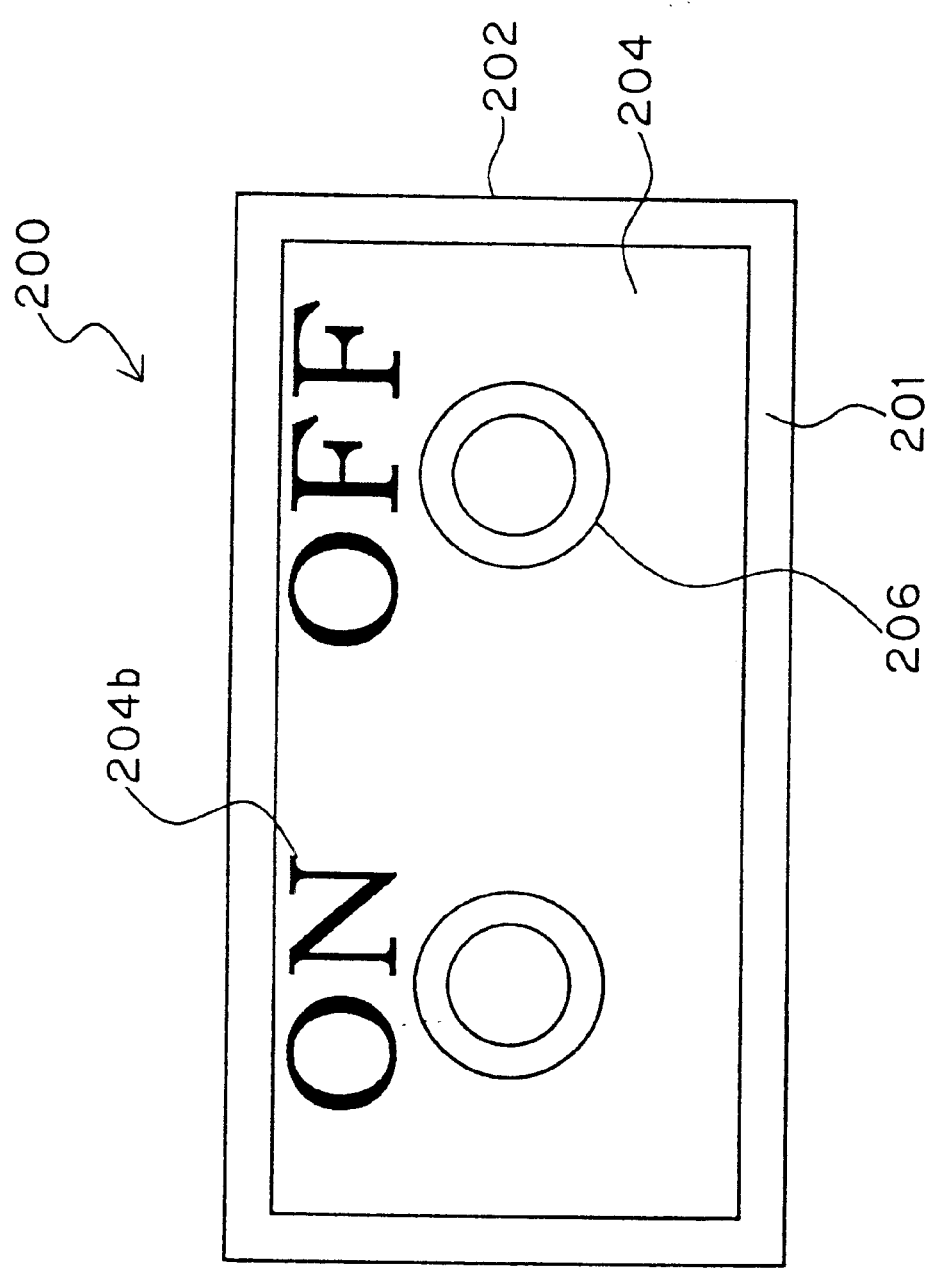
FIG. 31 is a front elevation of a panel unit 200 in accordance with a seventh preferred embodiment of the present invention.
Figure 32:
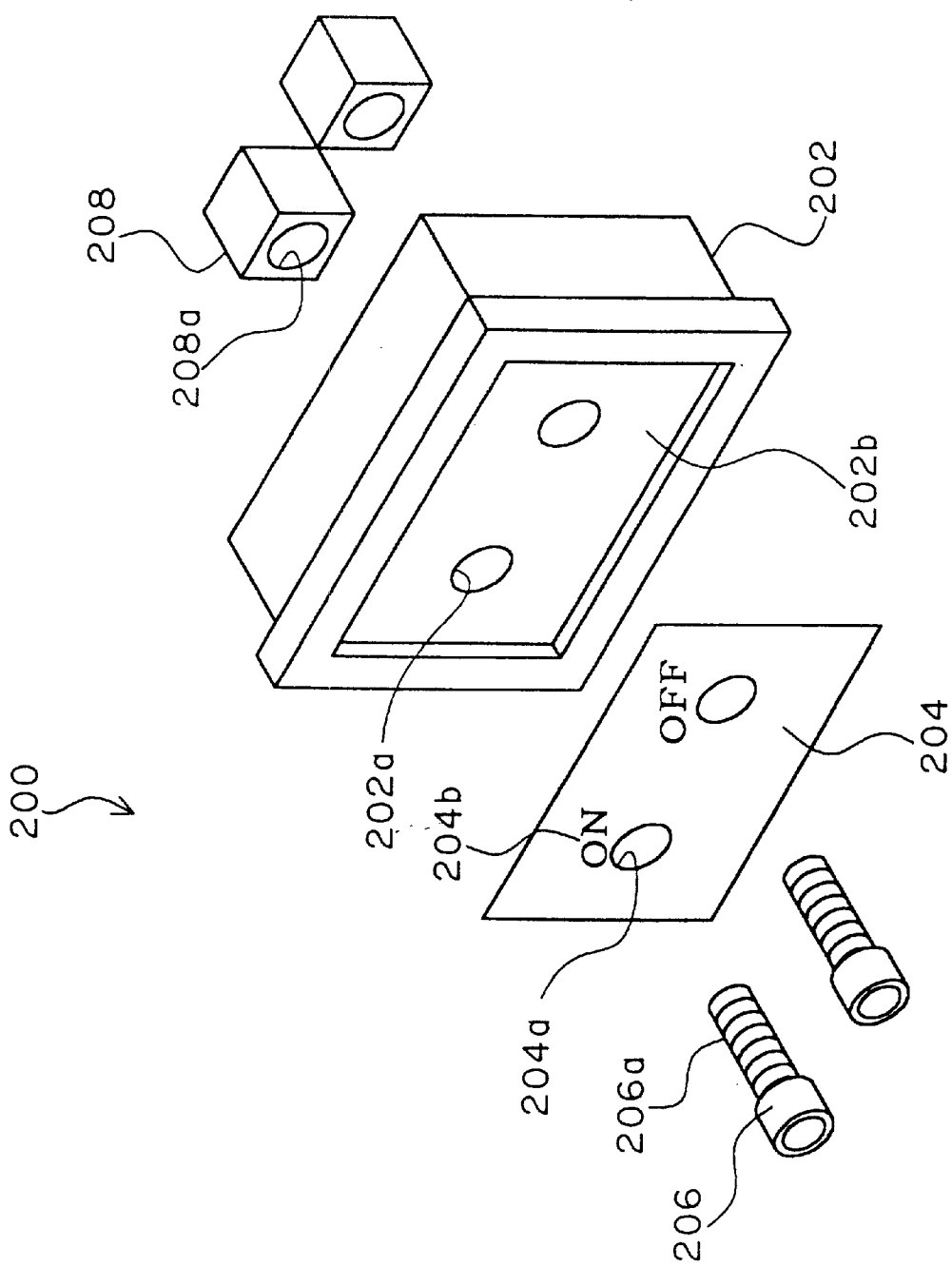
FIG. 32 is an exploded perspective view of the panel unit 200.

FIGS. 31 and 32 are views for explanation of a panel unit 200 in accordance with the seventh preferred embodiment of the present invention. FIG. 31 is a front elevation of the panel unit 200. FIG. 32 is an exploded perspective view of the panel unit 200.

As shown in FIG. 32, the panel unit 200 is a horizontal switch unit comprising two switches which are panel devices and comprises a case 202, an overlay sheet 204 which is a veneer, a pair of switch operation units 206 and a pair of switch contacts 208.

The overlay sheet 204 is fit into a recess 202b provided in a front surface of the case 202 and an inserting cylindrical portions 206a of the switch operation units 206 are inserted into holes 208a of the switch contacts 208 and fixed therein via through holes 204a of the overlay sheet 204 and through holes 202a of the case 202, to fabricate the panel unit 200.

As shown in FIG. 31, a surface 201 of the panel unit 200 fabricated as above is almost covered with the overlay sheet 204. Therefore, when a plastic molded article is used as the case 202, a sink mark which has been made in molding can be covered with the overlay sheet 204. Even if a plastic material having a relatively large sink mark or the molding is performed under the condition that the sink mark is large, it is possible to ensure a fine appearance of the panel unit 200.

In other words, even when the case 202 having not so much fine appearance is used, it is possible to ensure a fine appearance of the panel unit 200. In short, the case can be formed in consideration of strength and fabricating cost, not of the surface condition of the case 202.

On the overlay sheet 204, indications 204b ("ON", "OFF") in accordance with functions of the switches are printed in a large size. Therefore, even when the two switches are provided on one panel unit 200, the fabricating cost is lowered since it is not necessary to provide one overlay for each switch.

Further, when the surface 201 of the panel unit 200 is larger in size to some extent than a surface of each switch as shown in this preferred embodiment, it is possible to attach the large-sized indication 204b in accordance with the function of the switch on an available space of the surface 201 of the panel unit 200. Therefore, the operation indicator device with excellent viewability in operating the switches can be provided.

Though this preferred embodiment has been taking a case as an example where the overlay sheet on which the indications 204b are printed in accordance with the functions of the switches is used as the veneer, a simple veneer without such indications 204b may be used.

<The Eight Preferred Embodiment>

Figure 33:
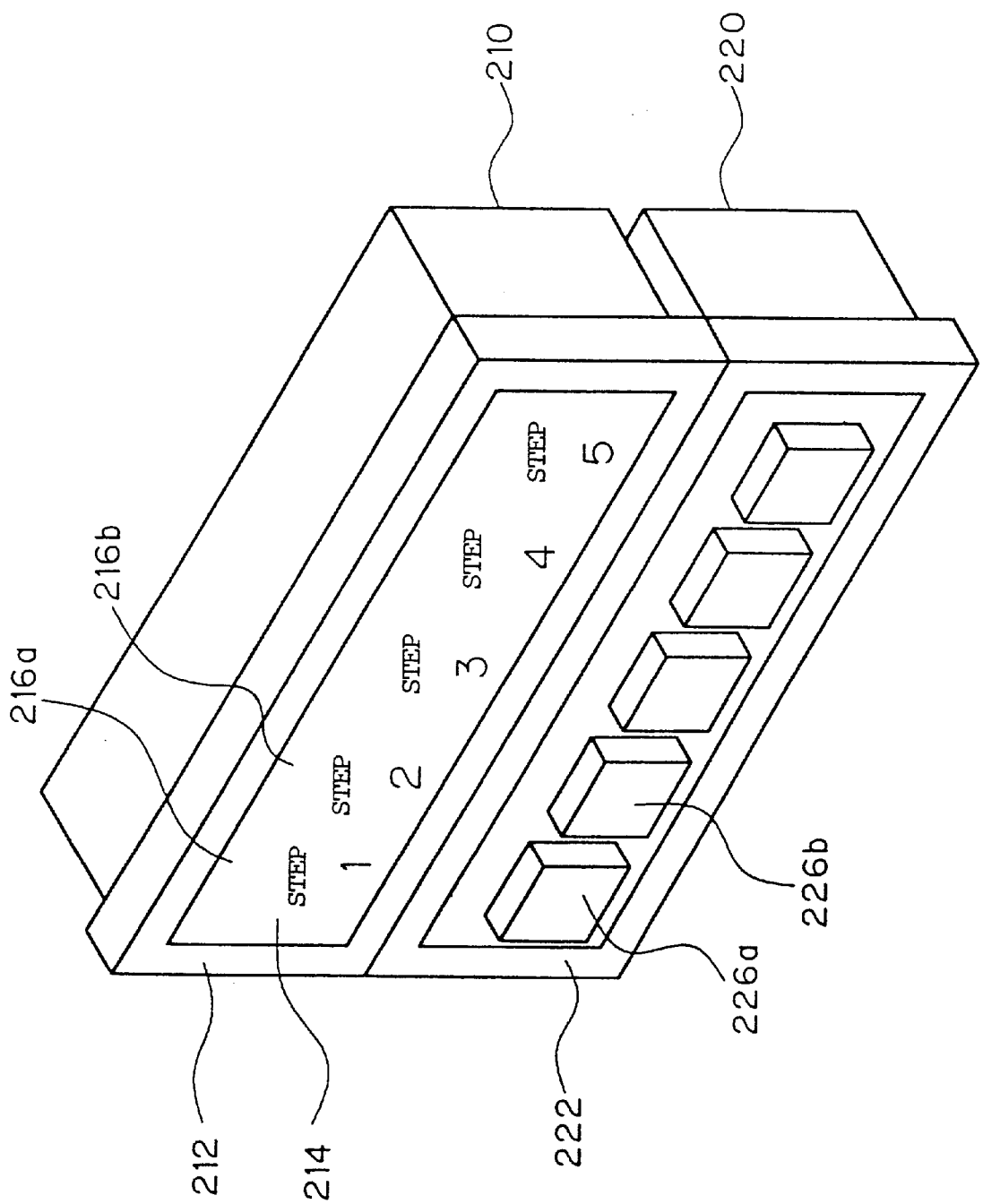
FIG. 33 is a perspective view of a panel unit 210 in accordance with an eighth preferred embodiment of the present invention.

FIG. 33 is a view for explanation of a panel unit 210 in accordance with the eighth preferred embodiment of the present invention. FIG. 33 is a perspective view of the panel unit 210. As shown in FIG. 33, the panel unit 210 comprises a case 212 and an overlay 214 provided on a surface of the case 212. In other words, the panel unit 210 is a dummy unit comprising no panel device such as a switch. On the overlay 214, indications 216a, 216b, . . . are attached in accordance with functions of another panel device unit 220 placed near the panel unit 210.

Specifically, the panel unit 220 adjacent to the panel unit 210 is a horizontal switch unit in which a plurality of switches 226a, 226b, . . . are combined, and on the overlay 214 of the panel unit 210 attached are the indications 216a, 216b, . . . in accordance with functions of the switches 0226a, 226b, . . . of the adjacent panel unit 220.

Thus, even if it is hard to attach the indications in accordance with the functions of the switches 226a, 226b, . . . on the adjacent panel unit 220, the indications 216a, 216b, . . . can be attached in a large size on almost the whole surface of the panel unit 210 which is a dummy unit. Therefore, the operation indicator device with excellent viewability in operating the adjacent panel unit 220 can be provided.

Though this preferred embodiment has been discussed taking a case as an example where the overlay with the indications is provided on the case, the indications may be provided directly on the case by e.g., printing, without the overlay.

<Specific Examples of The First to Eighth Preferred Embodiments>

Figure 34:
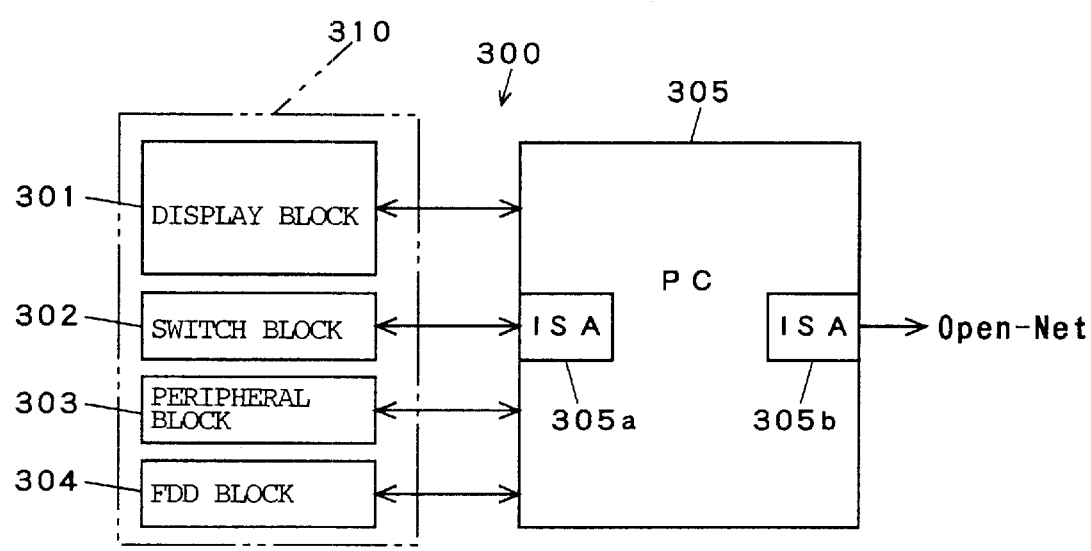
FIGS. 34 to 36 are block diagrams showing specific electrical configurations of the first to eighth preferred embodiments.
Figure 35:
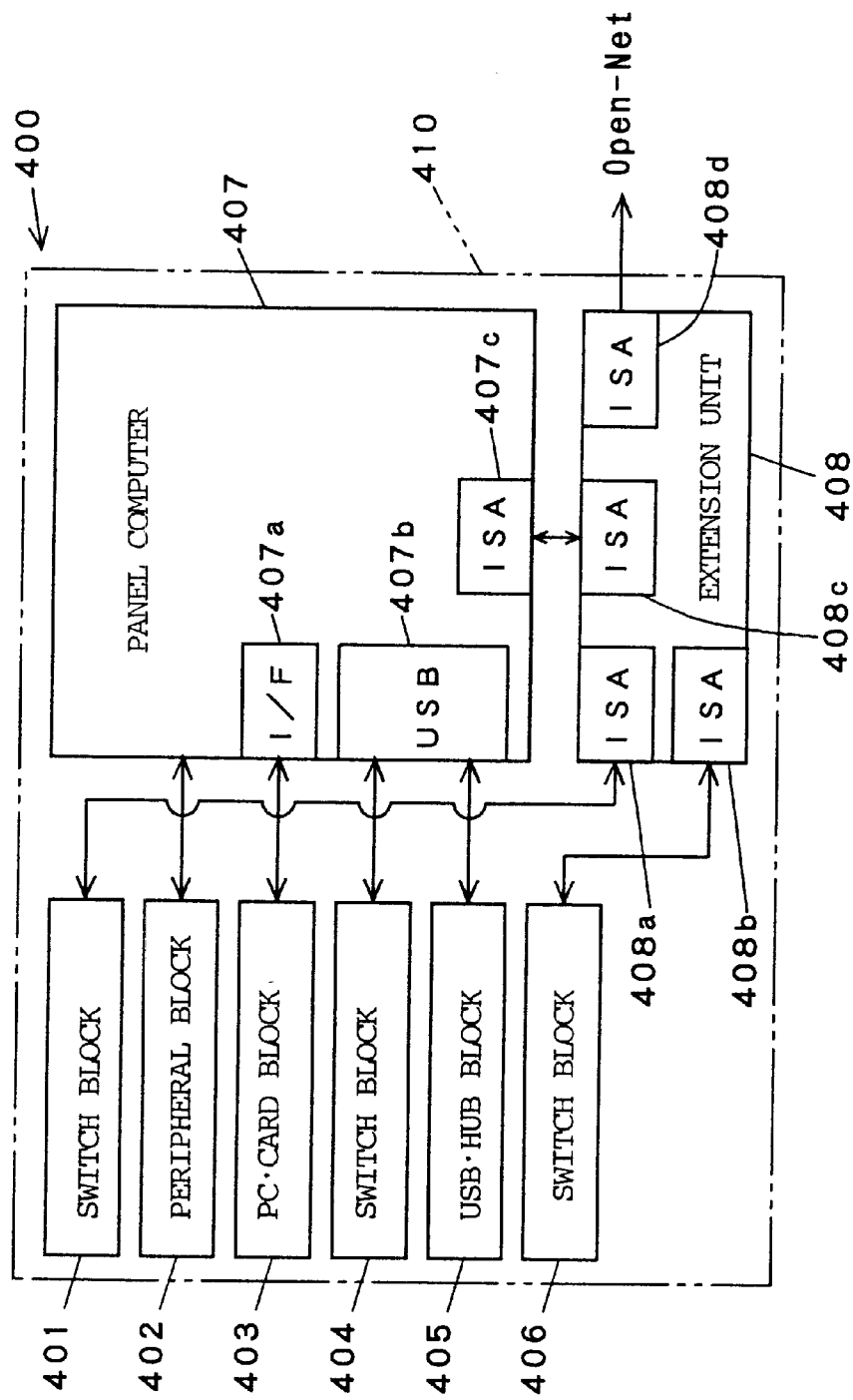
Figure 36:
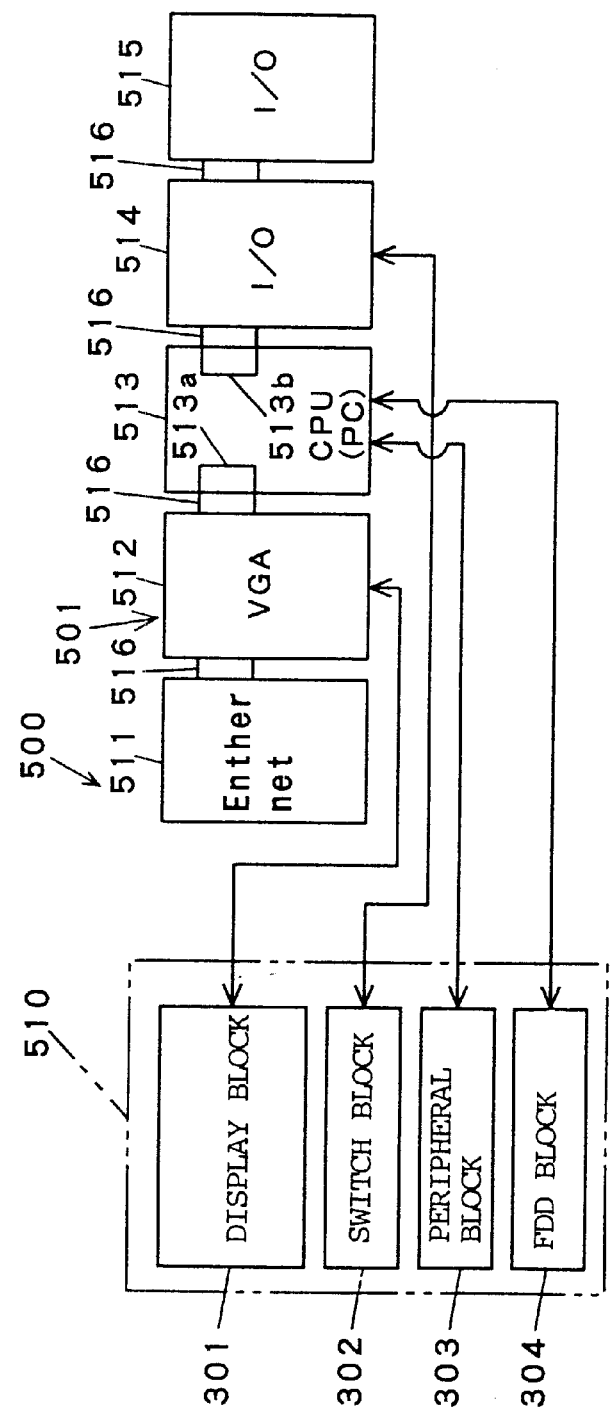

FIGS. 34 to 36 are block diagrams showing electrical configurations of operation indicating panels 300, 400 and 500 which are specific examples of the first to eighth preferred embodiments.

The operation indicating panel 300 of FIG. 34 consists of a display block 301, a switch block 302, a peripheral block 303, a FDD (Floppy Disk Drive) block 304 and a PC (Personal Computer) block 305. Among these, the display block 301, the switch block 302, the peripheral block 303 and the FDD block 304 are specific examples of the aforementioned preferred embodiments, and are standardized in blocks as discussed above and disposed in a panel surface 310 of the operation indicating panel 300 in combination with one another in the aforementioned manners. The PC unit 305 is disposed in any portion of the operation indicating panel 300, i.e., a portion on a rear-surface side of the panel surface 310.

A touch screen (touch panel) (not shown) is provided on a display surface of a display device provided in the display block 301, and an operation input can be performed by pushing operation onto an operation input area provided on the display surface as well as a display of various kinds of visually-recognized information. The switch block 302 comprises a plurality of switches which are panel devices, and sends and receives signals to and from the PC unit 305 in a parallel communication and the like. As the peripheral block 303, for example, a key-board port unit, a mouse port unit, and IrDA unit and a CD-ROM unit are provided. Though the display device in which a touch screen is provided on the display surface is used herein for the display block 301, a display device having only the display function, without a touch screen, may be used.

The PC unit 305 is electrically connected to the display block 301, the switch block 302, the peripheral block 303 and the FDD block 304 in the various aforementioned manners, to control what is displayed by the display block 301, receive an input from the touch screen attached on the display block, receive an input from the switch block 302, control the peripheral block 303 and send and receive various kinds of information to and from the peripheral block 303, control the FDD block 304 and send and receive various kind of information to and from the FDD block 304, and control and object to be controlled on the basis of the inputted information from the switch block 302 and the like.

The PC unit 305 comprises an ISA (industry Standard Architecture) bus connection units 305a and 305b, and is connected to the switch block 302 through the ISA bus connection unit 305b. A predetermined communications port connected to the ISA bus connection units (305a, 305b and the like) is not shown. The same applies to followings.

Next, the operation indicating panel 400 of FIG. 35 comprises a switch block 401, a peripheral block 402, a PC•Card block 403, a switch block 404, a USB (Universal Serial Bus) HUB block 405, a switch block 496, a panel computer 407 and an extension unit 408, as panel units, in a panel surface 410. These panel units are specific examples of the aforementioned preferred embodiments, and are standardized in blocks as discussed above and disposed in the panel surface 410 of the operation indicating panel 400 in combination with one another in the aforementioned manners.

The panel computer 407 incorporates a panel computer body and a display, and is provided with an interface connection unit 407a, a USB connection unit 407b and an ISA bus connection unit 407b.

The extension unit 408 having a plurality of ISA bus connection units 408a to 408d serves to extend the ISA bus connection unit (connection port) 407c of the panel computer 407. By connecting the extension unit 408 to the ISA bus connection unit 407c of the panel computer 408, it is possible to make an extension from one ISA bus connection unit 407c of the panel computer 407 to a plurality of (three, herein) ISA bus connection units 407c.

The switch blocks 401, 404 and 406 each comprises a plurality of switches which are panel devices. Among these, the switch block 401 is connected to the ISA bus connection unit 408a of the extension unit 408 to output signals from the switches in parallel. The switch blocks 404 and 406 each comprise a communication unit for converting signals outputted from the switches into a serial signal and output the signals from the switches as the serial signal.

Herein, the signal outputted from the switch block 404 is adaptable to the USB standard and inputted to the USB connection unit 407b of the panel computer 407 .The signal outputted from the switch block 406 is adaptable to another predetermined standard other than the USB standard and inputted to ISA bus connection unit 408a of the extension unit 408. In other words, the switch block 406 serves to create a predetermined network.

The peripheral block 402 is a block like the aforementioned peripheral block 303, and connected to the panel computer 407. The PC•Card (PCMCIA (Personal Computer Memory Card International Association)) block 403 is connected to the interface connection unit 407a of the panel computer 407, through which various kinds of PC•Cards can be connected to the panel computer 407. The USB•Hub block 405 is connected to various information processing equipment, such as computers, and the like, through which the information processing equipment and the like can be connected to the panel computer 407.

The operation indicating panel 500 of FIG. 36 consists of the display unit 301, the switch block 302, the peripheral block 303, the FDD block 304 and a control unit 501. Among these, the display block 301, the switch block 302, the peripheral block 303 and the FDD block 304 are specific examples of the aforementioned preferred embodiments, and are standardized in blocks as discussed above and disposed in a panel surface 510 of the operation indicating panel 500 in combination with one another in the aforementioned manners. The constitution of these panel units is the same as that of the aforementioned operation indicating panel 300 of FIG. 34 and detailed discussion thereon is omitted.

The control unit 501 comprises an Ethernet connection block 511, a VGA (Video Graphics Array) block 512, a CPU (PC) block 513 and input/output blocks 514 and 515. These blocks 511 to 515 are disposed in any portion of the operation indicating panel 500, i.e., a portion on a rear-surface side of the panel surface 510, being removably and electrically connected through a connection unit 516.

The Ethernet connection block 511 serves to connect the operation indicating panel 500 to a LAN (Local Area Network). The VGA block 512 controls what is displayed by the display block 301 on the basis of the control by the CPU block 513.

The input/output block 514 is connected to the switch block 312, through which an output signal from the switch block 302 is inputted to the CPU block 513. The input/output block 515 is connected to an external apparatus to be controlled.

The CPU block 513 controls what is displayed by the display block 301, receives an input from the touch screen attached on the display block 301, receives an input from the switch block 302, controls the peripheral block 303 and sends and receives various kinds of information to and from the peripheral block 303, controls the FDD block 304 and sends and receives various kinds of information to and from the FDD block 304, and controls an object to be controlled on the basis of the inputted information from the switch block 302 and the like. The CPU block 513 comprises an ISA bus connection unit 513a and a bus connection unit 513b dedicated to a PLC (Programmable Logic Controller).

<The Ninth Preferred Embodiment>

Figure 37:
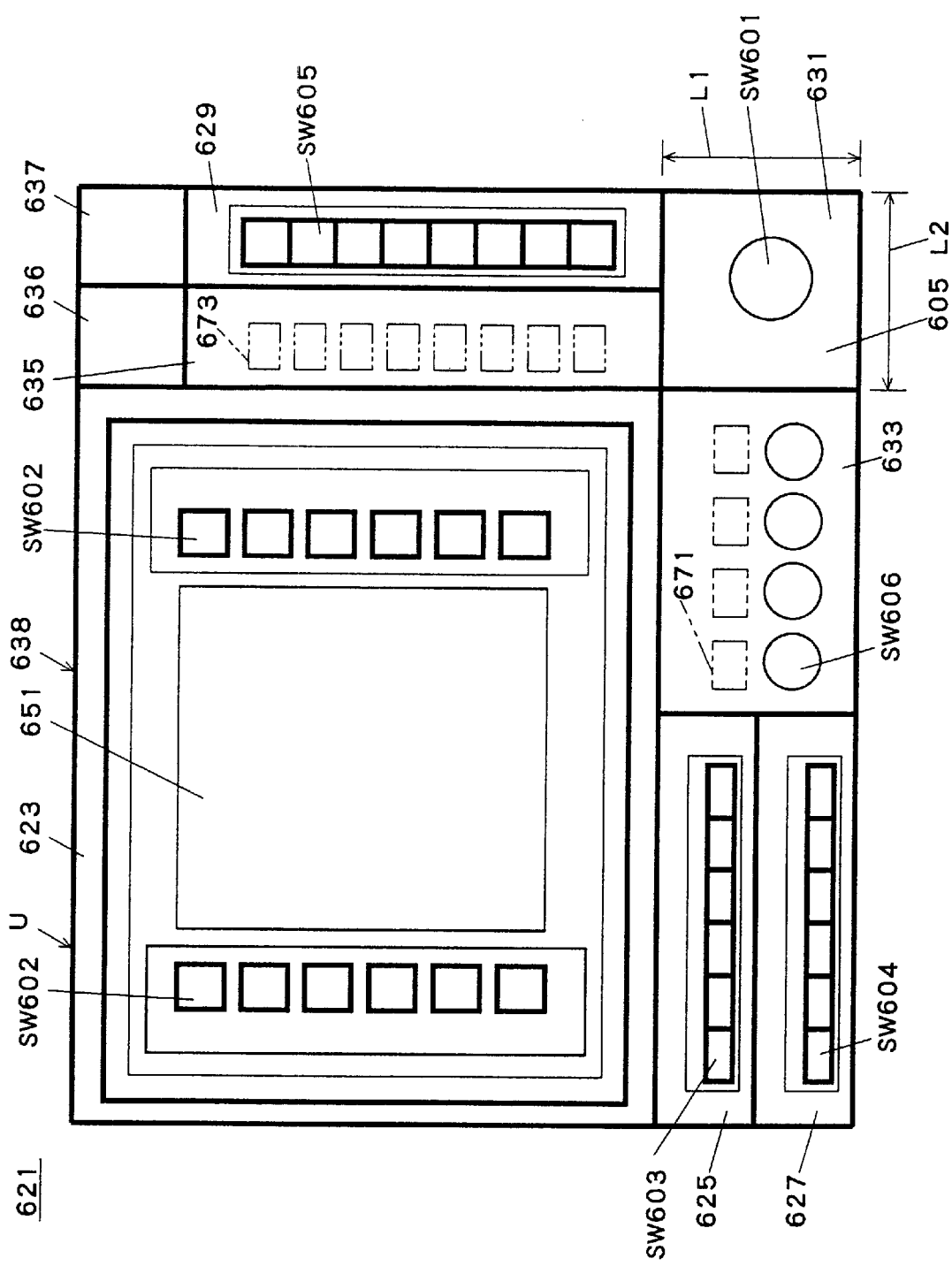
FIG. 37 is a front elevation of an operation indicator device in accordance with a ninth preferred embodiment of the present invention, i.e., a control panel 621.
Figure 38:
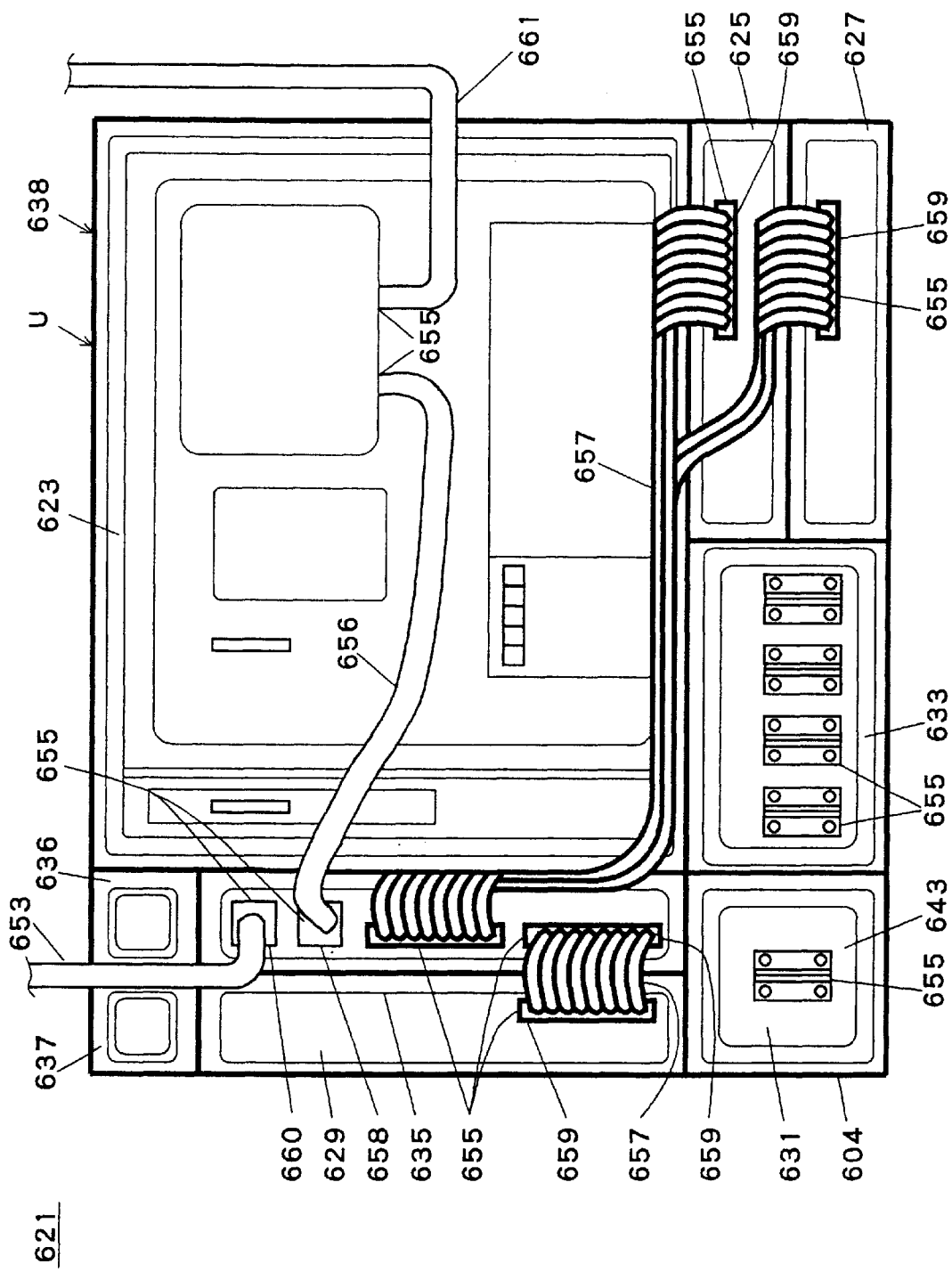
FIG. 38 is a rear elevation of the control panel 621 with a protection cover on the rear side removed.
Figure 39:
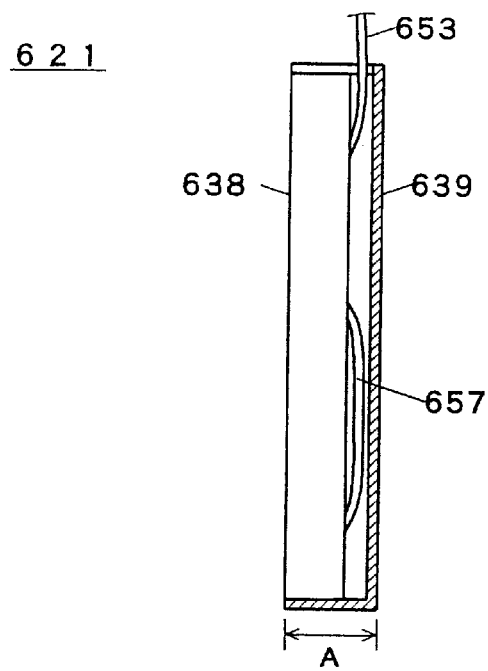
FIG. 39 is a cross section of the control panel 621.

FIG. 37 is a front elevation of a control panel which is an operation indicator device in accordance with the ninth preferred embodiment of the present invention. FIG. 38 is a rear elevation of the control panel with a protection cover on the rear-surface side removed, and FIG. 39 is a cross section of the control panel.

The control panel 621 comprises a panel body 638, a protection cover 639 mounted on a rear-surface side of the panel body 638. The panel body 638 has a constitution where various kinds of units (panel units) U, including a display and input unit 623, a plurality of input units 625, 627, 629, 631 and 633 and a communication unit (free unit) 635, dummy units 636 and 637 and the like, are two-dimensionally combined and substantially integrated. Among these units U, the dummy units 636 and 637 are mainly used to complete the panel body 638 in a predetermined shape when the units U are combined to form the panel body 638, and are not needed to control an object to be controlled.

Terminal units of the present invention include a keyboard unit, a timer unit, a counter unit, a meter unit, an indicator-lamp unit, a digit present unit and the like discussed later as variations as well as the display and the input unit 623 and the input units 625, 627, 629, 631 and 633, and circuit units include a free unit, such as a control unit and a power-supply unit, discussed later as variations as well as the communication unit 635.

These units U are each substantially of rectangular solid whose forward-facing surface S has a rectangular shape with length and width L1 and L2 which are each substantially an integral multiple of the reference size L. Each unit U has an outer frame unit 641 in a rectangular-frame shape (see FIG. 40) and a body unit 643 of rectangular solid provided in the outer frame unit 641. The body unit 643 of each unit U is provided with an operation switch SW601 and the like discussed later.

Figure 40:
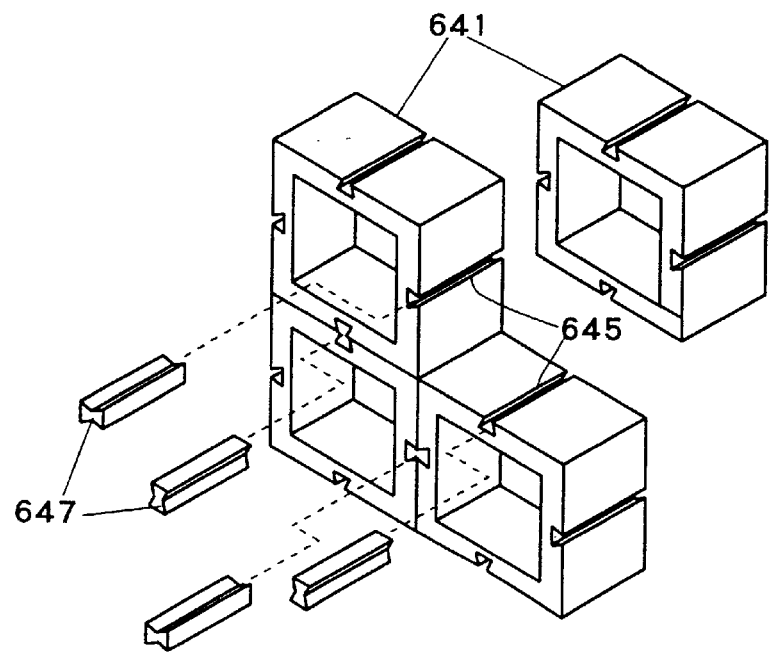
FIG. 40 is a perspective view showing a manner of combining outer frames of the units in the control panel 621.

On a side-surface portion of the outer frame unit 641 of each unit U, as shown in FIG. 40, an engagement groove (engagement portion) 645 is provided at a predetermined portion, extending along the depth of the unit U with its inner surface broaden divergently from the outer peripheral surface of the outer frame unit 641 inwardly in the direction of the radius. When the outer frame units 641 are disposed adjacently, the engagement grooves 645 of the adjacent outer frame units 641 are so provided as to face each other. Therefore, by pushing a wide 647 like a bow tie in section into the engagement grooves 645 of the adjacent outer frame units 641 facing each other, the outer frame units 641 of the units U are two-dimensionally combined.

Figure 41:
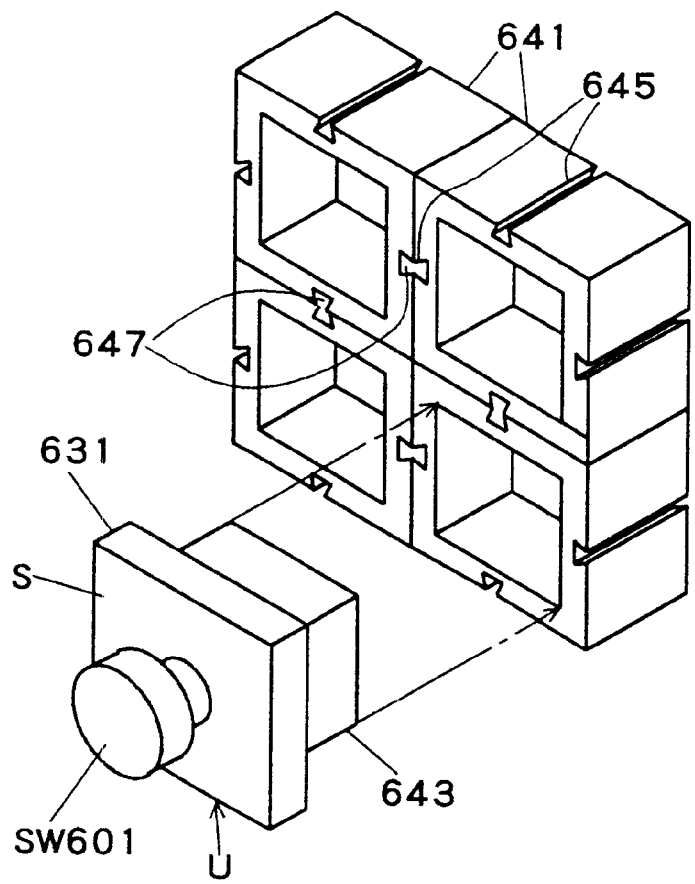
FIG. 41 is a perspective view showing a manner of mounting a body of the unit into one of the outer frames combined with one another of FIG. 40.

When the outer frame units 641 of the units U are combined with each other, as shown in FIG. 41, a plurality of units U are two-dimensionally combined by inserting the body units 643 of the units U into the corresponding outer frame units 641 to form the panel body 638, and the kind, arrangements and the like of the used unit U are changeable as needed.

The display and input unit 623 comprises a liquid crystal display panel 651 and a plurality of operation switches SW602 such as push-button switch. The visually-recognized information needed for control indicating the setting and driving conditions of the external apparatus to be controlled by the control panel 621 is displayed on the liquid crystal display 651 and predetermined operation inputs needed for control are made through the operation switches SW602.

The input units 625, 627, 629 and 633 are provided with a plurality of operation switches SW603, SW604, SW605 and SW606, respectively, such as push-button switches, and predetermined operation inputs needed to control the external apparatus are made through the operation switches SW603, SW604, SW605 and SW606. The input unit 631 is provided with the emergency-stop operation switch SW601 to make an emergency stop of the external apparatus.

The communication unit 635 has a function of converting input signals inputted in parallel from the operation switches SW602 of the display and input unit 623 and the operation switches SW603, SW604 and SW605 of the input units 625, 627 and 629 into a serial signal and outputting the serial signal as a control signal to the external apparatus to be controlled through a communication cable 653. Input signals from the operation switches SW601 and SW606 of the input units 631 and 633 are directly given to the external apparatus, not through the communication unit 635.

The dummy units 636 and 637 are units U to fill an extra space created when the units U needed to control the external apparatus are two-dimensionally combined, and use as needed. The free unit refers to a unit U, such as the communication unit 635, which is provided with no input/output unit such as an operation switch and a display device on the side of the front surface S and does not reveal its constitution on the side of the front surface S. Herein, a unit incorporating a predetermined functional element inside the outer frame unit 641 of the dummy unit is referred to as a free unit.

On a rear-surface side of each of these units U (except for the dummy units 636 and 637), as shown in FIG. 38, electrical connection units 655 are provided for making an electrical connection between the units U, and between the units U and the external apparatus or power supply lines externally supplied, to easily make wiring of the units U being two-dimensionally combined and complete the interconnection between the units U through the wiring.

Between the predetermined electrical connection units 655 of the communication unit 635 and the predetermined electrical connection units 655 of the display and input unit 623 and the input units 625, 627 and 629, a communication cable 656 and a signal line 657 for transmitting the input signals from the operation switches SW602, SW603, SW604 and SW05 to the communication unit 635 are connected with connectors 658 and 659. The communication cable 653 for transmitting the control signal to the external apparatus is connected to the predetermined electrical connection unit 655 of the communication unit 635 with a connector 660. As communication cable 661 for inputting display information from the external apparatus and the like is connected to the predetermined electrical connection unit 655 of the display and input unit 623 with a connector not shown. These connectors 658, 659, 660 and the like are all removable. In FIG. 38, connection cables connected to the input units 631 and 633 are omitted.

Further, overlay indications for indicating operation inputs assigned to the operation switches SW601 to SW606 are attached to the operation switches SW601 to SW606, as needed. When there is a sufficient extra space on the front surface S, e.g., on the input unit 633, an overlay placing area 671 large enough to make an overlay indication is obtained as shown in FIG. 37. Though there is not enough extra space on the front surface S of the input units 625, 627 and 629 and the overlay indication can be attached only in a small size, the overlay placing area 671 can be obtained on the front surface S of the free unit (communication unit 635) adjacent to the input unit 629 and the dummy units 636 and 637.

Thus, since all the units U needed to control the external apparatus are two-dimensionally and integrally disposed in this preferred embodiment, the depth A (see FIG. 39) are greatly reduced as compared with a case where the unit has a two-layer molding, consisting of a front-surface door side and a rear-surface door side, like a common box-type control box, and a fabricating process is simplified since there is no need for complicated wiring operation between the units on the front-surface door side and the rear-surface door side, unlike the common control box.

Since the electrical connection unit 655 is provided on the rear-surface side of the unit U, the wiring operation with the units U two-dimensionally combined can be performed on the rear-surface side of the panel body 638 by one operation, and is greatly simplified.

Further, since the unit U substantially in a rectangular-solid block has a planar shape of rectangle when viewed from the front, with length and width L1 and L2 which are each substantially an integral multiple of the reference size L, there is unity among the units U that allows the units U to be placed orderly without any clearance and to be easily changed and replaced, thereby satisfying the requirement of changing and adding the unit U without difficulty and improving area efficiency.

Since the plural units U can be two-dimensionally combined by inserting the wedge 647 into the engagement grooves 645 facing each other of the outer frame units 641 in the adjacent units U, the desired units U can be two-dimensionally combined in a free arrangement and the kind, arrangement and the like of the units U can be freely changed. Therefore, the control panel 621 with much higher degree of freedom can be provided.

Further, the overlay placing area 673 for the operation switches SW605 and the like provided in the input unit 629 and the like can be obtained on the front surfaces S of the free unit and the dummy units 636 and 637 adjacent to the input units U such as the input unit 629 by two-dimensionally combining the input units 625, 627, 629 and the like with the free unit such as the communication unit 635 and the dummy units 636 and 637, to make an overlay indication in a sufficiently large size and make an effective use of space.

Since the control panel 621 is provided with the communication unit 635 and the communication unit 635 converts the input signals inputted in parallel from the operation switches SW602 of the display and input unit 623 and the operation switches SW603, SW604 and SW605 of the input units 625, 627 and 629, respectively, into a serial signal and outputs the serial signal to the external apparatus to be controlled, it is possible to achieve interconnection savings for the signal line of the communication cable 653 between the external apparatus to be controlled and the control panel 621.

Further, since the control panel 621 is provided with the display and input unit 623 and the visually-recognized information on the setting and driving conditions of the external apparatus to be controlled is displayed on the liquid crystal display panel 651 of the display and input unit 623, even a complicated control can be performed well by referring to the indication of the liquid crystal display panel 651.

Since the communication unit 635 is obtained by incorporating functional elements for communication in a dummy unit which is incorporated to fill an extra space created when the display and input unit 623 and the input units 625, 627, 629, 631 and 633 are two-dimensionally combined, it is possible to make an effective use of the extra space of the control panel 621 and reduce the size of the control panel 621.

As the first variation of the control panel 621 of this preferred embodiment, a control unit having information processing functions such as a PC unit and a PLC unit which can perform programming of a predetermined control in correspondence with a predetermined input signal from the operation switches SW602 to SW605 and the like may be provided as a free unit in the same manner as the units U, for an addition to the aforementioned units U or for a replacement for any of the units U. By programming the control unit with complicated control description beforehand, even a complicated control can be made easily through simple switching operations on the input units 625, 627, 629 and the like.

As the second variation of the control panel 621 of this preferred embodiment, a power-supply unit for supplying power for the unit U which needs power supply, such as the display and input unit 623 and the communication unit 635, may be provided as a free unit in the same manner as the unit U, for an addition to the aforementioned units U or for a replacement for any of the units U. Similarly, an input unit such as a key-board unit provided with predetermined input keys, a timer unit for counting a predetermined time period and indicating the counted time, a counter unit for indicating a predetermined count value, a meter unit for indicating a predetermined measurement value, an indicator-lamp unit and an indicator unit such as a digit present unit comprising a predetermined digital indicator may be provided as a terminal unit in the same manner as the unit U, for an addition to the aforementioned units U or for a replacement for any of the units U. Thus, these various kinds of units can be provided without increasing the depth of the control panel.

As the third variation of the control panel 621 of this preferred embodiment, a portion for disposing the input units 625, 627 and 629 and the communication unit 635 may be separated back and forth and, for example, the input units 625, 627 and 629 may be provided on the front-surface side and the communication unit 635 may be provided on the rear-surface side, to provide a plurality of functional elements in one unit U. In other words, a group of units have only to be combined or disposed along a single plane and may be layered only if not separated spatially in this preferred embodiment.

As the fourth variation of the control panel 621 of this preferred embodiment, the control panel 621 of this preferred embodiment may be incorporated in a panel surface of another larger control panel.

<The Tenth Preferred Embodiment>

Figure 42:
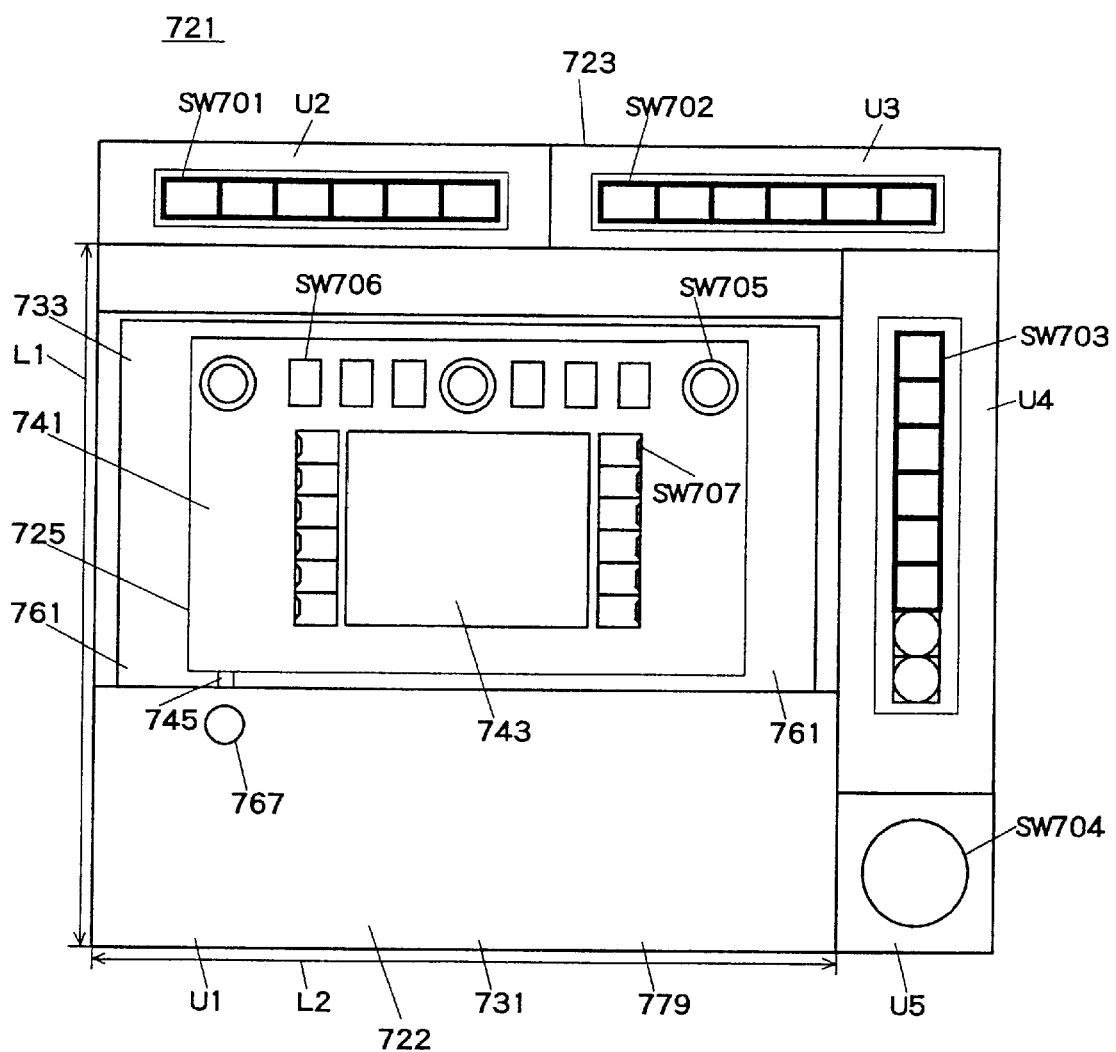
FIG. 42 is a front elevation of an operation indicator device in accordance with a tenth preferred embodiment of the present invention, i.e., a control panel 721.
Figure 43:
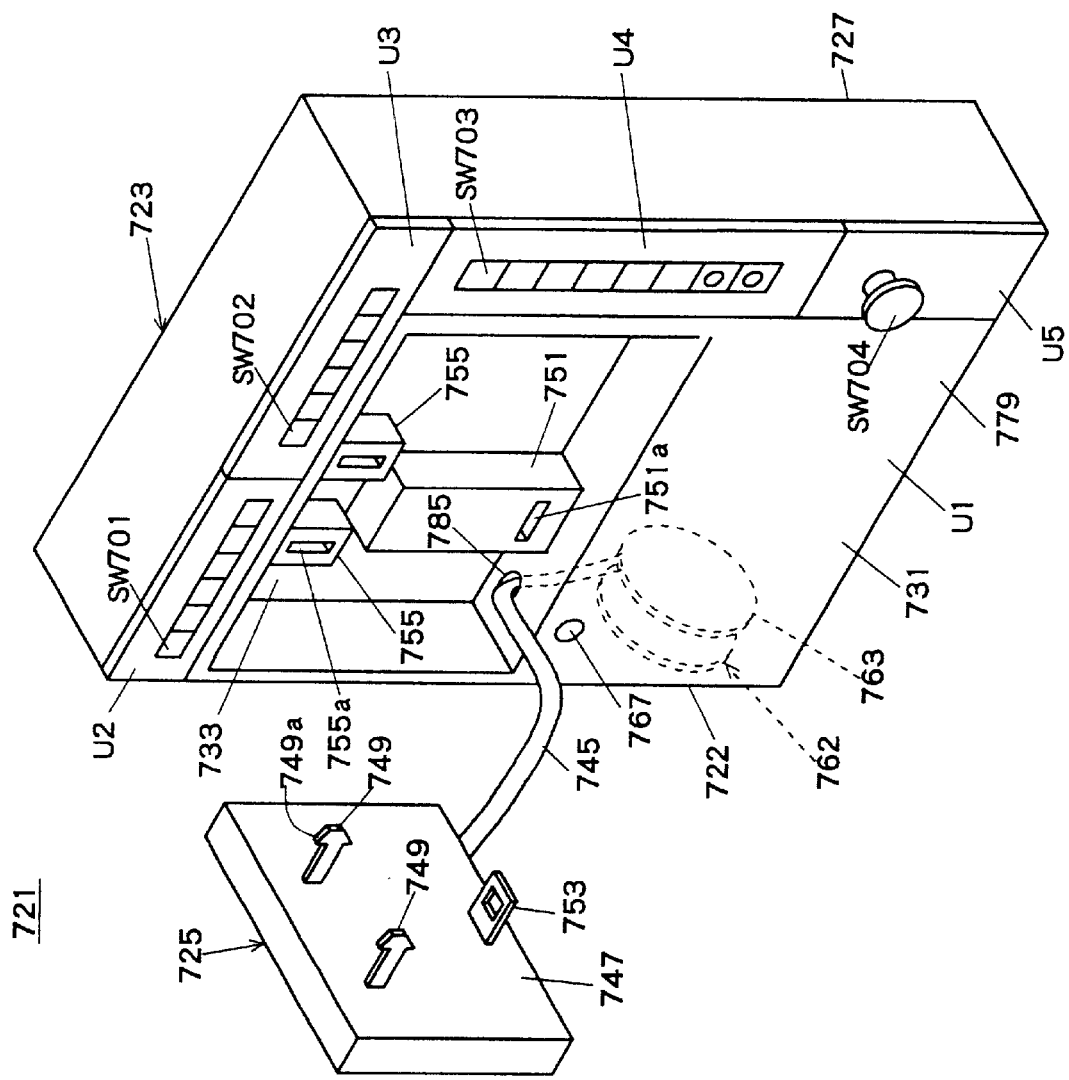
FIG. 43 is a perspective view of the control panel 721.

FIG. 42 is a plan view of a control panel which is an operation indicator device in accordance with the tenth preferred embodiment of the present invention, and FIG. 43 is a perspective view of the control panel. The control panel 721 serves to control a predetermined external apparatus based on a predetermined operation input, and comprises an outer frame member 727 and a panel body (indicator device body) 723 consisting of a plurality of units (panel units) U1 to U5 incorporated in its front-surface side.

The unit U1 comprises a unit body 722 constituting the panel body 723 together with the other units U2 to U5 in combination and an input terminal 725 provided removably to the unit body 722. The unit body 722 of the unit U1 constituting a portable unit together with the input terminal 725, and a housing recess 733 is provided on a front-surface portion 731 of the unit body 722 to house the input terminal 725.

The units U2 to U4 are input units provided with operation switches SW701 to SW703 such as push-button switches, respectively, and the unit U5 is also an input unit provided with an emergency-stop operation switch SW704 of push-switches and the like.

On a front-surface portion 741 of the input terminal 725, a plurality of operation switches SW705, a plurality of operation switches SW706 and a plurality of operation switches SW707, such as push-button switches, are provided and a liquid crystal display panel 743 is incorporated to display visually-recognized information needed for control on the setting and driving conditions of the external apparatus to be controlled. In this figure, one of the three operation switches SW705 is an emergency stop switch.

The input terminal 725 and the unit U1 of the panel body 723 are connected with a communication cable 745, and a control signal from the operation switches SW705 to SW707 and a signal needed for display on the liquid crystal display panel 743 are transmitted between the panel body 723 and the input terminal 725 through the communication cable 745. Though the transmission of the signals between the panel body 723 and the input terminal 725 is performed through the communication cable 745, it may be performed through radio communication.

On a rear-surface portion 747 of the input terminal 725, two locking members (connection units) 749 each having a locking nail 749a protruding to both sides, herein both upper and lower sides at its tip and an inserting member 753 to be inserted into a safety switch (detection unit) 751 discussed later provided in the unit body 722 are so provided as to protrude. Correspondingly to these, in the housing recess 733 of the unit body 722, two connection units 755 and a safety switch 751 are provided at positions facing the two locking members 749 and the inserting member 753 provided in the rear-surface portion 747 of the input terminal 725.

Figure 44:
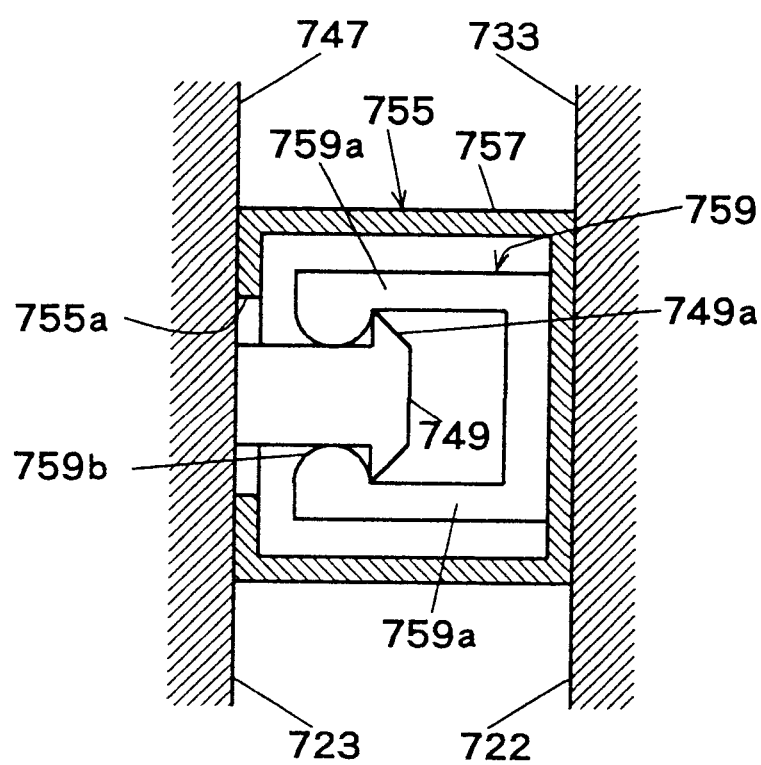
FIG. 44 is a cross section showing a state where a locking member of an input terminal in the control panel 721 is engaged with combining means of a panel body.

In a case 757 of each of the connection units 755, as shown in FIG. 44, provided is a locking member 759 having two elastic arms 759a provided at a predetermined interval in a direction for the locking nail 749a of the locking member 749 in the input terminal 725 to protrude. At a tip of each of the elastic arms 749a provided is a locking portion 759b having a semicircle section. The locking portions 759 protrude from the respective tips of the elastic arms in directions to face each other.

Therefore, in the mounting operation of the input terminal 755, when the locking nails 749a of the locking member 749 are inserted from an opening portion 755a on a front surface of the case 757 and pushed in between both the locking portions 759b, the locking nails 749a goes between both the elastic arms 759a while bending both the elastic arms 759a in directions to depart from each other. At the point of time when the locking nails 749a pass between both the locking portions 759b, as shown in FIG. 44, both the locking portions 759b engage (are connected) with the locking nails 749a from both sides, to fix the input terminal 725 in the housing recess 733 of the unit body 722.

When the input terminal 725 is pulled in this state of connection, the locking nails 749a of the locking member 749 retract from between both the elastic arms 59a, pushing both the elastic arms in opposite directions, to release the engagement (connection) of the locking nails 749a and both the elastic arms 759a. This constitution of the engagement member 749 and the connection unit 755 is only an example, and a constitution for engagement is not limited to this.

The safety switch 751 comprises a detection switch therein, not shown, for detecting mount/removal of the input terminal 725 by turning on/off in response to the inserting/pulling-out operation of the insertion member 753 of the input terminal 725 to/from the opening portion 751a on its front surface accompanying the mount and removal of the input terminal 725. With the input terminal 725 removed from the panel body 723, the safety switch 751 thereby has a function to cut the communication line from the operation switch, among the operation switches SW701 to SW704 of the panel body 723, which has a possibility of confusing the control due to independent operation inputs by the panel body 723 and the input terminal 725, herein the operation switches SW701 to SW703 to the external apparatus, to stop receiving the operation input from the operation switches SW701 to SW703.

With the input terminal 725 mounted on the panel body 723, the operation of the safety switch 751 to stop receiving the operation switches SW701 to SW703 is released. The operation inputs from the operation switches SW705 to SW707 of the input terminal 725 and the operation switch SW704 for emergency stop of the panel body 723 are available, independently of whether the input terminal 725 is mounted or removed.

The operation switches SW701 to SW703 of the panel body 723 and the operation switches SW705 to SW707 of the input terminal 725 may be assigned like function and command or different function and the like depending on uses. With the input terminal 725 removed from the panel body 723, the operation inputs are individually made on the side of the panel body 723 and the side of the input terminal 725 by stopping receiving the operation inputs from the operation switches SW701 to SW703 of the panel body 723, to prevent confusion of controls.

The housing recess 733 provided on the front-surface portion 731 of the unit body 722 has a planar shape of rectangle when viewed from the front and a width in a left-and-right direction larger than the width in a left-and-right direction of the input terminal 725 of rectangle by a predetermined size. As a result, with the input terminal 725 mounted in the housing recess 733, there are clearances 761 large enough for a hand to insert between left and right side surface portions of the input terminal 725 and the left and right inner surfaces of the housing recess 733.

Figure 45:
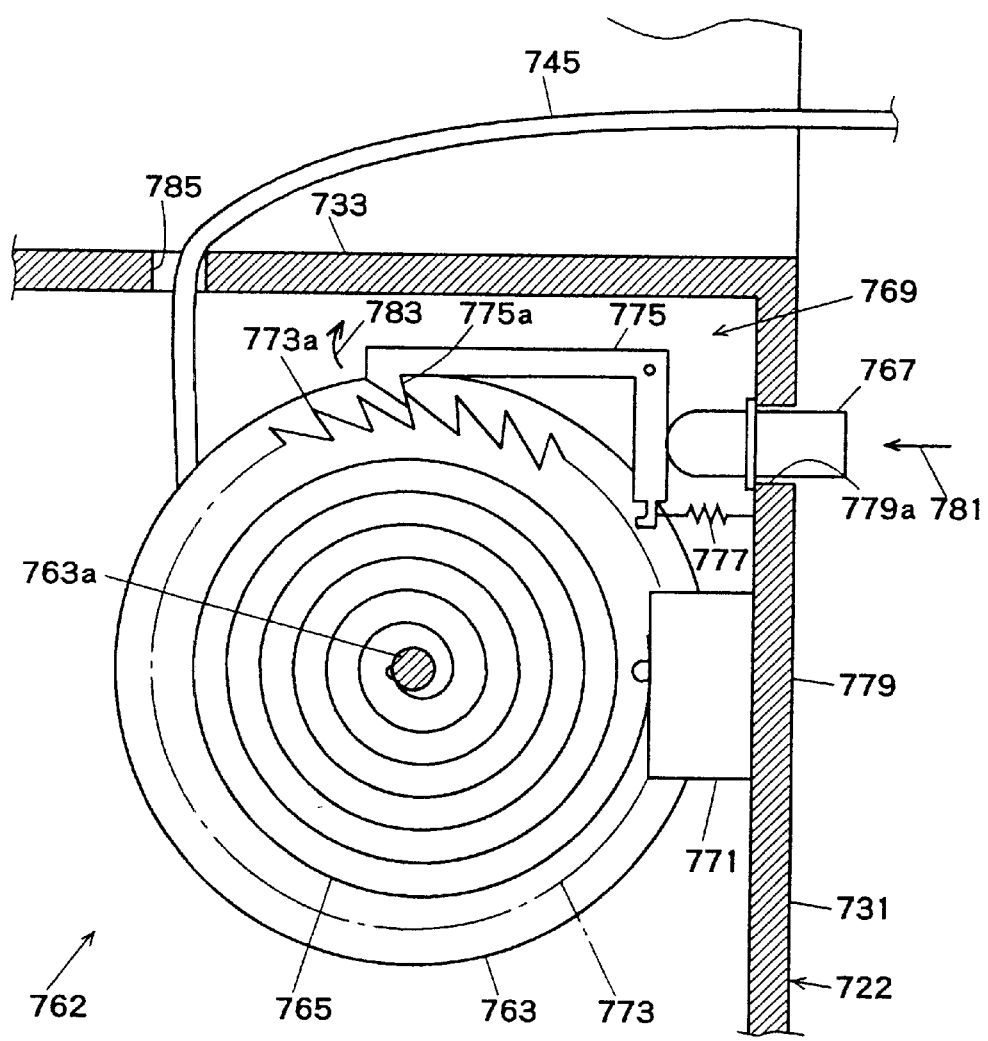
FIG. 45 is cross section showing a structure of a cable take-up reel in the unit body of the unit in the control panel 721.

Inside the unit body 722, as shown in FIG. 45, provided is a cable take-up reel 762 for taking up the communication cable 745. This constitution of the cable take-up reel 762 is only an example, and a constitution thereof is not limited to this.

The cable take-up reel 762 comprises a reel 763 for winding up the communication cable 745, a spring 765 for rotatably driving the reel 763 in a direction of winding up the communication cable 745 and a locking mechanism 769. The locking mechanism 769 permits the rotation in a direction for the reel 763 to send out and blocks the rotation of the reel 763 in a direction of taking up by an urging force of the spring 765. The locking mechanism 763 is interlocked with a push button 767 provided on the front-surface portion 731 of the unit body 722 and permits the rotation of the take-up reel 763 in a direction of taking up, which has been blocked until then, in response to a pushing operation of the pushing button 767.

The spring 765 is connected to a rotary shaft 763a of the reel 763, whose one end is rotated integrally with the reel 763, and always urges the reel 763 in the direction of taking up, with the other end of the rotary shaft 763a fixed to a predetermined fixing position 771 in the unit body 722. Therefore, when the communication cable 745 is pulled out to rotate the reel 763 in the direction of sending out, the spring 765 is wound to accumulate elastic energies. Though the spring 765 is used herein, a coil spring and the like may be used.

The locking mechanism 769 comprises a gear member 773 having a plurality of gear teeth 773a at its outer peripheral portion and a latch member 775 which is engaged with the gear teeth 773a of the gear member 773 to block the rotation of the gear member 773 and the reel 763 in the direction of taking up. The gear member 773 is rotated integrally with the reel 763.

The latch member 775 has an L shape, being supported rotatably around its base end 775a, and its one tip is provided with an engagement nail 775a to be engaged with the gear teeth 773a of the gear member 773. The other tip is pulled by a pulling spring 777 in a direction for the engagement nail 775a to be engaged with the gear teeth 773a of the gear member 773, to basically always engage the engagement nail 775a with the gear member 773.

The gear tooth 773a of the gear member 773 is provided, being so inclined backward relative to the direction of sending out as to be in a forward direction relative to the direction for the reel 763 to send out. Therefore, when the reel 763 rotates in the direction of sending out, the latch member 775 permits the rotation of the gear member 773 and the reel 763, and when the reel 763 rotates in the direction of winding up, the latch member 775 blocks the rotation of the gear member 773 and the reel 763.

The push button 767 is provided in a through hole 779a of a front-side wall portion 779 in the unit body 722 slidably back and forth. When the push button 767 is pushed in as indicated by an arrow 781, the push button 767 pushingly moves the tip of the latch member 775 on which no engagement nail 775a is provided and the latch member 775 is rotated in a direction for the engagement nail 775a to depart from the gear member 773 against a force of the pulling spring 777 as indicated by an arrow 783, to release the engagement of the latch member 775 and the gear member 773. As a result, while the push button 767 is pushed in against the pulling spring 777, the rotation of the reel 763 in the direction of winding up is permitted and the reel 763 is driven to rotate in the direction of winding up by the accumulated elastic energies of the spring 765, to take up the communication cable 745.

In other words, the communication cable 745 is retracted inside of the unit body 722 through a hold 785 provided in the inner peripheral surface of the housing recess 733, being wound up around the take-up reel 763. By pushing the push button 767, the pulled-out communication cable 745 is retracted inside the unit body 722 to be housed therein through a one-touch operation.

The units U1 to U5 constituting the panel surface of the control panel 723 are each formed in a block so as to have a rectangular shape when viewed from the front, especially, so that the front-surface portion 731 has a rectangular shape, with length and width L1 and L2 which are each substantially an integral multiple of the reference size L. These units U1 to U5 are two-dimensionally combined with one another to constitute a panel surface, to make it possible to flexibly meet the requirement for changing the arrangement of the units U1 to U5, replacing them by other units (panel units) and adding another unit as needed.

In this preferred embodiment, an excellent circumstances for operation inputs can be provided since the input terminal 725 can be removed form the panel body 723 as needed and the operation input can be performed through the input terminal 725, and better operation inputs can be achieved through the input terminal 725 without difficulty in operation input due to oscillation of the input terminal 725 even with the input terminal 725 mounted since the input terminal 725 is firmly fixed to the front-surface portion 731 of the panel body 723 with the engagement member 749 and the connection unit 755 when the input terminal 725 is mounted on the panel body 723.

Since the connection unit 755 fixes the input terminal 725 to the unit body 722 in conjunction with the engagement member 749 of the input terminal 725 in response to the mounting operation of the input terminal 725 while it releases the conjunction with the engagement member 749 in response to the removing operation, an operator does not take the trouble to establish or release connection between the input terminal 725 and the panel body 723 when the input terminal is mounted or removed, and can gain excellent operability.

When the input terminal 725 is mounted on the panel body 723, the safety switch 751 stops receiving the operation inputs from the operation switches SW701 to SW703 each of which has a possibility of confusing the control if the operation inputs are performed independently on the panel body 723 and the input terminal 725. Therefore, with the input terminal 725 removed, the operation inputs from the operation switches SW706 to SW707 of the input terminal 725 can be performed prior to those from the operation switches SW701 to SW703 of the panel body 723, to prevent confusion of control due to the operation inputs from both the panel body 723 and the input terminal 725. Since the emergency stop switch SW704 provided on the panel body 723 can be used even with the input terminal 725 removed, an emergency stop can be given by both the panel body 723 and the input terminal 725.

Since the safety switch 751 stops receiving the inputs from the operation switches SW701 to SW703 and releases the stop in accordance with the mount and removal of the input terminal 725, it is possible to reliably stop receiving the inputs from the operation switches SW701 to SW703 and release the stop in accordance with the mount and removal of the input terminal 725, and a better operability is achieved since it is not needed for an operator to take the trouble to switch the receiving condition of the inputs from the operation switches SW701 to SW703 of the panel body 723.

Since the input terminal 725 comprises the liquid crystal display panel 743 for displaying the visually-recognized information needed for the control on the setting condition, the driving condition and the like of the external apparatus to be controlled, a complicated control can be performed well by referring to the indication of the liquid crystal display panel 743.

Since the input terminal 725 mounted on the panel body 723 is housed in the housing recess 733 of the unit U1, it is possible to prevent a breakage of the input terminal 725 due to an accidental contact with some obstacles when mounted and to achieve a flat configuration of the front-surface portion 731 of the panel body 723 with the input terminal mounted, making the front-surface portion 731 simple in design.

Since there are predetermined clearances between the input terminal 725 and the inner peripheral surface of the housing recess 733 on both left and right sides of the input terminal 725 with the input terminal mounted on the panel body 723, it is possible for an operator to insert his hands into the clearances 761 and hold the input terminal 725 to be removed in the removing operation of the input terminal 725, with better operability in removing the input terminal 725.

The communication cable 745 connecting the panel body 723 and the input terminal 725 is taken up around the reel 763 in the unit body 722 through a one-touch operation and housed inside the unit body 722. Therefore, a better operability is achieved with the input terminal 725 mounted since it is not needed for an operator to take the trouble to house the communication cable 745 when the input terminal 725 is mounted. It is possible to prevent the communication cable 745 from hanging down over the front-surface portion 731 of the panel body 723 and obstructing the operation inputs with the input terminal 725 mounted. The front-surface portion 731 of the panel body 723 becomes simple, to achieve an improvement in design.

The units U1 to U5 constituting the panel surface of the control panel 721 are each formed in a block so as to have a rectangular shape when viewed from the front, especially, so that the front-surface portion 731 has a rectangular shape, with length and width L1 and L2 which are each substantially an integral multiple of the reference size L, thereby ensuring unify and allowing free change of combination. Therefore, it is possible to combine the units U1 to U5 without any clearance and flexibly meet requirements for changing arrangement of the units U1 to U5, replacing the units, adding another unit and the like, and the area efficiency is improved.

Figure 46:
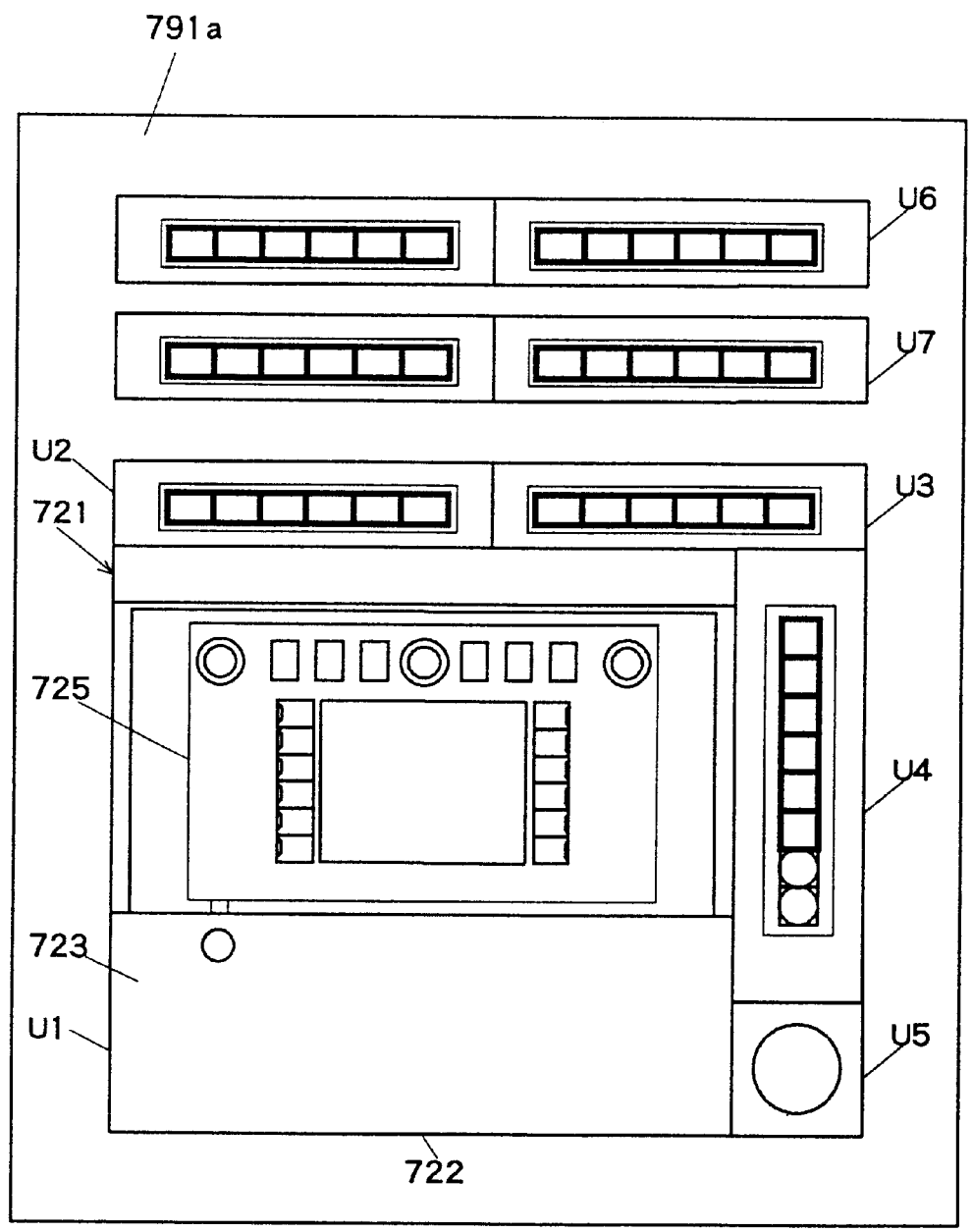
FIG. 46 is a front elevation of a control panel 791 in accordance with a variation of the tenth preferred embodiment.

FIG. 46 is a front elevation of a variation of the control panel 721 in accordance with this preferred embodiment. The control panel 791 in accordance with the variation is a control panel larger than the aforementioned control panel 721, and its panel surface 791a incorporates the control panel 721 together with other units (panel units) U6 and U7. When the control panel 721 is incorporated in the panel surface 791a of other control panel 791, only a hole for incorporating the control panel 721 in accordance with the standard has to be provided on the panel surface 791a of the control panel 791 since the units U1 to U5 in the control panel 721 are standardized, and that improves fabricating efficiency of the control panel 791.

Though the housing recess 733 for housing the input terminal 725 is provided on the front-surface portion 731 of the unit body 722, there may be another constitution where the aforementioned connection unit 755 and the safety switch 751, instead of the housing recess 733, are mounted on (or buried in) the flat front-surface portion 731 and the input terminal 725 is connected and fixed to the unit body 722, protruding from the front-surface portion 731 of the unit body 722.

While the invention has been shown and described in detail, the foregoing description in all aspects illustrative and not restrictive. It is therefore understood that numerous modifications and variations can be devised without departing from the scope of the invention.

We claim:
1. An operation indicator device for performing at least one of control and management of a predetermined external apparatus, comprising:
a plurality of panel units, each having a surface of polygon whose side is substantially perpendicular to its adjacent side and has a size being substantially an integral multiple of a predetermined reference size (L), said plurality of panel units being placed adjacently to one another so that a whole surface (AS) consisting of all said surfaces of said plurality of panel units should have a predetermined polygonal shape, said polygonal shape of said whole surfaced having a side which is substantially perpendicular to its adjacent side and has a size being substantially an integral multiple of said predetermined reference size; and
combining means for combining said plurality of panel units;
wherein said surface of each of said panel units is rectangular; and
wherein said whole surface of said plurality of panel units combined with one another is rectangular; and
wherein said combining means comprises a mount member on which each of said plurality of panel units is mounted.

2. An operation indicator device for performing at least one of control and management of a predetermined external apparatus, comprising:
a plurality of panel units, each having a surface of polygon whose side is substantially perpendicular to its adjacent side and has a size being substantially an integral multiple of a predetermined reference size (L), said plurality of panel units being placed adjacently to one another so that a whole surface (AS) consisting of all said surfaces of said plurality of panel units should have a predetermined polygonal shape, said polygonal shape of said whole surface having a side which is substantially perpendicular to its adjacent side and has a size being substantially an integral multiple of said predetermined reference size; and
combining means for combining said plurality of panel units;
wherein said surface of each of said panel units is rectangular; and
wherein said whole surface of said plurality of panel units combined with one another is rectangular; and
wherein said combining means comprises
a combining unit for combining said plurality of panel units with one another to constitute a panel unit combination body; and
a mount member on which said panel unit combination body is mounted.

3. The operation indicator device of claim 2, wherein said combining means comprises an engagement portion (124) provided in each of said plurality of panel units, and
said plurality of panel units are combined with one another by the medium of said engagement portion.

4. The operation indicator device of claim 2, wherein said combining means comprises
a plurality of unit frames (90) for holding said plurality of panel units, and
said plurality of panel units are combined with one another by combining said plurality of unit frames.

5. The operation indicator device of claim 3, further comprising
a sealing member (100) for sealing a clearance between said surfaces of said plurality of panel units in a fluid-tight manner,
wherein said sealing member is formed by removing part of a two-dimensional grid, and
said two-dimensional grid has a grid pitch substantially corresponding to said reference size.

6. An operation indicator device for performing at least one of control and management of a predetermined external apparatus, comprising:

a plurality of panel units, each having a surface of polygon whose side is substantially perpendicular to its adjacent side and has a size being substantially an integral multiple of a predetermined reference size (L), said plurality of panel units being placed adjacently to one another so that a whole surface (AS) consisting of all said surfaces of said plurality of panel units should have a predetermined polygonal shape, said polygonal shape of said whole surface having a side which is substantially perpendicular to its adjacent side and has a size being substantially an integral multiple of said predetermined reference size; and combining means for combining said plurality of panel units;

wherein said surface of each of said panel units is rectangular; and wherein said whole surface of said plurality of panel units combined with one another is rectangular; and wherein at least one of said plurality of panel units comprises an interunit communication unit for making communication among said plurality of panel units.

7. An operation indicator device for performing at least one of control and management of a predetermined external apparatus, comprising:

a plurality of panel units, each having a surface of polygon whose side is substantially perpendicular to its adjacent side and has a size being substantially an integral multiple of a predetermined reference size (L), said plurality of panel units being placed adjacently to one another so that a whole surface (AS) consisting of all said surfaces of said plurality of panel units should have a predetermined polygonal shape, said polygonal shape of said whole surface having a side which is substantially perpendicular to its adjacent side and has a size being substantially an integral multiple of said predetermined reference size; and combining means for combining said plurality of panel units;

wherein said surface of each of said panel units is rectangular; and wherein said whole surface of said plurality of panel units combined with one another is rectangular; and wherein at least one of said plurality of panel units comprises an external communication unit for making communication with said external apparatus.

8. An operation indicator device for performing at least one of control and management of a predetermined external apparatus, comprising:

a plurality of panel units, each having a surface of polygon whose side is substantially perpendicular to its adjacent side and has a size being substantially an integral multiple of a predetermined reference size (L), said plurality of panel units being placed adjacently to one another so that a whole surface (AS) consisting of all said surfaces of said plurality of panel units should have a predetermined polygonal shape, said polygonal shape of said whole surface having a side which is substantially perpendicular to its adjacent side and has a size being substantially an integral multiple of said predetermined reference size; and combining means for combining said plurality of panel units;

wherein said surface of each of said panel units is rectangular; and wherein said whole surface of said plurality of panel units combined with one another is rectangular; and wherein at least one of said plurality of panel units is an intermediary panel unit which is connected to another one of said plurality of panel units with an interunit electric-signal path and connected to said external apparatus with an interunit electric-signal path, to indirectly connect said another one of said plurality of panel units to said external apparatus.

9. The operation indicator device of claim 1, wherein said plurality of panel units (U) are placed adjacently along a single plane to constitute a panel-like panel body.

10. An operation indicator device for performing at least one of control and management of a predetermined external apparatus, comprising:

a plurality of panel units, each having a surface of polygon whose side is substantially perpendicular to its adjacent side and has a size being substantially an integral multiple of a predetermined reference size (L), said plurality of panel units being placed adjacently to one another so that a whole surface (AS) consisting of all said surfaces of said plurality of panel units should have a predetermined polygonal shape, said polygonal shape of said whole surface having a side which is substantially perpendicular to its adjacent side and has a size being substantially an integral multiple of said predetermined reference size; and combining means for combining said plurality of panel units;

wherein said plurality of panel units (U) are placed adjacently along a single plane to constitute a panel-like panel body;

wherein said plurality of panel units are a group of units including a terminal unit for performing at least one of operation input display and a circuit unit not having an input/output unit on its front-surface side, and interconnection among said panel units of said group of units is completed by a wire attached to said panel body.

11. The operation indicator device of claim 10, wherein a connection end used for said interconnection among said panel units of said group of units and a connection end of a connection line from said group of units to said external apparatus are provided on a rear-surface side of said panel body.

12. The operation indicator device of claim 11, wherein at least one of said plurality of panel units is a dummy unit (635, 636, 637) in which said circuit unit is incorporated.

13. The operation indicator device of claim 12 wherein said terminal unit includes an input unit (625, 627, 629, 631, 633) comprising a plurality of operation switches, and said circuit unit includes a communication unit (635) for converting input signals for control given in parallel by said plurality of operation switches of said input unit into a serial control signal and outputting said serial control signal to said external apparatus.

14. The operation indicator device of claim 12, wherein said terminal unit includes a display unit (623) for displaying a predetermined visually-recognized information.

15. The operation indicator device of claim 12, wherein said terminal unit includes an input unit (625, 627, 629, 631, 633) comprising a plurality of operation switches, and said circuit unit includes a program-type control unit receiving an input signal for control given by said input unit, for giving said external apparatus a command indicating how to control which is determined beforehand in correspondence with said input signal.

16. The operation indicator device of claim 12, wherein said circuit unit includes a power supply unit for supplying power to said panel unit that needs a power supply among said group of units.

17. An operation indicator device for performing at least one of control and management of a predetermined external apparatus, comprising:

a plurality of panel units, each having a surface of polygon whose side is substantially perpendicular to its adjacent side and has a size being substantially an integral multiple of a predetermined reference size (L), said plurality of panel units being placed adjacently to one another so that a whole surface (AS) consisting of all said surfaces of said plurality of panel units should have a predetermined polygonal shape, said polygonal shape of said whole surface having a side which is substantially perpendicular to its adjacent side and has a size being substantially an integral multiple of said predetermined reference size; and combining means for combining said plurality of panel units;

wherein at least one (U1) of said plurality of panel units comprises a unit body;

an input terminal provided removably on said unit body and capable of sending/receiving a signal needed for control of said external apparatus to/from said unit body through a cable or a radio; and a connection unit provided on a front-surface portion of said unit body and said input terminal, for combining said input terminal and said front-surface portion of said unit body to be fixed in response to a mounting operation of said input terminal and releasing the connection between said input terminal and said unit body in response to a removal operation.

18. The operation indicator device of claim 17, wherein an indicator device body (723) constituted of combination of said unit body and other panel units (U2 to U5) among said plurality of panel units and said input terminal each have a predetermined group of operation switches (SW701 to SW706), and said unit body comprises a detection unit (751) for detecting removal of said input terminal from said unit body to stop receiving said operation input from at least some (SW701 to SW703) of said group of operation switches provided in said indicator device body.

19. The operation indicator device of claim 17, wherein said input terminal further comprises a display unit (743) for displaying a predetermined visually-recognized information needed for controlling said external apparatus.

20. The operation indicator device of claim 17, wherein a housing recess (733) for housing said input terminal fixed to said unit body with said connection unit is provided on said front-surface portion of said unit body.

21. The operation indicator device of claim 20, wherein at least part of peripheral portion of said housing recess of said unit body is extended outwardly from an exterior of said input terminal to create a predetermined clearance (761) between said input terminal and an inner peripheral surface of said housing recess.

22. The operation indicator device of claim 17, wherein said unit body and said input terminal are connected with a communication cable (745), and said unit body further comprises a cable take-up reel (762) for sending out said communication cable in response to a pulling operation for said communication cable and rewinding said communication cable which is sent out in response to a predetermined operation.

23. A panel unit mounted on a panel surface of an operation indicator device together with another panel unit, for performing at least one of control and management of a predetermined external apparatus, comprising:

a unit body having a surface of rectangle whose side is substantially perpendicular to its adjacent side and has a size being an integral multiple of a reference size (L), which is a constituent of at least part of said panel surface; and combining means for combining said unit body with another panel unit;

said unit body comprises a plurality of panel devices combined with one another;

wherein a collective terminal unit having a plurality of input/output terminals connected of terminals of said plurality of panel devices.

24. A panel unit mounted on a panel surface of an operation indicator device together with another panel unit, for performing at least one of control and management of a predetermined external apparatus, comprising:

a unit body having a surface of rectangle whose side is substantially perpendicular to its adjacent side and has a size being an integral multiple of a reference size (L), which is a constituent of at least part of said panel surface; and combining means for combining said unit body with another panel unit;

said unit body comprises a plurality of panel devices combined with one another;

wherein said unit body comprises a serial terminal for communicating a serial signal; and a signal converting unit for converting a signal between said serial terminal and terminals of said plurality of panel devices.

25. A panel unit mounted on a panel surface of an operation indicator device together with another panel unit, for performing at least one of control and management of a predetermined external apparatus, comprising:

a unit body having a surface of rectangle whose side is substantially perpendicular to its adjacent side and has a size being an integral multiple of a reference size (L), which is a constituent of at least part of said panel surface; and combining means for combining said unit body with another panel unit;

said unit body comprises a plurality of panel devices combined with one another;

wherein terminals of said plurality of panel devices are fixed on a printed board and a portion of each of said panel devices is removable from said terminals.

26. A panel unit mounted on a panel surface of an operation indicator device together with another panel unit, for performing at least one of control and management of a predetermined external apparatus, comprising:

a unit body having a surface of rectangle whose side is substantially perpendicular to its adjacent side and has a size being an integral multiple of a reference size (L), which is a constituent of at least part of said panel surface; and combining means for combining said unit body with another panel unit;

wherein said combining means comprises
a mount frame having an engagement portion,
said unit body comprises a first panel device removably held in said mount frame, and
said engagement portion can be engaged with said another panel units or other mount frame.

27. The panel unit of claim 26, wherein
said surface (192) of said panel unit includes a surface (190) of said first panel device and a surface (178) of said mount frame.

28. The panel unit of claim 27, wherein
a second panel device (168, 170) is mounted on said mount frame.

29. The panel unit of claim 28, wherein
said first panel device and said second panel device are connected with an electric-signal path and an input or an output can be made to said first panel device through said second panel device.

30. The panel unit of claim 26, wherein
an electrical function element is further mounted on said mount frame, and
said first panel device or other panel units and said electrical function element can be electrically connected with said electric-signal path.

31. A panel unit mounted on a panel surface of an operation indicator device together with another panel unit, for performing at least one control and management of a predetermined external apparatus, comprising:

a unit body having a surface of rectangle whose side is substantially perpendicular to its adjacent side and has a size being an integral multiple of a reference size (L), which is a constituent of at least part of said panel surface; and combining means for combining said unit body with another panel unit;

further comprising a veneer for substantially covering the whole surface of said panel unit.

32. The panel unit of claim 31, wherein
said unit body comprises a panel device, and
an indication (204b) in accordance with a function of said panel device is attached to said veneer.

33. A panel mount mounted on a panel surface of an operation indicator device together with another panel unit, for performing at least one control and management of a predetermined external apparatus, comprising:

a unit body having a surface of rectangle whose side is substantially perpendicular to its adjacent side and has a size being an integral multiple of a reference size (L), which is a constituent of at least part of said panel surface; and combining means for combining said unit body with another panel unit;

wherein an indication in accordance with a function of another panel unit in the vicinity of said panel unit is attached to a surface of said panel unit.

* * * * *